(12) United States Patent
Wysoski

(10) Patent No.: US 12,508,379 B2
(45) Date of Patent: Dec. 30, 2025

(54) SYSTEM AND METHOD OF DETECTION OF WATER IN A CONDUIT FOR USE IN A RESPIRATORY THERAPY SYSTEM

(71) Applicant: Fisher & Paykel Healthcare Limited, Auckland (NZ)

(72) Inventor: Simei Gomes Wysoski, Auckland (NZ)

(73) Assignee: Fisher & Paykel Healthcare Limited, Auckland (NZ)

( * ) Notice: Subject to any disclaimer, the term of this patent is extended or adjusted under 35 U.S.C. 154(b) by 774 days.

(21) Appl. No.: 17/309,337

(22) PCT Filed: Dec. 13, 2019

(86) PCT No.: PCT/NZ2019/050158
§ 371 (c)(1),
(2) Date: May 19, 2021

(87) PCT Pub. No.: WO2020/122739
PCT Pub. Date: Jun. 18, 2020

(65) Prior Publication Data
US 2022/0031987 A1    Feb. 3, 2022

Related U.S. Application Data

(60) Provisional application No. 62/779,369, filed on Dec. 13, 2018.

(51) Int. Cl.
*A61M 16/00* (2006.01)
*A61M 16/10* (2006.01)
*A61M 16/16* (2006.01)

(52) U.S. Cl.
CPC ...... *A61M 16/026* (2017.08); *A61M 16/0003* (2014.02); *A61M 16/0051* (2013.01);
(Continued)

(58) Field of Classification Search
CPC ............ A61M 16/026; A61M 16/0003; A61M 16/10–1095; A61M 16/161;
(Continued)

(56) References Cited

U.S. PATENT DOCUMENTS 6,622,724 B1 * 9/2003 Truitt ................. A61M 16/022
                                                128/204.18
7,044,129 B1 * 5/2006 Truschel ............... A61M 16/12
                                                128/204.23
(Continued)

FOREIGN PATENT DOCUMENTS

AU       2011356176 B2    7/2012
AU       2011356176 A1 *  7/2013  ........... A61B 5/4818
(Continued)

*Primary Examiner* — Paige Kathleen Bugg
(74) *Attorney, Agent, or Firm* — Knobbe Martens Olson & Bear LLP

(57) ABSTRACT

We provide a respiratory therapy system comprising:
  a flow generator;
  a humidifier;
  a respiratory conduit
  a patient interface coupled to the respiratory conduit to deliver a gases flow to a patient;
  a sensor configured to determine pressure or flow of the gases flow;
  a controller configured to control the flow generator to generate the gases flow; and the controller configured to:
  a) retrieve at least one first signal associated with or indicative of a gases flow and/or pressure in the respiratory conduit;
  b) determine a measure of at least one first parameter associated with gases flow perturbations and/or pressure perturbations for at least one portion of the retrieved at least one first signal; and
(Continued)

c) determine the presence of liquid in the respiratory conduit based at least in part on the measure(s) of the at least one first parameter meeting a first threshold.

The system can be used to reduce or alleviate condensation in a respiratory gas deliver conduit.

22 Claims, 27 Drawing Sheets

(52) U.S. Cl.
CPC ...... *A61M 16/1095* (2014.02); *A61M 16/161* (2014.02); *A61M 2016/0027* (2013.01); *A61M 2016/0033* (2013.01); *A61M 2205/15* (2013.01)

(58) Field of Classification Search
CPC ........ A61M 16/168; A61M 2016/0027; A61M 2016/003; A61M 2205/15
USPC ..................................... 128/202.22
See application file for complete search history.

(56) References Cited

U.S. PATENT DOCUMENTS

| | | | |
|---|---|---|---|
| 7,551,078 B2 | 6/2009 | Carlson et al. | |
| 9,586,019 B2 | 3/2017 | Heine et al. | |
| 10,792,458 B2 * | 10/2020 | Grashow | F24F 11/80 |
| 2002/0077856 A1 * | 6/2002 | Pawlikowski | G16H 40/40 705/2 |
| 2011/0313689 A1 | 12/2011 | Holley et al. | |
| 2012/0253249 A1 * | 10/2012 | Wilson | A61N 1/3611 607/42 |
| 2014/0276168 A1 * | 9/2014 | Vissapragada Venkata Satya | A61B 5/7278 600/529 |
| 2015/0217079 A1 * | 8/2015 | Mcauley | A61M 16/06 128/203.14 |
| 2017/0095637 A1 * | 4/2017 | Seakins | A61M 16/10 |
| 2018/0056024 A1 * | 3/2018 | Harrington | A61M 16/161 |
| 2018/0169361 A1 * | 6/2018 | Dennis | A61M 16/0051 |
| 2018/0177432 A1 * | 6/2018 | Au | A61B 5/7264 |
| 2018/0185596 A1 * | 7/2018 | Shelly | A61M 16/0683 |
| 2019/0209801 A1 * | 7/2019 | Kimble | A61M 16/1065 |
| 2019/0371460 A1 * | 12/2019 | Gutierrez | A61M 16/026 |
| 2021/0370016 A1 * | 12/2021 | De-Stefani | A61M 16/1095 |
| 2022/0023581 A1 * | 1/2022 | Bath | A61M 16/1095 |

FOREIGN PATENT DOCUMENTS

| | | |
|---|---|---|
| EP | 1138341 A2 | 10/2001 |
| EP | 2098260 A1 | 9/2009 |
| EP | 2830497 B1 | 11/2018 |
| EP | 2471568 A2 | 12/2020 |
| WO | WO 2004/020031 A1 | 3/2004 |
| WO | WO 2013/068918 A1 | 5/2013 |

* cited by examiner

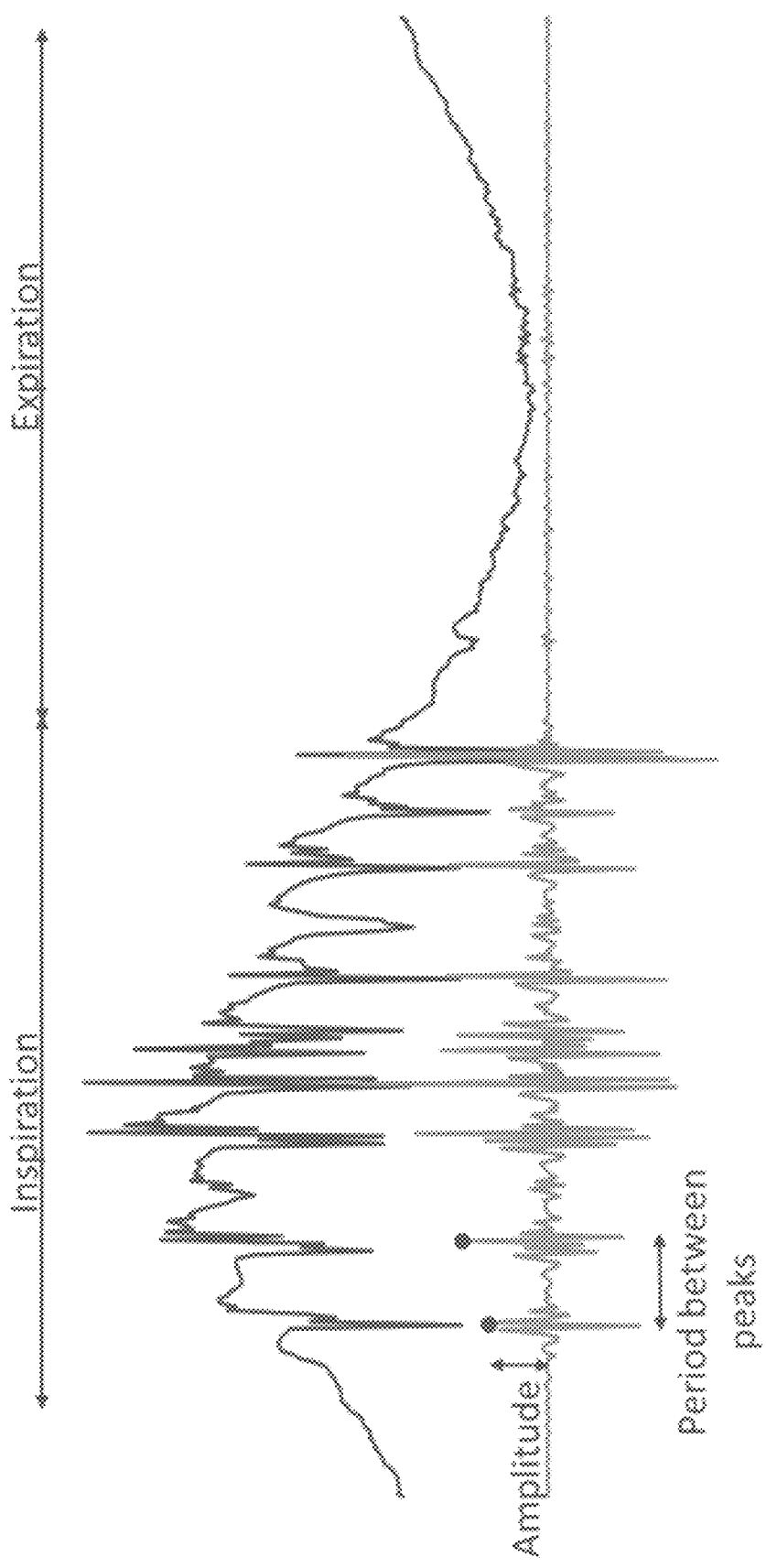

SYSTEM AND METHOD OF DETECTION OF WATER IN A CONDUIT FOR USE IN A RESPIRATORY THERAPY SYSTEM

BACKGROUND OF THE DISCLOSURE

The present invention generally relates to a system and method of detection of water in a conduit for use in a respiratory therapy system. This application claims priority from provisional application U.S. 62/779,369 filed on 13 Dec. 2018, the entire contents of which are hereby incorporated by reference. This application also relates to disclosure from published patent application US20190209801 filed 12 Jul. 2018, and US provisional application U.S. 62/898,464, filed on 10 Sep. 2019, the entire contents of each of which are also hereby incorporated by reference.

DESCRIPTION OF THE RELATED ART

Some respiratory therapy systems, for example, non-invasive ventilators, high flow systems providing nasal or tracheal high flow, respiratory humidification systems, and different modes of CPAP devices (Bi-level etc.), have embedded systems to control the humidity of breathing gases delivered to patients to improve the therapy and usage comfort. These known systems aim at delivering the pressurized breathing gases at the correct humidity corresponding to breathing conditions, and to avoid condensation in the breathing gas flow path of the apparatus, such as in the patient interface, and/or in a respiratory conduit such as a breathing gas delivery conduit, and/or any expiratory conduit for example.

The accumulation of water in conduits operatively coupled and therefore comprising part of the breathing gas flow path to the patient interface is a common issue in systems that do not have humidity control, or when the humidity control is not or is unable to be configured properly for given environmental conditions (for example, different settings may be required in dry, hot ambient conditions to cold, damp conditions). Also, for patient comfort and safety it can be important to prevent build-up of water in the associated conduits. For example, liquid condensation in the respiratory conduit can be problematic as it may compromise the effectiveness of the respiratory therapy being delivered to the patient. Liquid condensate build up in the respiratory conduit can also present a risk to patient safety and comfort as liquid condensate can be mobile and can end up inside patient airways. This issue can also arise when the or part of, the respiratory conduit is unheated, or the control of any heated respiratory conduit cannot adequately control heating of the respiratory conduit, for example due to the environmental conditions in which the system is used.

SUMMARY OF THE DISCLOSURE

In accordance with aspects of this disclosure, the detection of water is achieved by analysing a signal associated with breathing gases flow and/or pressure in the respiratory conduit. The respiratory conduit could comprise any part of the flow path between a humidifier and the patient including, for example, a breathing gas delivery or inspiratory conduit, an expiratory or exhaust gas conduit, and/or any associated conduit connector. An output signal can be generated indicative of the water in the respiratory conduit. Additionally, the detection of water, and in particular the output signal, may subsequently be used as input to control the humidity and/or condensation in the respiratory conduit, so as to reduce or minimise the amount of water in the respiratory conduit, or at least prevent or minimise further water accumulating in the respiratory conduit. The detection of water, in particular the output signal, may be used as an input to control a heater within the respiratory conduit to evaporate, at least partially, any detected liquid condensation. Further the detection of water, in particular the output signal, may be used to control other components of some respiratory systems e.g. a flow generator such as a blower in order to at least partially dry out the conduit and at least partially evaporate the liquid condensate.

In some embodiments, if liquid water is detected, an alarm may be raised. The alarm may comprise a visual, audible or tactile alarm, and could comprise a message on a display of the respiratory device, for example a touch screen display, and/or may also comprise one or more warning sound(s) and/or warning light(s) being activated. The respiratory device may controlled by the controller to produce a specific sound or message or light sequence (e.g. flashing the light or switching on the light in a predetermined pattern) associated with the detected presence of liquid condensate in the respiratory conduit.

According to an aspect of this disclosure there is provided a respiratory therapy system configured to detect water accumulated in a respiratory conduit for use in respiratory treatment of a patient. The system comprises a controller configured to: process at least one first signal associated with a gases flow and/or pressure in said conduit; determine at least one first parameter associated with flow perturbations and/or pressure perturbations for at least one portion of the retrieved at least one first signal; and determine the presence of liquid water in the respiratory conduit based on the measure(s) of the at least one first parameter meeting a first threshold.

According to an aspect of this disclosure there is provided a respiratory therapy system configured to detect the presence of liquid water in a breathing gases respiratory conduit for use in respiratory treatment of a patient, the system comprising a controller configured to:

a) retrieve at least one first signal associated with or indicative of a gases flow and/or pressure in the respiratory conduit,
b) determine a measure of at least one first parameter associated with gases flow perturbations and/or pressure perturbations for at least one portion of the retrieved at least one first signal,
c) determine the presence of liquid in the respiratory conduit based at least in part on the measure(s) of the at least one first parameter meeting a first threshold.

'Liquid' as used herein means any single liquid, or mixture or combination of liquids. The liquid may simply comprise water. The liquid may comprise a mixture of water and medicament e.g. from a nebuliser. Alternatively the system may detect the presence of liquid condensate of the humidification fluid within the conduit. Humidification fluid could be, or include, water, but may also be or comprise other susbtances.

The controller may be further configured to:
a) determine at least one further first parameter associated with flow perturbations and/or pressure perturbations for at least one further portion of the received at least one first signal, and
b) determine the presence of liquid water in the respiratory conduit further based at least in part on the at least one further first parameter meeting the first threshold.

The controller may be configured to identify the gases flow perturbations and/or pressure perturbations for the associated portion of the retrieved at least one first signal based at least in part on a comparison between that at least one portion of the retrieved signal and a reference.

The controller may be further configured to:
a) retrieve information indirectly related to gases flow and/or pressure,
b) determine a measure of at least one second parameter associated with the retrieved information, and wherein the determination the presence of liquid water in the respiratory conduit is further based at least in part on the measure(s) of the at least one second parameter meeting a second threshold.

The at least one second parameter may be associated with one or more of:
a) a temperature of the gases flow,
b) an ambient temperature,
c) a humidity of the gases flow,
d) an ambient humidity,
e) device geographic location,
f) environment weather forecast, and/or
g) altitude (for example of the location in which the system is located).

The at least one first parameter may be associated with spikes caused by perturbations in gases flow and/or pressure.

The reference may be associated with an estimated gases flow and/or pressure of the respiratory conduit.

The estimated gases flow and/or pressure may be estimated at least in part on a set gases flow and/or pressure profile of a respiratory therapy device operatively connected to the respiratory conduit, in use, and/or one or more properties or characteristics associated with the patient's respiration, such as any one or more of respiratory pattern/rate, tidal volume, minute volume, lung compliance or lung restriction.

The estimated gases flow and/or pressure may be further estimated at least in part on an estimated leak of breathing gases between the respiratory conduit and the patient.

The estimated gases flow and/or pressure of the respiratory conduit may be estimated at least in part on the known gases flow and/or pressure profile or setting of a respiratory therapy system operatively connected to the respiratory conduit, subtracted by the estimated leaks between the respiratory conduit and the patient, in use.

The at least one first parameter may relate to any one or more of:
a) a frequency,
b) an intensity,
c) an amplitude,
d) a period between peaks,
e) a period of peaks,
f) a location of sharp changes in the breath cycle, and/or
g) a duration of flow perturbations and/or pressure perturbations of the at least one first signal in view of the reference.

The controller may be further configured to
output a control signal in response to the determination of presence of liquid water in the respiratory conduit.

The system may include a breathing gases conduit heater wire, or humidifier heater.

The control signal may be configured to control the operation of the breathing gases conduit heater wire, or humidifier heater, so as to increase the gases temperature of the gases in the respiratory conduit in response to the determination of presence of liquid water in the respiratory conduit.

The control signal may be configured to determine, vary or control operational settings of the system.

The operational settings may be associated with any one or more of varying humidity, varying temperature, or varying power to a heater operationally connected to or comprising part of the system.

The control signal may be configured to provide feedback to an algorithm executable by the system, said algorithm being any one or more of:
a) a bilevel triggering algorithm;
b) a breath detecting algorithm;
c) a flow limitation detection algorithm;
d) a flow control algorithm; and/or
e) a pressure control algorithm If there is liquid condensate, for example liquid water, detected then the algorithm(s) may also receive an input to either change operation of the algorithm(s) to overcome the partial obstruction (i.e. partial blockage) in the respiratory conduit so that a required flow rate can be delivered and/or a required pressure can be delivered.

The control signal may provide feedback to a humidifier heater control algorithm and/or a respiratory conduit heater wire control algorithm.

The system may comprise any one more of: a humidifier and/or a flow generator. The flow generator may comprise, for example, a blower, gas concentrator, turbine, compressor, pressurised gas source or any combination. The flow generator may comprise a blower, driven by an electric motor. The pressurised gas source may comprise part of the system, or may be, for example, a hospital gas source to which the system is connected.

The at least one of the first parameter(s) may be determined based at least in part on a frequency analysis of the at least one first signal.

The frequency analysis may be based at least in part on a Fast Fourier Transform (FFT) of the at least one first signal.

The at least one first parameter associated with flow perturbations and/or pressure perturbations may be determined based at least in part on a wavelet analysis of the at least one first signal.

The controller may be further configured to filter at least one of the first signal(s) using a filter prior to determining the presence of liquid water in the respiratory conduit.

The controller may be further configured to filter at least one of the first signal(s) using a filter prior to determining at least one of the first parameter(s).

The frequency analysis of the at least one first signal may be based at least in part on at least one spectrogram associated with the at least one first signal.

The first threshold may be derived using machine learning.

The second threshold may be derived using machine learning.

The system may comprise at least one of:
a) a respiratory therapy device for providing a flow of breathing gas to a user;
b) a humidifier;
c) a breathing gases delivery respiratory conduit;
d) a breathing circuit comprising a plurality of respiratory conduits and/or conduit connectors;
e) a flow generator; and
f) a patient interface.

The controller may be configured to:
a) retrieve the at least one first signal associated with or indicative of a gases flow and/or pressure in the respiratory conduit from at least one sensor during a first measuring period, and b) determine the presence of liquid water in the respiratory conduit when the measure of the at least one first parameter exceeds the first threshold.

The controller may comprise a controller of a flow generator of the respiratory therapy system.

The controller may be configured to identify at least one portion or at least one further portion of the retrieved at least one first signal being associated with gases flow perturbations and/or pressure perturbations based at least in part on said comparison.

According to another aspect of this disclosure there is provided a respiratory therapy system according to any one of the above statements, wherein the respiratory therapy system is, or comprises part of a:
 a) continuous positive air pressure (CPAP) system;
 b) ventilator;
 c) humidifier;
 d) high flow therapy system;
 e) surgical humidifier;
 f) an insufflator that is used to provide a flow of gases at a predetermined pressure into a surgical site. The gases may be carbon dioxide or a mixture of carbon dioxide and at least one other gas.

According to another aspect of this disclosure there is provided a respiratory therapy system according to any one of the above statements, wherein the respiratory therapy system comprises any one or more of:
 a) a humidifier comprising a heater plate assembly, and a humidifier chamber configured to be mounted on the heater plate, where the humidifier chamber is optionally removably mounted on the heater plate;
 b) an integrated unit comprising a blower unit and a humidification unit, wherein the blower unit and the humidification unit are enclosed within a common enclosure or housing.

According to another aspect of this disclosure there is provided a computer implemented method configured to detect the presence of liquid water in a breathing gases respiratory conduit for use in a respiratory treatment of a patient, comprising
 a) retrieving, by a controller, at least one first signal associated with or indicative of a gases flow and/or pressure in the respiratory conduit,
 b) determining, by the controller, a measure of at least one first parameter associated with gases flow perturbations and/or pressure perturbations for at least one portion of the retrieved at least one first signal, and
 c) determining, by the controller, the presence of liquid in the respiratory conduit based at least in part on the measure(s) of the at least one first parameter meeting a first threshold.

The computer implemented method may further comprise carrying out, in the controller, any one of the functional steps carried out by the controller of any one of the preceding statements.

According to another aspect of this disclosure there is provided a non-transitory computer readable medium comprising instructions, when executed by a processor/controller of a respiratory therapy system, which cause the respiratory therapy system to detect the presence of liquid water in a breathing gases respiratory conduit for use in a respiratory treatment of a patient, comprising steps of:
 a) retrieving, by a controller, at least one first signal associated with or indicative of a gases flow and/or pressure in the respiratory conduit,
 b) determining, by the controller, a measure of at least one first parameter associated with gases flow perturbations and/or pressure perturbations for at least one portion of the retrieved at least one first signal, and
 c) determining, by the controller, the presence of liquid in the respiratory conduit based at least in part on the measure(s) of the at least one first parameter meeting a first threshold.

According to another aspect of this disclosure there is provided a respiratory therapy system comprising:
 a flow generator;
 a humidifier;
 a respiratory conduit
 a patient interface coupled to the respiratory conduit to deliver a gases flow to a patient;
 a sensor configured to determine pressure or flow of the gases flow;
 a controller configured to control the flow generator to generate the gases flow; and the controller configured to:
  a) retrieve at least one first signal associated with or indicative of a gases flow and/or pressure in the respiratory conduit;
  b) determine a measure of at least one first parameter associated with gases flow perturbations and/or pressure perturbations for at least one portion of the retrieved at least one first signal; and
  c) determine the presence of liquid in the respiratory conduit based at least in part on the measure(s) of the at least one first parameter meeting a first threshold.

According to another aspect of this disclosure there is provided a high flow therapy system comprising:
 a flow generator;
 a humidifier;
 a respiratory conduit
 an unsealed interface coupled to the respiratory conduit to deliver a gases flow to a patient;
 a sensor configured to determine pressure or flow of the gases flow;
 a controller configured to control the flow generator to generate the gases flow and provide the gases flow to a flow set point, and the controller configured to:
  a) retrieve at least one first signal associated with or indicative of a gases flow and/or pressure in the respiratory conduit;
  b) determine a measure of at least one first parameter associated with gases flow perturbations and/or pressure perturbations for at least one portion of the retrieved at least one first signal; and
  c) determine the presence of liquid in the respiratory conduit based at least in part on the measure(s) of the at least one first parameter meeting a first threshold.

According to another aspect of this disclosure there is provided a pressure delivery system comprising
 a flow generator;
 a respiratory conduit;
 a sealed interface coupled to the respiratory conduit to deliver a gases flow from the flow generator to a patient;
 a sensor configured to determine pressure and/or flow of the gases flow;
 a controller configured to control the flow generator to generate the gases flow to a set pressure;
 the controller being configured to:
  a) retrieve at least one first signal associated with or indicative of the gases flow and/or pressure in the respiratory conduit;
  b) determine a measure of at least one first parameter associated with the gases flow perturbations and/or pressure perturbations for at least one portion of the retrieved at least one first signal; and c) determine the presence of liquid in the respiratory conduit based at least in part on the measure(s) of the at least one first parameter meeting a first threshold.

The pressure delivery system may comprise a humidifier.

The pressure delivery system may provide constant positive airway pressure therapy or may provide bilevel pressure therapy.

The system may comprise a humidifier heater and/or a respiratory conduit heater, wherein, if liquid is detected, the controller is configured to control the humidifier heater and/or the respiratory conduit heater in order to at least partially evaporate the liquid in the respiratory conduit.

The controller may be configured to detect liquid and increase power to the respiratory conduit heater to at least partially evaporate the liquid.

The controller may be configured to detect liquid, the controller being configured to reduce power to the humidifier heater and increase power to the respiratory conduit heater to at least partially evaporate the liquid.

The flow generator may comprise a blower, the controller being configured to increase power to the blower to increase blower speed such that high flow of gases are provided to at least partially evaporate the liquid.

Further aspects of the invention, which should be considered in all its novel aspects, will become apparent from the following description.

DESCRIPTION OF THE DRAWINGS

A number of embodiments of the invention will now be described by way of example with reference to the drawings in which:

FIG. 9 is a graphical representation of a first signal during inspiration and expiration, and the associated perturbation amplitude detected;

FIG. 10b illustrates a spectrogram of the first signal of 10a.

FIG. 11b illustrates a spectrogram of the first signal of 11a;

FIG. 12b illustrates a spectrogram of the first signal of 12a.

DETAILED DESCRIPTION OF SPECIFIC EMBODIMENTS

Figure 1A:
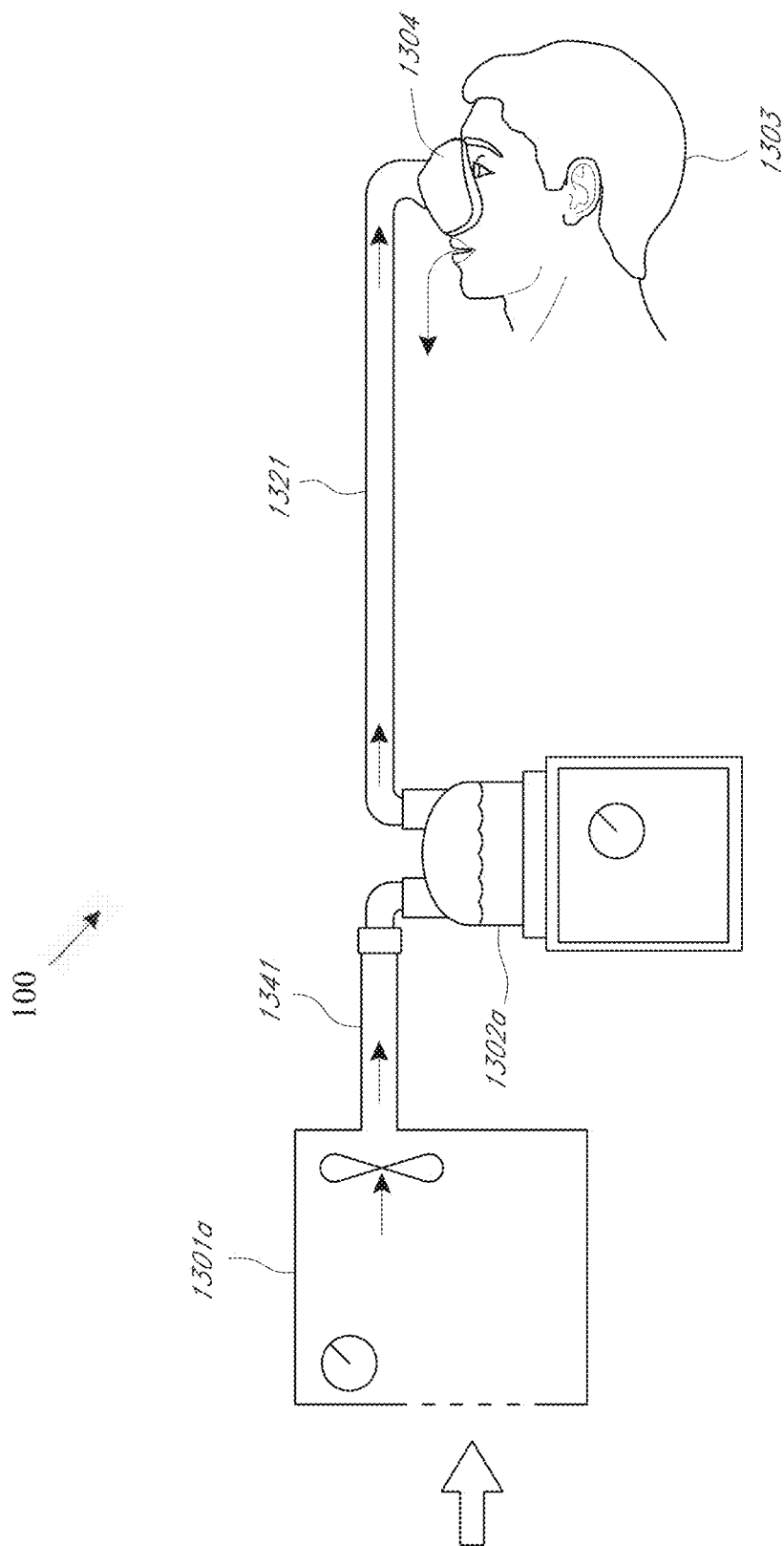
FIGS. 1A through 3B show example respiratory therapy systems configured to provide respiratory therapy to a user.

A respiratory therapy system is typically used for the treatment of respiratory conditions such as, for example, obstructive sleep apnea (OSA); chronic obstructive pulmonary disease (COPD), respiratory distress or any other respiratory condition.

This disclosure relates to any respiratory therapy system 100, for treatment of any respiratory condition. Typically a respiratory therapy system supplies a continuous positive airway pressure (CPAP) or Bi-level airway pressure to from a gas source, for example flow or pressure generator, and/or ventilator, to a patient interface connected to the patient. Typically the patient interface creates at least a substantial seal on or around the nose and/or the mouth.

The respiratory therapy system 100 comprises an inspiratory flow path along which breathing gas is delivered from the gas source to the patient via a patient interface, and an expiratory flow path along which expiratory gas flows from the patient. The inspiratory and expiratory flow paths may be the same, i.e. at least a part of the inspiratory and expiratory flow paths are shared, for example via respiratory conduit as elucidated further below. However, in other configurations the inspiratory and expiratory flow paths are typically different.

Examples of a gas source include a source of pressurised gas, or a ventilator, or a flow or pressure generator comprising a blower (typically comprising an impellor and a motor).

A flow generator typically comprises an impeller driven by a motor. Rotation of the impeller by the motor generates a breathable gas flow which is driven from the flow generator to the patient via the inspiratory flow path, one or more respiratory conduits, one or more conduit connectors, and a patient interface. The flow generator may be integrated with other parts of the respiratory therapy system such as a controller and a humidifier which humidifies the breathable gas flow prior to delivery to the patient. In other examples, the flow generator is a separate component which may have a dedicated controller, and be connected to other components of the respiratory therapy system by suitable conduits and conduit connectors.

The flow path between the gas source and the patient is typically referred to as a breathing circuit. The breathing circuit can comprise one or more breathing limbs. The components of the breathing limb comprising the inspiratory part of the breathing circuit can be referred to as the inspiratory limb of the system. Such a breathing circuit can comprises one or more sections of inspiratory gas delivery conduit, for example the respiratory conduit elucidated below, and one or more connectors that connect the section(s) of the conduit between the source of breathable gas and a patient interface that delivers the breathable gas to the patient. A humidifier may be provided between the source of gas and the breathing circuit to humidify the breathable gas. Expired gases from the patient can flow from the patient interface along an expiratory flow path, for example formed by a respiratory conduit as elucidated further below. Alternatively, expired gases from the patient can be vented to atmosphere. The expired gases can be vented through one or more vent holes in the patient interface. For example, CPAP and Bi-level respiratory therapy systems comprise only an inspiratory circuit, with exhaled gases being vented to atmosphere via a vent in the patient interface. Where included, the components of the breathing limb comprising the expiratory part of the breathing circuit can be known as the expiratory limb Such an expiratory limb may comprise a combination of one or more sections of expiratory conduit, for example the respiratory conduit elucidated below, and connectors. The breathing circuit can therefore deliver heated and humidified air to the patients.

It is important to be able control the flow and/or pressure of the breathable gas flow so as to achieve the desired therapy for the patient. To this end it is known to provide one or more sensors in the gas delivery path, the output from which is processed by a controller to vary the flow and/or pressure of the breathable gas flow. Such sensors can comprise flow sensors or pressure sensors or any combination of such sensors. In one example, a sensor is provided which measures and generates a signal indicative of the dynamic pressure of breathable gas through some part of the system. This dynamic pressure signal is processed to generate an output which may be used to determine the pressure and/or flow rate of the gas in the system (or in part of the system). In some cases other sensors such as humidity sensors can also be provided.

Overview of Example Respiratory Therapy Systems

Respiratory therapy system 100, in accordance with this disclosure, can comprise various different apparatus and components, configured to deliver breathable gas to a user. 'System' here is used to cover a single housing or enclosure in which the primary components required for respiratory therapy are contained, or multiple housings or enclosures each containing some of the components of the system. 'System' as used herein also covers a plurality of components that can be connected in a specified arrangement to perform a function e.g. deliver a gases flow to a patent. Further, any reference below to a 'controller' is to be taken as reference to a control system that may or may not comprise a plurality of separate controllers, each controller having one or more electronic processors. For example the system may comprise a single primary controller that controls aspects of the system including the novel control aspects of this disclosure. Alternatively, the system may comprise a plurality of controllers, each controller controlling a particular aspect of the system. One or more controllers may be remote from the hardware of the system. For example the hardware of the system, at the patient, may comprise a primary controller, with a secondary controller being remote and configured to communicate with the primary controller via wired or wireless communication.

FIGS. 1A through 1D show example respiratory therapy systems 100 that can implement the features described herein. Each of the various systems described in FIGS. 1A-1D can be used with the specific features described later in this application. Turning to FIG. 1A, a schematic view of a user 1303 receiving air from a modular assisted breathing unit and humidifier system is shown. A conduit 1341 provides pressurized air from an assisted breathing unit or blower unit 1301a to a humidifier chamber 1302a. A heater plate assembly in the modular assisted breathing unit and humidifier system can be in contact with the humidifier chamber 1302a to heat water in the chamber 1302a. Gases passing through the humidifier chamber 1302a can be humidified and heated. Humidified, heated and pressurized gases exit the humidifier chamber 1302a via an inspiratory conduit 1321, and are provided to the patient or user 1303 via a user interface 1304. The user interface 1304 shown in FIG. 1A is a nasal mask, which covers the nose of the user 1303. However, it should be noted that in systems of these types, a full face mask, nasal cannula, tracheostomy fitting, nasal pillows, oral interface, or any other suitable user interface could be substituted for the nasal mask shown.

Figure 1B:
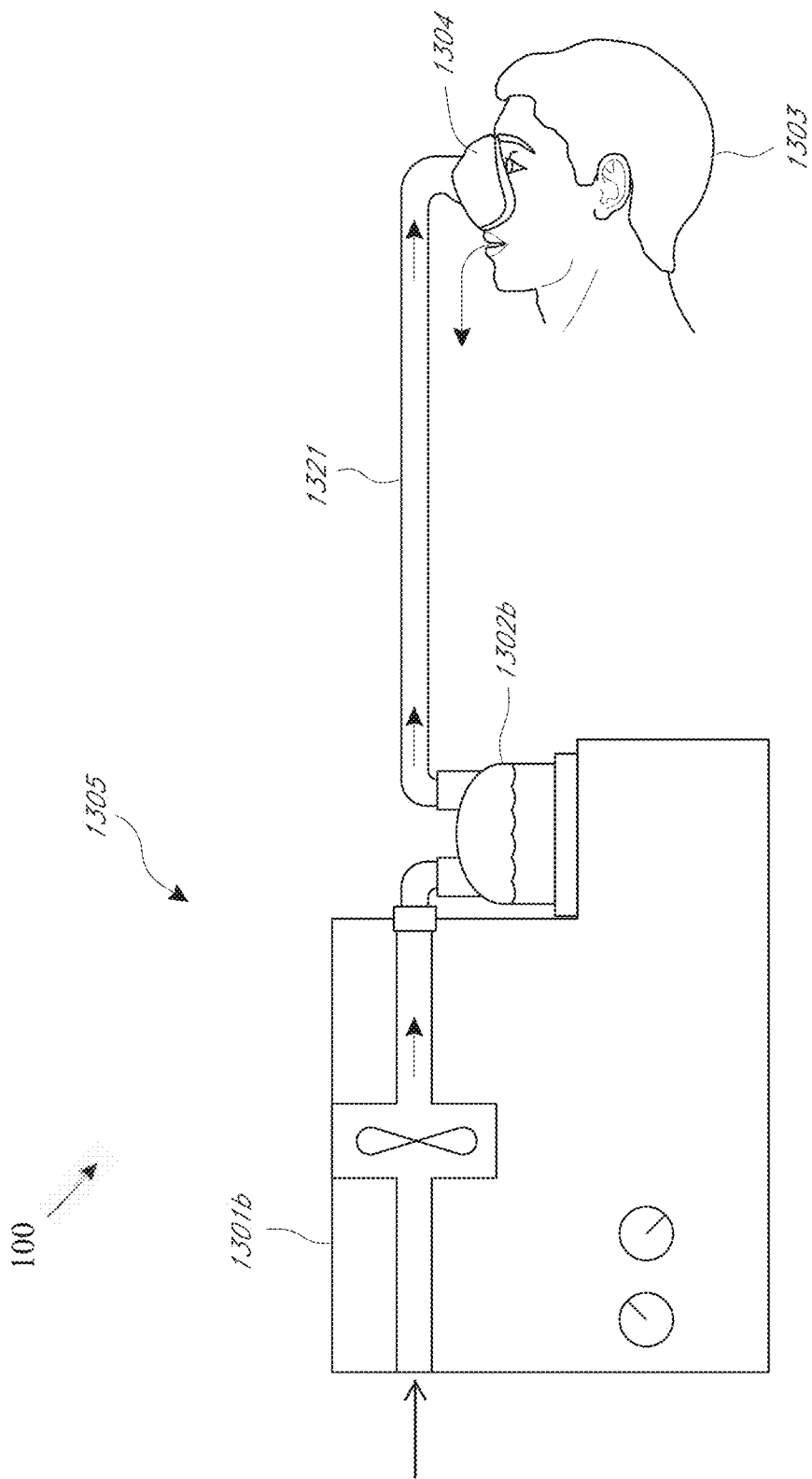

FIG. 1B shows a schematic view of the user 1303 receiving air from an integrated blower/humidifier unit 1305. The system generally operates in the same manner as the modular system shown in FIG. 1A except that a humidifier chamber 1302b has been integrated with a blower unit 1301b to form the integrated unit 1305. Accordingly, the integrated blower/humidifier unit 1305 can include a heater plate assembly configured to heat water in the chamber 1302b. An example of an integrated unit is described in PCT application WO2008/056993, which is hereby incorporated by reference in its entirety.

Assisted Breathing Unit

An example assisted breathing unit or integrated unit 1306 will now be described with reference to FIGS. 1C and 1D. FIGS. 1A-2D show an example pressure therapy device i.e. a device that controls gases to achieve a required pressure being a prescribed pressure or a therapeutic pressure, for example that can be defined by a clinician. The pressure is created by using a patient interface comprising a sealed mask.

The integrated unit 1306 can include two main parts: an assisted breathing or blower unit 1307 and a humidification unit 1331. When in use, the humidification unit 1331, which can include a humidification chamber, generally is enclosed within an enclosure that is formed in an external casing of the integrated unit 1306. In the illustrated configuration, the top part of the humidification unit 1331 is not enclosed within the enclosure 1342. The blower unit 1307 can include a heater plate assembly in contact with the humidification unit 1331 to heat water inside the humidification chamber.

The blower unit 1307 has an outer shell that generally is a rectangular block with substantially vertical side and rear walls, and a front face that is angled slightly rearwards. In the illustrated embodiment, the walls, base and top surface are all manufactured and connected as far as possible to minimize the occurrence of seams. Any necessary seams can be sealed. This outer shell generally encloses the working parts of the blower unit 1307 and forms part of the blower unit 1307.

Figure 1C:
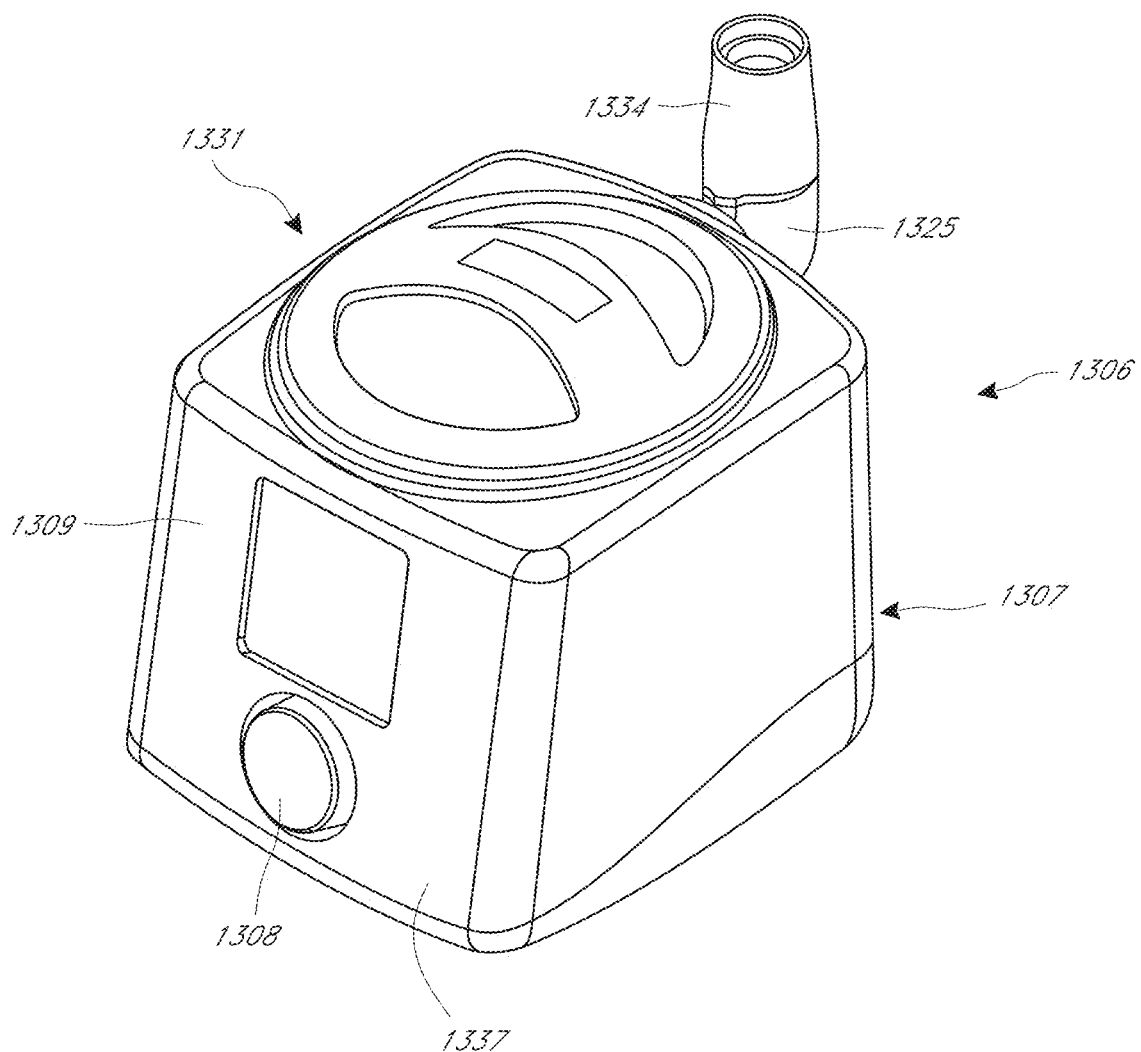
Figure 1D:
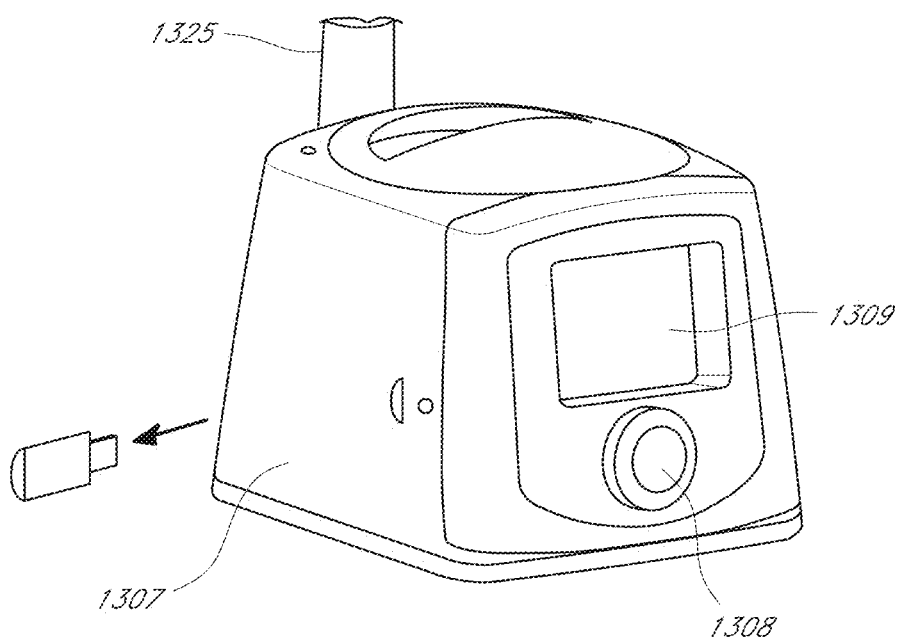

As shown in FIGS. 1C and 1D, a user interface is located on the lower section of the front face of the illustrated integrated unit 1306 with a control display 1309 located directly above the user interface. The user interface can include a control knob 1308. A patient outlet 1325 is shown passing out of the rear wall of the integrated unit 1306. In the illustrated embodiment, in use the free end of the outlet 1325 faces upwards for ease of connection. However, the patient outlet 1325 can be rotated to one side or to the other side to move or align it in a more convenient position for storage or to provide a more convenient use position.

The illustrated patient outlet 1325 is adapted to allow both pneumatic and electrical connection to one end of a conduit, for example, the conduit (such as the inspiratory conduit 1321 of FIG. 1B), that extends between the unit 1306 and a patient interface, for example, the interface 1304 of FIG. 1B. An example of the type of connector that can be used and the type of dual connection that can be made is described in U.S. Pat. No. 6,953,354, which is hereby incorporated by reference in its entirety. It should be noted that for the purposes of reading this specification, the patient interface generally can be thought of as including both the interface 1304 and the inspiratory conduit 1321 where it would be appropriate to read it in this manner.

The integrated unit 1306 can include an inlet vent or inlet port (not shown) to draw air in from atmosphere. The inlet port or vent could also be a connector adapted to receive gases from a wall source, pressure bottle or the like. The integrated unit 1306 can also include a mechanism for providing a pressurized air flow from the inlet vent to the humidification unit 1331. The pressurized air flow mechanism can include a fan unit. The vent can be located wherever is convenient on the external surface of the integrated unit 1306. The vent can be located on the rear face of the blower unit 1307.

The air is ducted or otherwise directed along an air path through the casing of the blower unit 1307 and delivered to the humidification unit 1331, where it is humidified and heated by the heated water, before passing out of the humidification unit 1331 and onwards to the patient outlet 1325 on the blower unit 1307. The heated humidified gas then passes to the user 1303 via the inspiratory conduit 1321 and a patient interface, which can include any suitable patient interface examples disclosed herein.

The outlet port or patient outlet 1325 is adapted to enable both pneumatic attachment of the inspiratory conduit 1321 and electrical connection via an electrical connector. In FIG. 1C, a conduit connector 1334 that would normally be fitted to the end of the inspiratory conduit 1321 is shown connected to the patient outlet 1325. The outlet port or outlet connection does not have to be via the housing of the integrated unit 1306, as in the illustrated embodiment. Instead, the connection for the inspiratory conduit 1321 could be located directly on an outlet from humidification unit 1331. The illustrated form and variations generally can be referred to as connection mechanisms.

The integrated unit 1306 also contains electronic circuitry enclosed within the casing, which at least partly comprises a controller, such as a microprocessor or the like, and which provides control signals to control the output or outputs of at least the blower unit 1307, and preferably other items such as the humidification unit 1331. The control circuitry also can be adapted to receive signals from sensors in the system (for example, pressure, flow, humidity and temperature signals from these sensors as applicable) and to alter outputs from the control circuitry accordingly. The control circuitry also receives signals from user controls as the user controls are manipulated by a user and alters the output signals accordingly.

Figure 2A:
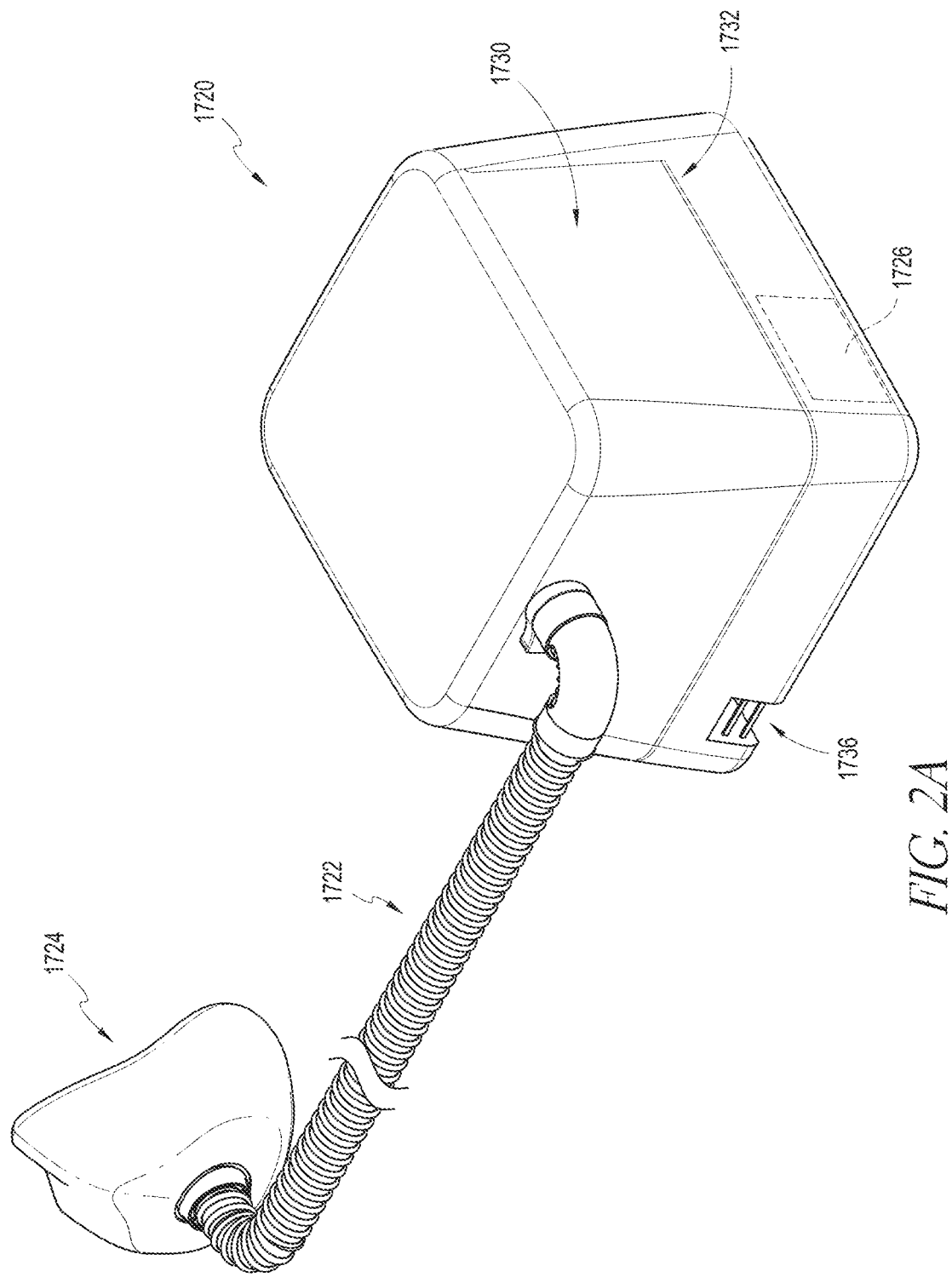

FIGS. 2A through 2D show additional respiratory devices that can implement the features described herein. Again, each of the various systems described in FIGS. 2A-2D can be used with the specific features described later in this application. Turning to FIG. 2A, a breathing assistance apparatus 1720 is shown that is arranged and configured in accordance with certain features, aspects and advantages of the present invention. In the illustrated configuration, the breathing assistance apparatus 1720 is connected to an inspiratory conduit 1722 and the inspiratory conduit 1722 is connected to a patient interface 1724, such as a breathing mask or the like. Any suitable patient interface 1724 can be used.

The breathing assistance apparatus 1720 is configured to deliver a flow of pressurized breathing gases to the user through the conduit 1722 and the patient interface 1724. Accordingly, the illustrated breathing assistance apparatus 1720 can include a blower unit 1726, which has been schematically illustrated in FIG. 2A. The blower unit 1726 can have any suitable construction. The blower unit draws ambient air into the breathing assistance apparatus 1720 and generates the flow of pressurized breathing gases.

Figure 2B:
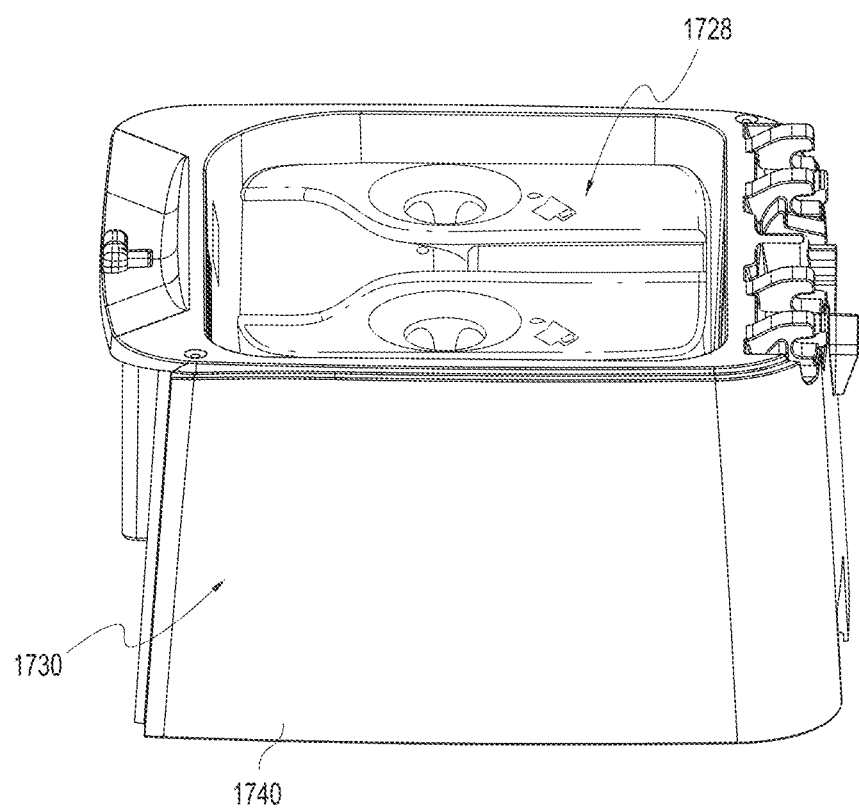
Figure 2C:
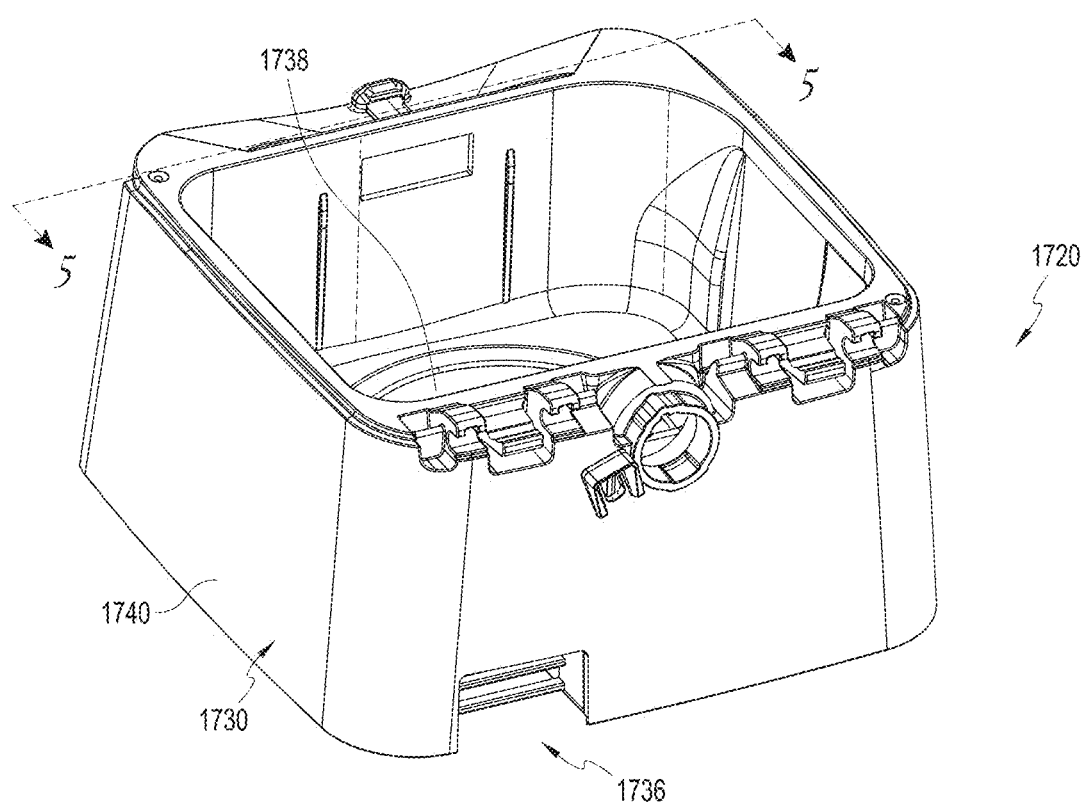

The breathing assistance apparatus 1720 also is configured to humidify the flow of pressurized breathing gases prior to deliver to the user. Accordingly, as illustrated in FIG. 2B, the illustrated breathing assistance apparatus 1720 also can include a humidification chamber 1728. The humidification chamber 1728 can be removable from the breathing assistance apparatus 1720. Any suitable construction can be used for the humidification chamber 1728. The humidification chamber 1728 can be configured to contain a volume of liquid, such as water. The flow of pressurized breathing gases can pass over the volume of liquid en route to the user such that the flow of pressurized breathing gases can increase in humidity.

Figure 2D:
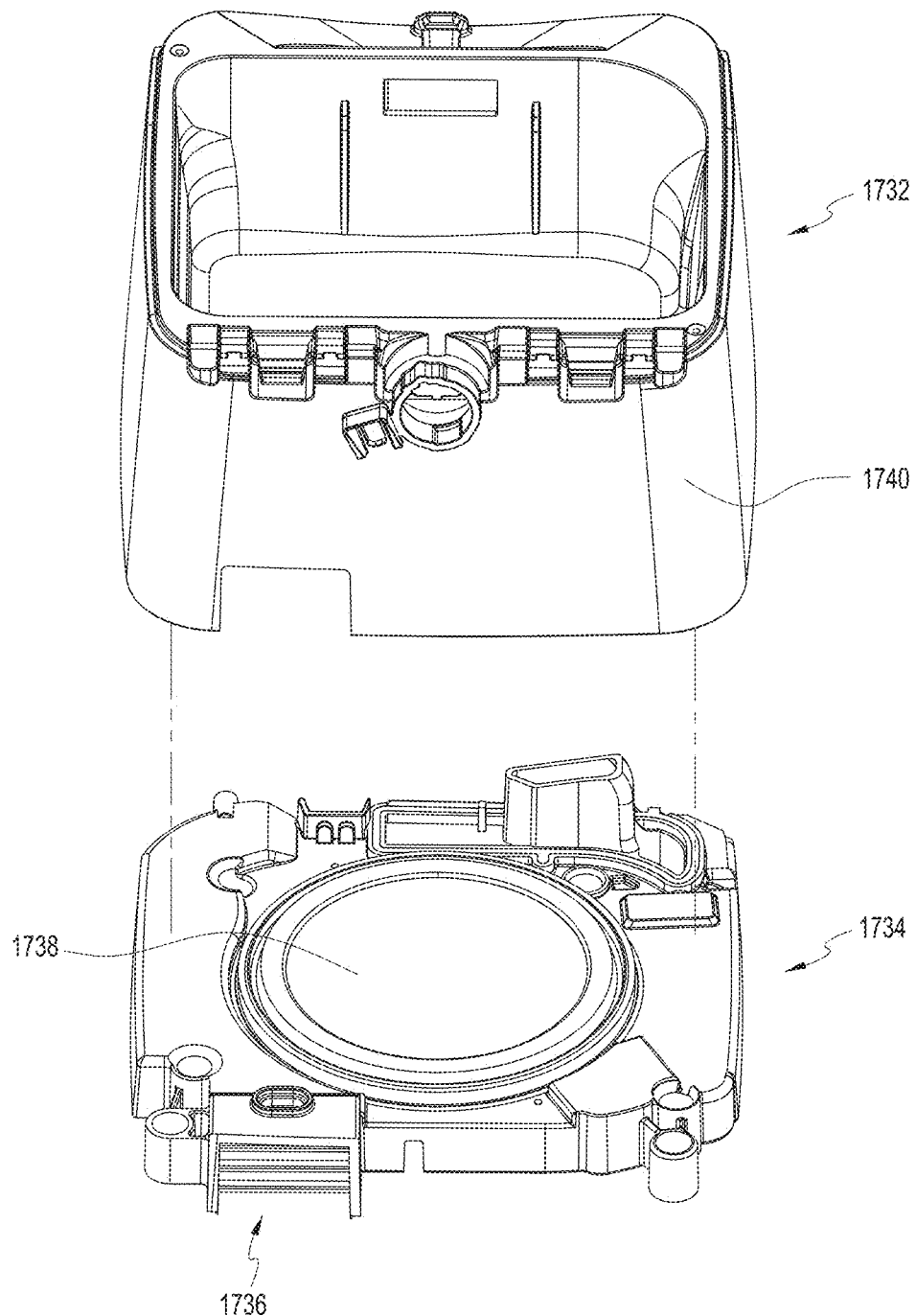

As illustrated, the breathing assistance apparatus 1720 generally can include a main body 1730. With reference to FIG. 2D, the main body 1730 can include an upper housing 1732 and a lower housing 1734. The upper housing 1732 and the lower housing 1734 can be secured together in any suitable manner. In some configurations, the bottom of the lower housing 1734 can be enclosed by a further cover.

With continued reference to FIG. 2D, the lower housing 1734 can include an air inlet 1736 through which the blower unit 1726 draws air. The blower unit 1726 can be mounted to or within the lower housing 1734. The lower housing 1734 also can support a heater plate assembly 1738. The liquid within the humidification chamber 1728 can be heated through an interaction with the heater plate assembly 1738. In some configurations, the humidification chamber 1728 can rest on a heating plate of the heater plate assembly 1738. Other configurations are possible.

Figure 3A:
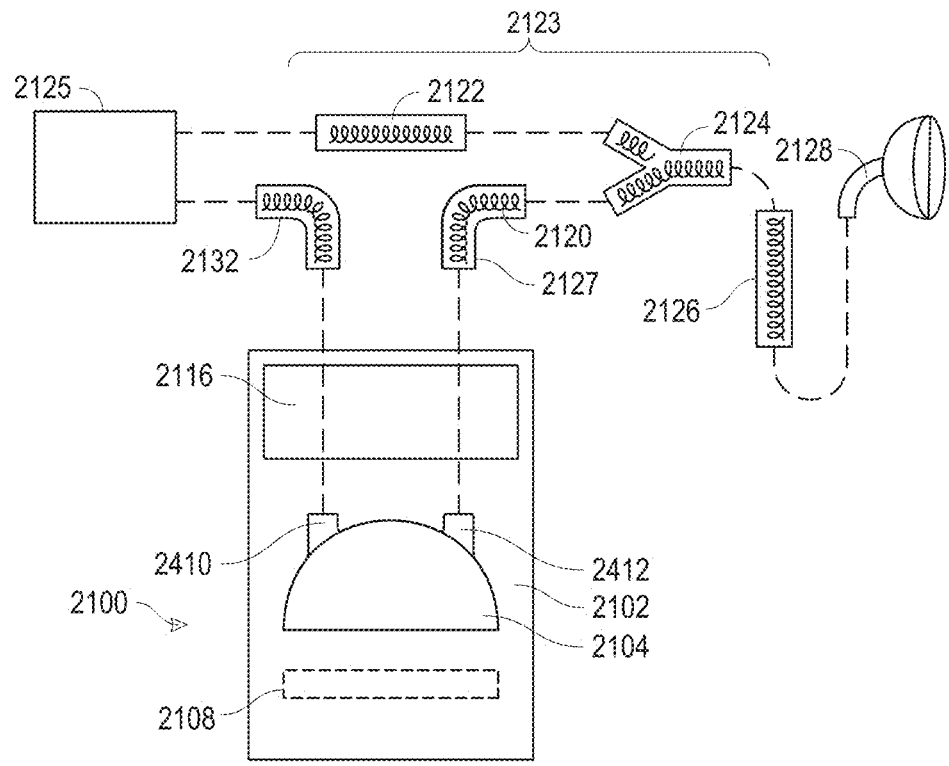
Figure 3B:
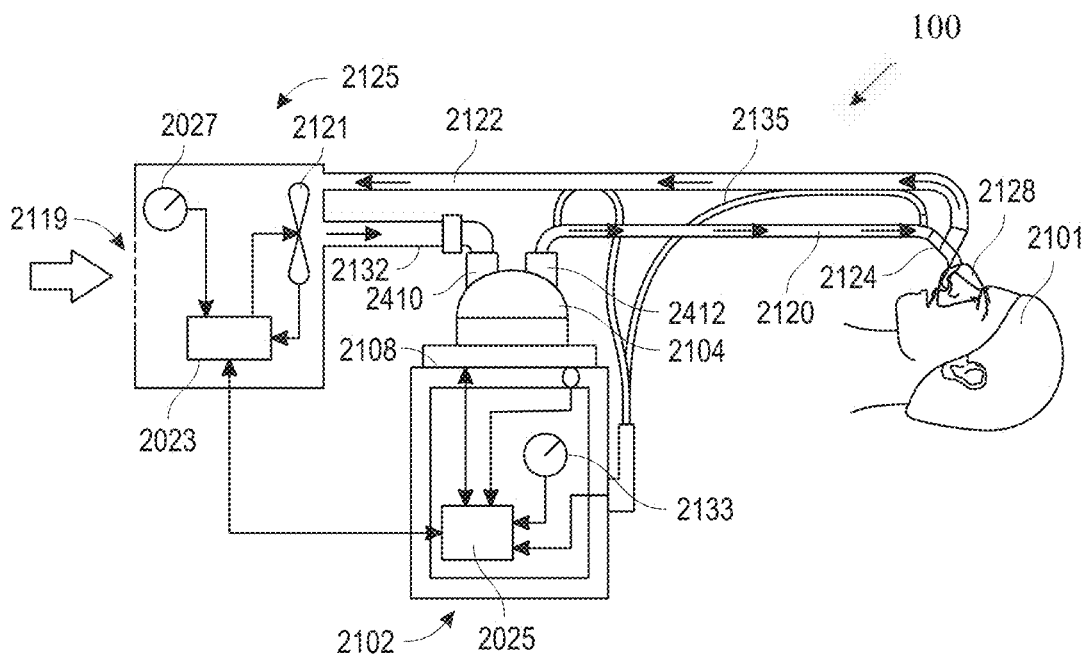

FIGS. 3A and 3B show additional respiratory device examples that can implement the features described herein. Each of the various systems described in FIGS. 3A and 3B can be used with the specific features described later in this application. FIGS. 3A and 3B schematically illustrate examples of a humidification system 2100 that, in some applications, can be used with breathing therapies, positive pressure apparatus, non-invasive ventilation, invasive ventilation, surgical procedures including but not limited to laparoscopy, and the like. Desirably, the humidification system 2100 can be adapted to supply humidity or vapor to a supply of gases. The humidification system 2100 can be used with ventilators, nasal high flow systems, continuous, variable, or bi-level positive airway pressure (PAP) systems or other form of respiratory therapy. In some configurations, the humidification system 2100 can be integrated into a system that delivers any such types of therapy.

An example of the humidification system 2100 can include a heater base unit 2102 and a humidification chamber 2104. The heater base unit 2102 can comprise a heater plate assembly 2108. The humidification chamber 2104 can be configured to hold a volume of a liquid, such as water. The heater plate assembly 2108 can be configured to heat the volume of liquid held within the humidification chamber 2104 to produce vapor.

The humidification chamber 2104 is removable from the heater base 2102 to allow the humidification chamber 2104 to be more readily sterilized or disposed. The body of the humidification chamber 2104 can be formed from a non-conductive glass or plastics material but the humidification chamber 2104 can also include conductive components. For instance, the humidification chamber 2104 can include a highly heat-conductive base (for example, an aluminium base) contacting or associated with the heater plate assembly 2108 on the heater base unit 2102.

The heater base unit 2102 can also include electronic controls. In this example, the heater base unit 2102 includes a master controller 2025. The master controller 2025 can comprise an electronic, analogue, or digital processor or controller. Preferably, the master controller 2025 comprises a microprocessor-based controller configured to execute computer software commands stored in associated memory. In response to user-set humidity or temperature values input via a user interface 2133, for example, and other inputs, the master controller 2025 determines when (or to what level) to energize a heating element of the heater plate assembly 2108 to heat the liquid within the humidification chamber 2104.

The humidification system 2100 also can include a gases supply 2125. In some configurations, the gases supply 2125 can comprise a ventilator, blower unit, or any other suitable source of pressurized gases suitable for breathing or use in medical procedures. The gases supply 2125 can be separate from or combined with the heater base 2102.

For example as shown in FIG. 3B, dry or relatively dry gases, or ambient air, enter the gases supply 2125 through a vent 2119. A fan 2121 can improve gas flow into the gases supply by drawing air or other gases through the vent 2119. The fan 2121 can be, for instance, a variable speed fan, where a controller 2023 controls the fan speed. In particular, the function of the controller 2023 can be controlled by the master controller 2025 in response to inputs from the master controller 2025 and a user-set predetermined required value (preset value) of pressure or fan speed via a dial 2027.

The humidification system also can include a breathing circuit 2123. The breathing circuit 2123 can include an inspiratory conduit 2120. A chamber end of the inspiratory conduit 2120 can be configured to connect to an outlet port 2412 of the humidification chamber 2104. A patient end of the inspiratory conduit 2120 can be configured to connect to the patient, for example, via a patient interface 2128. In some configurations, the inspiratory conduit 2120 can be coupled directly to the patient interface 2128. Any suitable type of the patient interface 2128 can be incorporated. Patient interface is a broad term and is to be given its ordinary and customary meaning to a person of ordinary skill in the art (that is, it is not to be limited to a special or customized meaning) and includes, without limitation, masks (such as tracheal masks, face masks and nasal masks), cannulas, and nasal pillows.

A temperature probe 2135 can connect to the inspiratory conduit 2120 near the patient interface 2128, or directly to the patient interface 2128. The temperature probe 2135 monitors the temperature near or at the patient interface 2128.

A heating element (not shown), for example, a heating element that is associated with the temperature probe or a heating element not associated with a temperature probe, can be used to adjust the temperature of the patient interface 2128 and/or the inspiratory tube 2120 to raise the temperature of the inspiratory conduit 2120 and/or the patient interface 2128 above the saturation temperature, thereby reducing the opportunity for unwanted condensation.

In some configurations in which the gases supply 2125 is separate from the heater base unit 2102, the breathing circuit 2123 can include a supply conduit 2132. A gases supply end of the supply conduit 2132 can be configured to connect to an output of the gases supply 2125. A chamber end of the supply conduit 2132 can be configured to connect to an inlet port 2410 of the humidification chamber 2104.

In some configurations, such as those used with a ventilator, the breathing circuit 2123 also can include an expiratory conduit 2122. A user end of the expiratory conduit 2122 can be configured to connect to the patient interface 2128, and a gases supply end of the expiratory conduit 2122 can be configured to connect to a return of the gases supply 2125. The expiratory conduit 2122 can have a temperature probe and/or heating element, as described above with respect to the inspiratory conduit 2120, integrated with it to reduce the opportunity for condensation. Furthermore, the expiratory conduit 2122 need not return exhaled gases to the gases supply 2125. In some configurations, exhaled gases can be passed directly to ambient surroundings or to other ancillary equipment, such as an air scrubber/filter (not shown). The expiratory conduit 2122 may be omitted altogether.

As shown in FIG. 3A, the user ends of the inspiratory conduit 2120 and the expiratory conduit 2122 can be connected to each other via a Y-piece 2124. The Y-piece 2124 can be connected to a patient supply conduit 2126. In some configurations, the patient supply conduit 2126 can include a catheter mount, for example but without limitation. The patient supply conduit 2126 can be connected to the patient interface 2128. The Y-piece 2124 may couple to the patient interface 2128 without the patient supply conduit 2126 intervening. The figure shows the patient supply conduit 2126 may comprise a heater wire. Alternatively the patient supply conduit 2126 may be unheated. In a further configuration the patient supply conduit 2126 may be an unheated, breathable tube.

In use, the humidification chamber 2104 is installed onto a heating plate of the heater plate assembly 2108. The heater plate assembly 2108 heats liquid, such as water, in the humidification chamber 2104 to produce vapor. Dry or relatively dry gases flow from the gases supply 2125, through the supply conduit 2132, and into the humidification chamber 2104 through the inlet port 2410. The gases pass over the liquid in the humidification chamber 2104 and become humidified by the vapor. Humidified gases exit the humidification chamber 2104 through the outlet port 2412 and flow through the inspiratory conduit 2120 to a patient 2101. Gases exhaled by the patient 2101 may be returned to the gases supply 2125 through the expiratory conduit 2122. Any or all of the components of the breathing circuit 2123 can include a heating element, for example, a heating wire 2127, to help maintain the gases at a desired temperature and to reduce the likelihood of significant condensation formation in the conduits.

Before use, an operator, such as medical personnel, will connect the various components to set up the humidification system 2100. Because of the variety of components and number of connections that are made, setup of the humidification system 2100 can be a complex process. In some instances, special training is provided to improve the likelihood of correct setup. The humidification system 2100 can include various features to simplify the setup process and reduce the likelihood of an incorrect setup. For example, components of the humidification system 2100 can include features to provide for easier and more secure connection between components, promote correct connections, and reduce the number of connections needed to be made manually or separately.

Figure 4A:
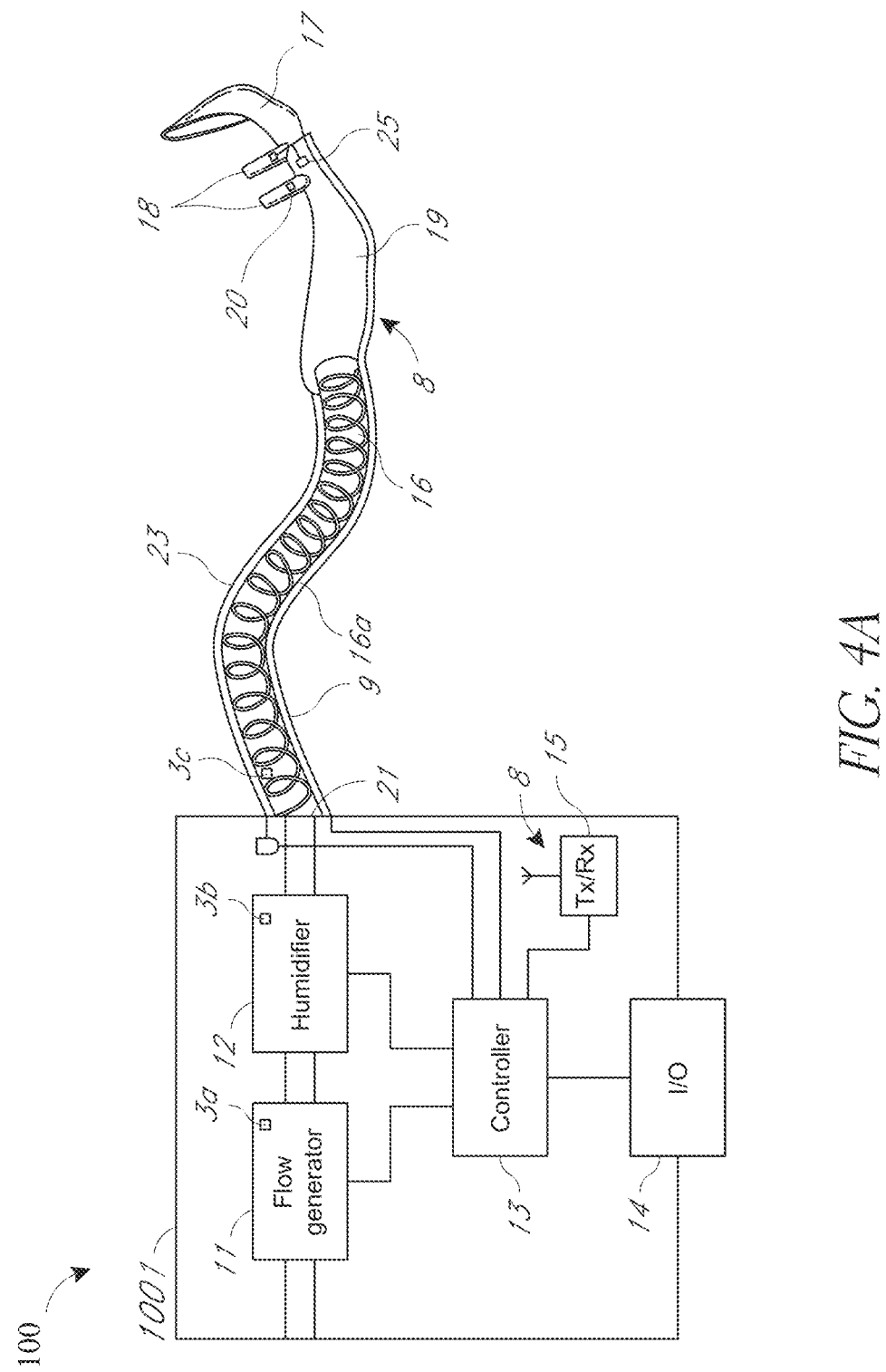
FIG. 4A shows schematically an additional example respiratory therapy system configured to provide a respiratory therapy to a user.
Figure 4B:
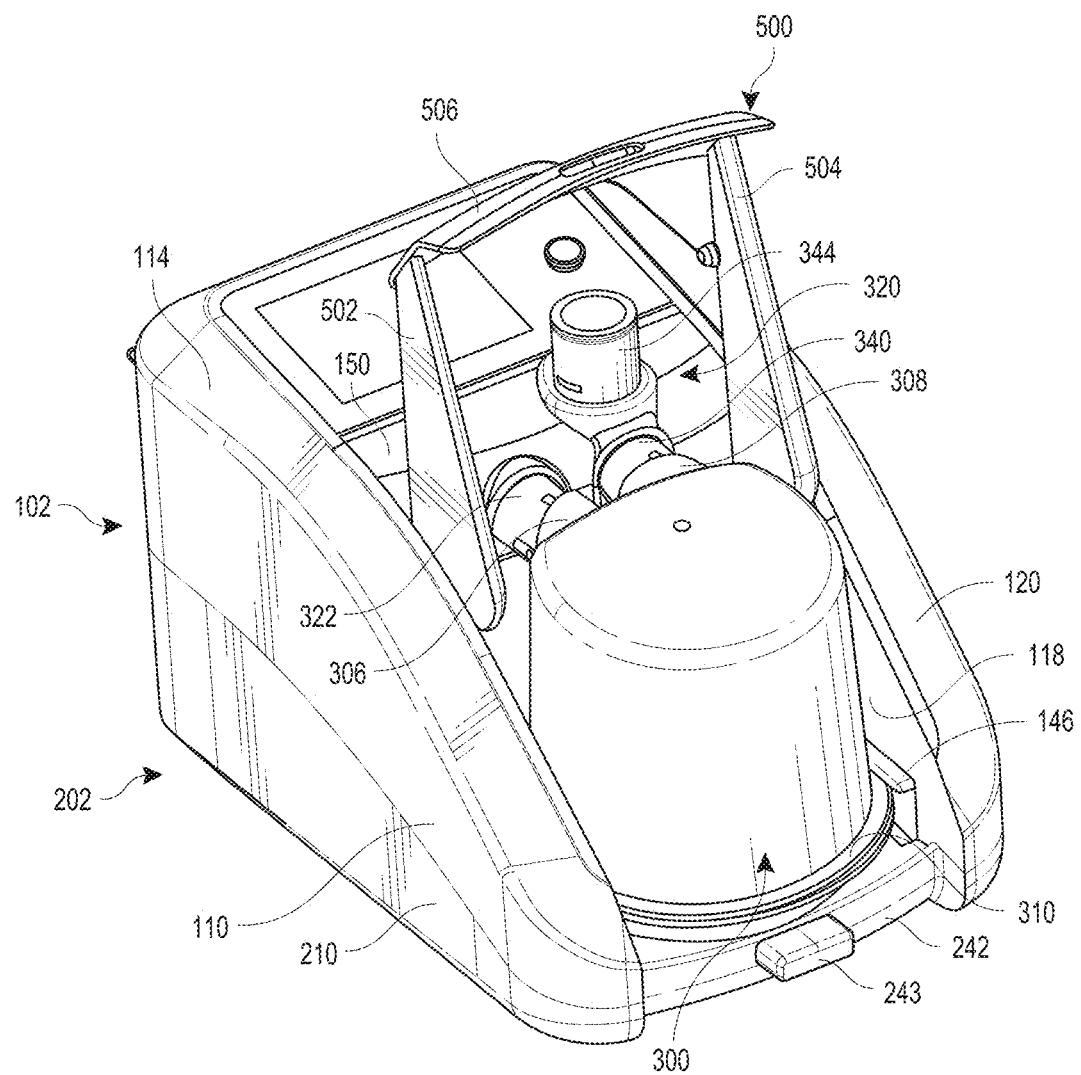
FIG. 4B is a front left perspective view of an example respiratory therapy system with a humidification chamber in position and a raised handle/lever.
Figure 4C:
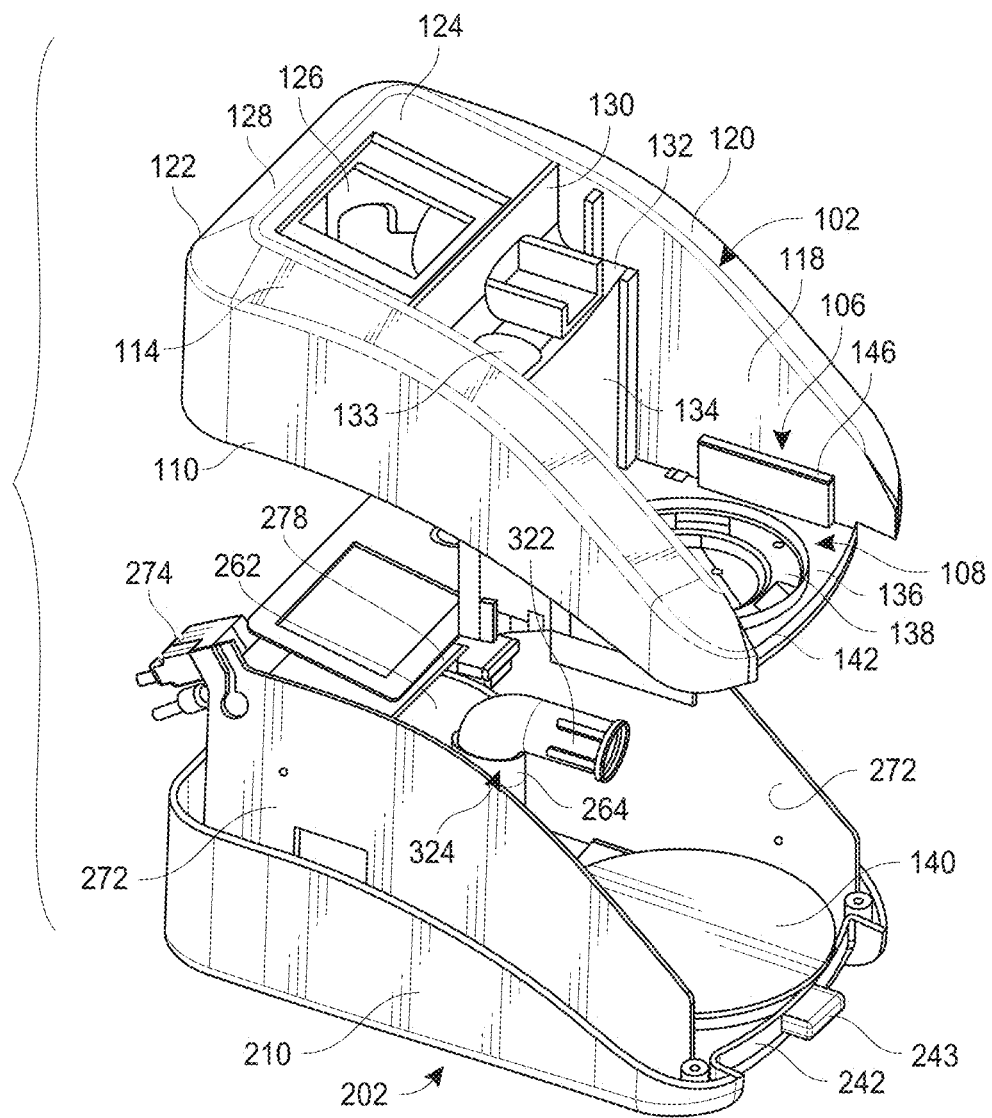
FIG. 4C is an exploded view of upper and lower chassis components of a main housing of the respiratory device of FIG. 2.

A schematic representation of an example respiratory therapy system 100 is provided in FIG. 4A. This system delivers flow therapy e.g. high flow therapy. The interface is preferably an unsealed interface e.g. a nasal cannula that engages the nares of the patient in an unsealed manner. Alternatively the interface may be a tracheal interface having a leak. The respiratory therapy system 100 can include a main device housing 1001. The main device housing 1001 can contain a blower unit 11 that can be in the form of a motor/impeller arrangement, an optional humidifier or humidification chamber 12, a controller 13, and a user interface 14. The user interface 14 can include a display and input device(s) such as button(s), a touch screen, a combination of a touch screen and button(s), or the like. The controller 13 can include one or more hardware and/or software processors and can be configured or programmed to control the components of the apparatus, including but not limited to operating the blower unit 11 to create a flow of gases for delivery to a patient, operating the humidification chamber 12 (if present) to humidify and/or heat the gases flow, receiving user input from the user interface 14 for reconfiguration and/or user-defined operation of the respiratory therapy system 100, and outputting information (for example on the display) to the user. The user can be a patient, healthcare professional, or others.

With continued reference to FIG. 4A, an inspiratory conduit 16 can be coupled to a gases flow outlet 21 in the main device housing 1001 of the respiratory therapy system 10, and be coupled to a patient interface 17, such as a non-sealing interface like a nasal cannula with a manifold 19 and nasal prongs 18. The inspiratory conduit 16 can also be coupled to a face mask, a nasal mask, a nasal pillow mask, an endotracheal tube, a tracheostomy interface, or others.

The gases flow can be generated by the blower unit 11, and may be humidified, before being delivered to the patient via the inspiratory conduit 16 through the patient interface 17. The controller 13 can control the blower unit 11 to generate a gases flow of a desired flow rate, and/or one or more valves to control mixing of air and oxygen or other breathable gas. The controller 13 can control a heating element beneath the humidification chamber 12 to heat the gases to a desired temperature that achieves a desired level of temperature and/or humidity for delivery to the patient. The inspiratory conduit 16 can have a heating element 16a, such as a heater wire, to heat gases flow passing through to the patient. The heating element 16a can also be under the control of the controller 13.

The system 100 can use ultrasonic transducer(s), thermistor(s), pressure sensor(s), temperature sensor(s), humidity sensor(s), or other sensors, in communication with the controller 13, to monitor characteristics of the gases flow and/or operate the system 100 in a manner that provides suitable therapy. The gases flow characteristics can include gases' concentration, flow rate, pressure, temperature, humidity, or others. The sensors 3a, 3b, 3c, 20, 25, such as flow, temperature, humidity, and/or pressure sensors, can be placed in various locations in the main device housing 1001, the inspiratory conduit 16, and/or the patient interface 17. The controller 13 can receive output from the sensors to assist it in operating the respiratory therapy system 100 in a manner that provides suitable therapy, such as to determine a suitable target temperature, flow rate, and/or pressure of the gases flow. Providing suitable therapy can include meeting a patient's inspiratory demand.

The system 100 can include a wireless data transmitter and/or receiver, or a transceiver 15 to enable the controller 13 to receive data signals 8 in a wireless manner from the operation sensors and/or to control the various components of the system 100. Additionally, or alternatively, the data transmitter and/or receiver 15 can deliver data to a remote server or enable remote control of the system 100. The system 100 can include a wired connection, for example, using cables or wires, to enable the controller 13 to receive data signals 8 from the operation sensors and/or to control the various components of the system 10.

The respiratory therapy system 100 can be used in a variety of applications. For instance, the respiratory therapy system 100 can be used in any of the following respiratory devices: a continuous positive air pressure (CPAP) device, a ventilator, a humidifier, a high flow therapy device, a surgical humidifier (for example, an insufflator), combinations of the same, or the like.

CPAP treatment of obstructive sleep apnea involves the delivery of pressurized, breathable gas, usually air, to a user's airways using an inspiratory conduit and a patient interface, such as a mask. The gas pressures employed for CPAP typically range from about 4 cm H2O to about 28 cm H2O at flow rates of up to about 180 L/min (measured at the patient interface), depend upon the requirements of the user. The pressurized gas acts as a pneumatic splint for the airway of the user. As such, the pressurized gas reduces the likelihood of collapsing of the airway.

FIGS. 4A through 4D show an example respiratory device of the respiratory therapy system 100 having a main housing 1001, which can implement the features described herein. The main housing 1001 has a main housing upper chassis 102 and a main housing lower chassis 202. The main housing upper chassis 102 has a peripheral wall arrangement 106 (see FIG. 4C). The peripheral wall arrangement defines a humidifier or humidification chamber bay 108 for receipt of a removable humidification chamber 300. The removable humidification chamber 300 contains a suitable liquid such as water for humidifying gases that can be delivered to a patient.

In the form shown, the peripheral wall arrangement 106 of the main housing upper chassis 102 can include a substantially vertical left side outer wall 110 that is oriented in a front-to-rear direction of the main housing 1001, a substantially vertical left side inner wall 112 that is oriented in a front-to-rear direction of the main housing 1001, and an interconnecting wall 114 that extends between and interconnects the upper ends of the left side inner and outer walls 110, 112. The main housing upper chassis 102 can further include a substantially vertical right side outer wall 116 that is oriented in a front-to-rear direction of the main housing 1001, a substantially vertical right side inner wall 118 that is oriented in a front-to-rear direction of the main housing 1001, and an interconnecting wall 120 that extends between and interconnects the upper ends of the right side inner and outer walls 116, 118. The interconnecting walls 114, 120 are angled towards respective outer edges of the main housing 1001, but can alternatively be substantially horizontal or inwardly angled.

The main housing upper chassis 102 can further include a substantially vertical rear outer wall 122. An upper part of the main housing upper chassis 102 can include a forwardly angled surface 124. The surface 124 can have a recess 126 for receipt of a display and user interface module 14. The display can be configured to display characteristics of sensed gas(es) in real time. An interconnecting wall 128 can extend between and interconnect the upper end of the rear outer wall 122 and the rear edge of the surface 124.

A substantially vertical wall portion 130 can extend downwardly from a front end of the surface 124. A substantially horizontal wall portion 132 can extend forwardly from a lower end of the wall portion 130 to form a ledge. A substantially vertical wall portion 134 can extend downwardly from a front end of the wall portion 132 and terminate at a substantially horizontal floor portion 136 of the humidification chamber bay 108. The left side inner wall 112, right side inner wall 118, wall portion 134, and floor portion 136 together can define the humidification chamber bay 108. The floor portion 136 of the humidification chamber bay 108 can have a recess 138 to receive a heater arrangement such as a heater plate assembly 140 or other suitable heating mechanisms for heating liquid in the humidification chamber 300 for use during a humidification process.

The main housing lower chassis 202 can be attachable to the upper chassis 102, either by suitable fasteners or integrated attachment features such as clips for example. The main housing lower chassis 202 can include a substantially vertical left side outer wall 210 that is oriented in a front-to-rear direction of the main housing 1001 and is contiguous with the left side outer wall 110 of the upper chassis 102, and a substantially vertical right side outer wall 216 that is oriented in a front-to-rear direction of the main housing 1001 and is contiguous with the right side outer wall 116 of the upper chassis 102. The main housing lower chassis 202 can further include a substantially vertical rear outer wall 222 that is contiguous with the rear outer wall 122 of the upper chassis 102.

The lower housing chassis 202 can have a lip 242 that is contiguous with the lip 142 of the upper housing chassis 102, and also forms part of the recess for receiving the handle portion 506 of the lever 500. The lower lip 242 can include a forwardly directed protrusion 243 that acts as a retainer for the handle portion 506 of the lever 500. Instead of the lever 500, the system can have a spring loaded guard to retainer the humidification chamber 300 in the humidification chamber bay 108.

An underside of the lower housing chassis 202 can include a bottom wall 230. Respective interconnecting walls 214, 220, 228 can extend between and interconnect the substantially vertical walls 210, 216, 222 and the bottom wall 230. The bottom wall 230 can include a grill 232 comprising a plurality of apertures to enable drainage of liquid in case of leakage from the humidification chamber 300 (for example from spills). The bottom wall 230 additionally can include elongated forward-rearward oriented slots 234. The slots 234 can additionally enable drainage of liquid in case of leakage from the humidification chamber 300, without the liquid entering the electronics housing. In the illustrated configuration, the slots 234 can be wide and elongate relative to the apertures of the grill 232 to maximize the drainage of liquid.

The lower chassis 202 can have a motor recess 250 for receipt of a motor and/or sensor module. The motor and/or sensor module may be non-removable from the main housing 1001. The motor and/or sensor module can be removable or not removable from the main housing 1001 (not shown). All of the walls and the ceiling 262 can be continuous, gas impermeable, and unbroken other than the gases flow passage. Therefore, the entire motor recess 250 can be gas impermeable and unbroken, other than the gases flow passage.

The motor and/or sensor module can be insertable into the recess 250 and attachable to the lower chassis 202. Upon insertion of the motor and/or sensor module into the lower chassis 202, the gases flow passage tube 264 can extend through the downward extension tube 133 and be sealed by the soft seal.

The humidification chamber 300 can be fluidly coupled to the apparatus 10 in a linear slide-on motion in a rearward direction of the humidification chamber 300 into the chamber bay 108, from a position at the front of the housing 1001 in a direction toward the rear of the housing 1001. A gases outlet port 322 can be in fluid communication with the motor.

The humidification chamber gases inlet port 306 can be complementary with the gases outlet port 322, and the humidification chamber gases outlet port 308 can be complementary with the gases inlet port 340. The axes of those ports can be parallel to each other to enable the humidification chamber 300 to be inserted into the chamber bay 108 in a linear movement. The respiratory device can have air and oxygen (or alternative auxiliary gas) inlets in fluid communication with the motor to enable the motor to deliver air, oxygen (or alternative auxiliary gas), or a mixture thereof to the humidification chamber 300 and thereby to the patient.

Figure 4D:
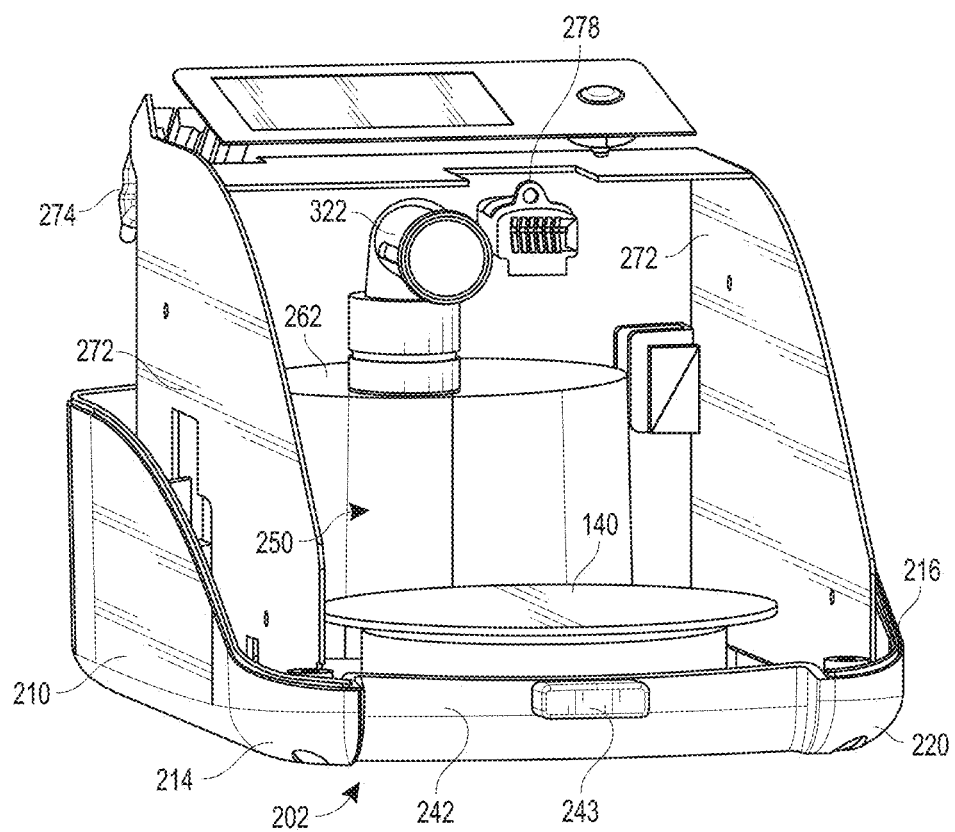
FIG. 4D is a front left side perspective view of the lower chassis of the main housing showing a heater plate assembly and other internal components.

As shown in FIG. 4D, the lower housing chassis 202 can include suitable electronics boards 272, such as sensing circuit boards. The electronics boards can be positioned adjacent respective outer side walls 210, 216 of the lower housing chassis 202. The electronics boards 272 can contain, or can be in electrical communication with, suitable electrical or electronics components, such as but not limited to microprocessors, capacitors, resistors, diodes, operational amplifiers, comparators, and switches. Sensors can be used with the electronic boards 272. Components of the electronics boards 272 (such as but not limited to one or more microprocessors) can act as the controller 13 of the apparatus.

One or both of the electronics boards 272 can be in electrical communication with the electrical components of the apparatus 100, including the display unit and user interface 14, motor, valve and the heater plate assembly 140, to operate the motor to provide the desired flow rate of gases, operate the humidification chamber 12 to humidify and heat the gases flow to an appropriate level, and supply appropriate quantities of oxygen (or quantities of an alternative auxiliary gas) to the gases flow.

The electronics boards 272 can be in electrical communication with a connector arrangement 274 projecting from the rear wall 122 of the upper housing chassis 102. The connector arrangement 274 may be coupled to an alarm, pulse oximetry port, and/or other suitable accessories. The electronics boards 272 can also be in electrical communication with an electrical connector 276 that can also be provided in the rear wall 122 of the upper housing chassis 102 to provide mains or battery power to the components of the device.

As mentioned above, operation sensors, such as flow, temperature, humidity, and/or pressure sensors can be placed in various locations in the respiratory device, the inspiratory conduit 16, and/or cannula 17. The electronics boards 272 can be in electrical communication with those sensors. Output from the sensors can be received by the controller 13, to assist the controller 13 to operate the respiratory therapy system 100 in a manner that provides optimal therapy, including meeting inspiratory demand when the system is a high flow therapy system.

As outlined above, the electronics boards 272 and other electrical and electronic components can be pneumatically isolated from the gases flow path to improve safety. The sealing also prevents water ingress.

Another example of a respiratory therapy system 100 in accordance with this disclosure comprises a high flow therapy system. High flow therapy as discussed herein is intended to be given its typical ordinary meaning as understood by a person of skill in the art, which generally refers to a respiratory assistance system delivering a targeted flow of humidified respiratory gases via an intentionally unsealed patient interface with flow rates generally intended to meet or exceed inspiratory flow of a patient. Typical patient interfaces include, but are not limited to, a nasal or tracheal patient interface. Typical flow rates for adults often range from, but are not limited to, about fifteen liters per minute (LPM) to about seventy liters per minute or greater. Typical flow rates for pediatric patients (such as neonates, infants and children) often range from, but are not limited to, about one liter per minute per kilogram of patient weight to about three liters per minute per kilogram of patient weight or greater. High flow therapy can also optionally include gas mixture compositions including supplemental oxygen and/or administration of therapeutic medicaments. High flow therapy is often referred to as nasal high flow (NHF), humidified high flow nasal cannula (HHFNC), high flow nasal oxygen (HFNO), high flow therapy (HFT), or tracheal high flow (THF), among other common names. The flow rates used to achieve "high flow" may be any of the flow rates listed below. For example, in some configurations, for an adult patient 'high flow therapy' may refer to the delivery of gases to a patient at a flow rate of greater than or equal to about 10 litres per minute (10 LPM), such as between about 10 LPM and about 100 LPM, or between about 15 LPM and about 95 LPM, or between about 20 LPM and about 90 LPM, or between 25 LPM and 75 LPM, or between about 25 LPM and about 85 LPM, or between about 30 LPM and about 80 LPM, or between about 35 LPM and about 75 LPM, or between about 40 LPM and about 70 LPM, or between about 45 LPM and about 65 LPM, or between about 50 LPM and about 60 LPM. In some configurations, for a neonatal, infant, or child patient 'high flow therapy' may refer to the delivery of gases to a patient at a flow rate of greater than 1 LPM, such as between about 1 LPM and about 25 LPM, or between about 2 LPM and about 25 LPM, or between about 2 LPM and about 5 LPM, or between about 5 LPM and about 25 LPM, or between about 5 LPM and about 10 LPM, or between about 10 LPM and about 25 LPM, or between about 10 LPM and about 20 LPM, or between about 10 LPM and 15 LPM, or between about 20 LPM and 25 LPM. A high flow therapy apparatus with an adult patient, a neonatal, infant, or child patient, may deliver gases to the patient at a flow rate of between about 1 LPM and about 100 LPM, or at a flow rate in any of the sub-ranges outlined above. The flow therapy apparatus 10 can deliver any concentration of oxygen (e.g., FdO2), up to 100%, at any flowrate between about 1 LPM and about 100 LPM. In some configurations, any of the flowrates can be in combination with oxygen concentrations (FdO2s) of about 20%-30%, 21%-30%, 21%-40%, 30%-40%, 40%-50%, 50%-60%, 60%-70%, 70%-80%, 80%-90%, and 90%-100%. In some combinations, the flow rate can be between about 25 LPM and 75 LPM in combination with an oxygen concentration (FdO2) of about 20%-30%, 21%-30%, 21%-40%, 30%-40%, 40%-50%, 50%-60%, 60%-70%, 70%-80%, 80%-90%, and 90%-100%. In some configurations, the flow therapy apparatus 10 may include safety thresholds when operating in manual mode that prevent a user from delivering to much oxygen to the patient.

High flow therapy may be administered to the nares of a user and/or orally, or via a tracheostomy interface. High flow therapy may deliver gases to a user at a flow rate at or exceeding the intended user's peak inspiratory flow requirements. The high flow therapy may generate a flushing effect in the nasopharynx such that the anatomical dead space of the upper airways is flushed by the high incoming gases flow. This can create a reservoir of fresh gas available for each and every breath, while minimizing re-breathing of nitrogen and carbon dioxide. Meeting inspiratory demand and flushing the airways is additionally important when trying to control the patient's FdO2. High flow therapy can be delivered with a non-sealing patient interface such as, for example, a nasal cannula. The nasal cannula may be configured to deliver breathing gases to the nares of a user at a flow rate exceeding the intended user's peak inspiratory flow requirements.

The term "non-sealing patient interface" as used herein can refer to an interface providing a pneumatic link between an airway of a patient and a gases flow source (such as from flow generator 11) that does not completely occlude the airway of the patient. Non-sealed pneumatic link can comprise an occlusion of less than about 95% of the airway of the patient. The non-sealed pneumatic link can comprise an occlusion of less than about 90% of the airway of the patient. The non-sealed pneumatic link can comprise an occlusion of between about 40% and about 80% of the airway of the patient. The airway can include one or more of a nare or mouth of the patient. For a nasal cannula the airway is through the nares.

To prevent "rainout" (the formation of condensation in the breathing circuit), the inspiratory conduit may be insulated and/or heated (for example by a heater optionally comprising a heater wire) to at least minimise the temperature drop of the breathable gas flowing along the inspiratory limb.

However, all or part of the one or more breathing limbs may not be heated. For example, the expiratory limb of the breathing circuit may not be heated, as there is no benefit to the patient and the redelivery of humidified air to the ventilator can cause damage. Accordingly, cooling water vapour in the gases can condense in the expiratory limb. Such condensate in the expiratory limb can run into the ventilator causing damage to the ventilator.

An aspect of the present invention disclosure is to utilize at least one signal associated with or indicative of gases flow and/or pressure in a respiratory conduit, for example an inspiratory conduit, expiratory conduit, or shared inspiratory and expiratory conduit, for the detection of presence of liquid water in the respiratory conduit, and to use that detection to generate an output control signal that is used to control a respiratory therapy system 100, such as described above with respect of the FIGS. 1 to 4D for example, accordingly. The detection can be used in any respiratory therapy system configured to deliver breathable gases to a user. The determination that liquid water is present in the respiratory conduit, may be used to better control the operation settings of components, such as heaters or humidifiers etc, of the respiratory therapy system 100, so as to reduce the presence of liquid water. For example, upon determination of the presence of liquid water in the respiratory conduit, by increasing the temperature within the respiratory conduit, for example by controlling an operation setting of the heater, a portion of the liquid water will transition into gas phase and exit the respiratory conduit with the other gases, thereby reducing the volume of liquid water in the respiratory conduit. In order not to put unnecessary strain on the system components, and to keep the overall system power consumption relatively low, it may be desired to maintain the higher temperature in the respiratory conduit only for a temporary time period, at least until the presence of liquid water may no longer be detected.

If liquid condensate e.g. liquid water, is detected, the heater wire is controlled to heat to a higher power e.g. maximum power for a period of time to try and evaporate the liquid condensate. Alternatively or additionally the heater plate power may be controlled to be lowered, or may be switched off. The heater plater power may be lowered or may be switched off for a period of time. The heater plate may be controlled to a reduced power or switched off in order to reduce humidity output. For example the heater plate may be switched off to reduce humidity output and the heater wire may be heated to a maximum power in order to evaporate the liquid condensate.

In a respiratory device or system that includes a blower, the heater plate and respiratory conduit heater may be controlled as described earlier. In addition or alternatively the blower may be controlled to be powered to a maximum motor speed for a period of time in order to at least partially dry out the respiratory conduit i.e. cause the liquid condensate to evaporate or be moved along the respiratory conduit.

In other words, the system is configured such that the controller generates a response if liquid condensate is detected, the response being used to control one or more components of the system.

The respiratory device or system may comprise a display, such as a touch screen display for example. If liquid water is detected a message or alarm may be generated and displayed on the display. The alarm could comprise any one or more of a visual, audible, or tactical alarm. An alarm message or alarm image may be generated and presented on the display, in response to the display receiving one or more control signal(s) from the controller when liquid condensate is detected.

The respiratory device or system may be operative according to any one or more of the following control protocols:

The blower speed is increased, the heater plate power is unchanged and heater wire power is increased. The respiratory conduit heater wire power may be increased to a maximum and the blower speed may be increased above a threshold. The threshold is sufficient to promote drying of the tube. The combination of heater wire maximum power and blower speed above a threshold may help to dry the respiratory conduit and remove the condensate by evaporation.

The blower speed is increased, the heater plate power is reduced or switched off and the heater wire power is increased. For example, the heater wire power may be increased to a maximum. The blower speed may be increased to above the threshold. The combination of heater wire maximum power and blower speed above a threshold may help to dry the tube and remove the condensate by evaporation. The heater plate may be switched off in order to reduce the humidity output.

The heater plate is switched off and the respiratory conduit heater wire power is increased e.g. to a max, and the blower is cycled between a first flow rate and a second flow rate. The heater wire being maximum and the blower being cycled also may help to evaporate the condensate.

The user interface may be provided with instructions, for example a instruction message or sequence of messages, comprising text and/or video and/or a series of images illustrating how to disconnect the breathing circuit and drain at least some of the liquid condensate.

When gases travelling through a respiratory conduit pass liquid water partially obstructing the respiratory conduit, pressure and/or flow waves may form at the water gas interface as a result of the gases relative movement between the water and the gases. The pressure and/or flow waves may form a gurgling or bubbling or other irregular sound. The pressure and/or flow waves have an impact on the flow and/or pressure of the gases travelling through the respiratory conduit, thereby forming perturbations, such as spikes, in the associated flow and/or pressure data due to the water accumulated in the respiratory conduit.

The disclosure is based on the realisation of the possibility of utilizing these perturbations to detect water present in the respiratory conduit, of a respiratory therapy system 100.

Hence, in general, the present disclosure provides means for detecting water in a respiratory conduit based at least in part on the associated perturbations.

We have found that gases flow and/or pressure patterns detected from water accumulated in the respiratory conduits may be distinguished from those patterns generated by, or indicative of snoring.

We have further found that snoring is associated with a higher perturbation frequency than that associated with water accumulation of the respiratory conduit. Furthermore, snoring patterns do not contain the short duration high amplitude peaks or spikes that we have determined may be observed in the flow and/or pressure patterns associated with water accumulation in the respiratory conduit. Taking these findings into consideration, in some configurations it is possible to distinguish perturbations resulting from snoring from those being associated with water accumulation in the respiratory conduit, and to control an aspect of a respiratory therapy system 100 accordingly.

One method of detecting water associated perturbations may be to compare a measured gases flow of the respiratory conduit to a reference gases flow in the respiratory conduit.

Another method of detecting water associated perturbations may be to compare a measured gases pressure in the respiratory conduit to a reference gases pressure of the respiratory conduit.

Hence, it is possible to detect the gases flow and/or pressure related perturbations of the first signal by knowing the reference gases flow or pressure of the respiratory conduit. This "reference" gases flow or pressure depends on the configuration of the respiratory therapy system setup, as will be further elucidated below.

Figure 5:
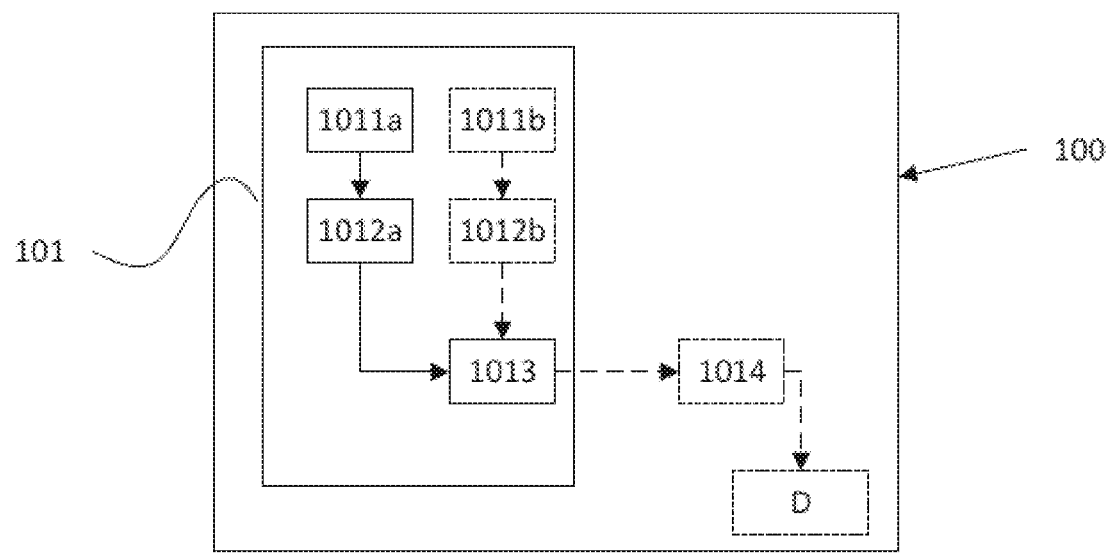
FIG. 5 is a schematic view of a respiratory therapy system according to an embodiment in accordance with this disclosure.

With reference to FIG. 5, a system 100 for detection of accumulation of water in a respiratory conduit for use in respiratory treatment of a patient is provided. The system 100 may be supplementary to, or comprise an integral part of a respiratory therapy system. FIG. 5 is a schematic view of any of the respiratory therapy systems 100 described above, and is included for clarity of the description that follows.

As mentioned previously, a respiratory therapy system 100 may typically comprise a flow generator, humidifier, controller, a respiratory conduit forming a breathing gases delivery conduit, which may or may not be heated, and a patient interface configured to provide a sealed, or un-sealed fluid interface with the patient so that breathing gases are delivered to one or more of the patient's respiratory passages. Together these may form a breathing gases delivery flow path between the flow generator and the patient. Sensors may be provided at various locations in the system to measure properties of the breathing gases, and generate sensor signals which are used by the controller to control properties of the breathing gases flow, such as any one or more of pressure, flow, temperature and humidity. Optionally, the respiratory therapy system 100 may comprise an expiratory conduit configured to transport expired breathing gases from the patient.

The system 100 comprises a controller 1011. The controller 1011 may comprise the controller of the respiratory therapy system, or one or more separate controllers. The controller 101 may typically comprise one or more microprocessors controlled by suitable hardware and software.

The controller 1011 is configured to retrieve 1011a at least one first signal associated with a gases flow and/or pressure in the respiratory conduit. The controller 1011 is further configured to determine 1012a a measure of at least one first parameter associated with gases flow and/or pressure related perturbations for at least one portion of the retrieved at least one first signal. Furthermore, the controller 1011 is configured to determine 1013 the presence of liquid water in the respiratory conduit based at least in part on the measure(s) of the at least one first parameter meeting a first threshold.

It should be appreciated that the liquid water in this regard does not pertain to the water droplets or water vapour present in the respiratory conduit, in use. Instead, the liquid water refers to a collection or accumulation of liquid water present in the respiratory conduit, that may for example be the result of condensation of the gases flowing through the respiratory conduit, in use. When the collection or accumulation of liquid water has reached a volume sufficient to at least locally partially obstruct the respiratory conduit, the detectable flow perturbations and/or pressure perturbations may form. These perturbations may in some configurations be recognisable by a gurgling or bubbling or other distinctive or detectable sound.

The expression "meeting" a threshold should be understood as satisfying or fulfilling a threshold. It should be appreciated that the format of and or calculations leading up to the derived measure, forms the point of reference used to define the threshold.

As an example, consider a case where the measure relates to a probability score, where said probability score is calculated such that it may only attain a value between or equal to 0 and 1, where 1 indicates that liquid water is present in the tube and 0 indicates that no liquid water is present in the tube. Let's assume that the actual probability score is 0.8, and that the threshold is set to 0.6, indicating that all probability scores equal to or above this number indicates the presence of liquid water. Then in this case the 0.8 probability score meets the water presence threshold as the probability score of 0.8 is above the threshold of 0.6.

However, by modifying the prerequisites, so that now 0 indicates that liquid water is present in the tube and 1 indicates that no liquid water is present in the tube, the calculations need to be modified. This would have an impact on the threshold, which with all other conditions constant, would be redefined as 0.4 (i.e. 1–0.6), so that probability scores being equal to or less would indicated liquid water present in the respiratory conduit. With all other conditions constant, the actual probability score would be recalculated to 0.2 (i.e. 1–0.8). Hence, in this scenario the probability score would meet the threshold, since 0.2 is less than the threshold.

Hence, in some configurations, when the measure and associated threshold relates to a value, depending on the underlying calculations and prerequisites therefor the expression "meeting" may be "being higher than", "being equal to or higher than", "being lower than", or "being equal to or lower than", depending on the preconditions set.

The same underlying interpretation of "meeting", is applicable when the measure and/or threshold relates to a function, as the requirement for meeting the threshold is dependent on the underlying calculations and prerequisites therefor. In some configurations the controller may comprise an input for receiving a first signal from an external device, for example a sensor operatively coupled to the respiratory conduit, in use. The associated sensor may be a flow sensor, wherein the first signal relates to a flow signal. Alternatively, or additionally, the associated sensor may be a pressure sensor, wherein the first signal relates to a pressure signal. Such sensors may be configured to measure flow or pressure directly, or to measure one or more other properties of the gases flow sufficient that the, or a further controller can determine flow or pressure from the sensor output.

The controller 1011 may comprise a processor and an optional memory for executing software executable instructions stored on the memory to perform the associated functionality disclosed herein. In some configurations the controller 1011 may be provided as a stand-alone unit. Alternatively, the controller may be integrated within a device or controller of the respiratory therapy system/device, for example a flow generator or the flow generator controller. In some configurations at least some of the software executable instructions presented herein could be executed on two or more processors. For example, a first processor may be used to retrieve at least the first signal, and determining a measure of at least one first parameter, while a second processor may determine the presence of liquid water. In some configurations, the associated processors may be operatively coupled. Additionally, or alternatively, the information required as input for executing, by a processor, a particular software executable instruction may be accessed from a memory, optionally operatively coupled to another processor executing other associated software instructions to provide said input.

Gases Flow Perturbations and/or Pressure Perturbations

Gases flow perturbations and/or pressure perturbations associated with a frequency higher than that of the breathing pattern may be an indication of the presence of liquid water in the respiratory conduit. In general, the perturbations, for example spikes, are short in duration. The perturbations may alternatively or additionally have a noticeable amplitude and/or intensity.

As a non-limiting example, perturbations may be associated with perturbation pressure amplitude of about $2 cmH_2O$ and/or a perturbation flow rate amplitude 3 L/min in a relatively short period of time, for example 50 ms. In other words, the perturbations may have a typical excursion of 2 cmH$_2$O in the pressure trace and 3 L/min in the flow trace in a very short period, for example 50 ms.

The pressure related perturbations may be detectable from a pressure signal, for example being output by a by a gases pressure sensor operatively coupled to the respiratory conduit, in use.

Here, the expression "operatively coupled", which is clear to the skilled person, establishes a link, for example a functional link between two components. The expression means that the associated two components are at least to some extent mutually compatible, and working together in some way, or that one component benefits the other component in some way. For example, "operatively coupled" may comprise arranging one component in relation to the other component to allow for an exchange of information, for example a physical phenomenon, associated with one of the components to the other. In some configurations, the expression operatively coupled implies arranging the two components in a way that allows for an exchange of information transfer of information between the two components. For example, "operatively coupled" may comprise arranging a first component to a second component in a direct or indirect manner, for example via other components therebetween. Additionally or alternatively, the expression "operatively coupled" may be realized by arranging two components so as to form a physical communication, such as a fluid communication, or electrical communication, therebetween.

The flow related perturbations may be detectable from a flow signal, for example being output by a gases flow sensor operatively coupled to the respiratory conduit, in use.

Reference Signal

A number of techniques may be used for detection of the irregularities in the flow and/or pressure signals caused by water accumulation in the respiratory conduit.

One way of identifying flow and/or pressure associated perturbations is to compare the first signal(s) to a calculated or predetermined reference, being a reference signal indicative of a flow or pressure in the respiratory conduit, or an anticipated flow or pressure in the respiratory conduit.

To this end the controller may be configured to identify the gases flow perturbations and/or pressure perturbations for the associated portion of the retrieved at least one first signal based at least in part on a comparison between that at least one portion of the retrieved signal and a reference signal.

In some configurations the controller is configured to identify the associated portion(s) of the at least one first signal(s) that comprise the associated gases flow perturbations and/or pressure perturbations based at least in part on the comparison, whereby the determination of measure(s) may be directed only to the portions of the first signal identified to comprise gases flow perturbations and/or pressure perturbations. This targeted approach of determining measure(s) reduces the computational load on the controller, since signal portions not associated with gases flow perturbations and/or pressure perturbations may be discarded.

In the time domain, the morphology of the perturbations may be compared to at least one previously selected template acting as a reference.

The separation between patterns that can represent excessive water in the tube from normal breathing patterns can be done using a machine learning algorithm, where examples of positive and negative patterns are used to train and optimise the separation between the two classes.

The reference may be associated with an anticipated gases flow and/or pressure of an identical respiratory conduit with no accumulated water therein.

In some configurations the anticipated gases flow and/or pressure may depend on a gases flow and/or pressure associated profile or setting of an active operation mode of the respiratory apparatus, for example flow generator, operatively connected to the respiratory conduit. When in the active operation mode, the respiratory therapy apparatus is actively delivering breathing gas through the breathing gas delivery flow path.

In some configurations the anticipated gases flow and/or pressure of the respiratory conduit may be based at least in part on a known total gases flow and/or pressure delivered from the respiratory therapy apparatus into the respiratory conduit in response to the active operation mode selected on the respiratory therapy apparatus.

In some configurations, the anticipated gas flow and/or pressure of the respiratory conduit may be based at least in part on a known total gases flow and/or pressure delivered from the respiratory therapy apparatus into the respiratory conduit before and after one or more gases flow and/or pressure related perturbations. As such, the anticipated gas flow and/or pressure may include an interpolation using the known flow and/or pressure delivered from the respiratory therapy apparatus before and after one or more gases flow and/or pressure related perturbations.

The total gases flow produced by the respiratory therapy apparatus in response to an active operation mode of the same may be hereinafter be referred to as "raw flow". The raw flow may be derived from measured flow data, for example by means of a flow sensor operatively coupled to the respiratory therapy apparatus.

In some configurations the anticipated gases flow and/or pressure may further depend on anticipated leaks between the respiratory apparatus and the patient.

Hence, in some configurations the anticipated gases flow and/or pressure may be the result of subtracting the flow associated with anticipated leaks from the raw flow. This may be the effective flow delivered to the patient.

Alternatively, the anticipated gases flow and/or pressure of the respiratory conduit may relate to an estimated total gases flow and/or pressure delivered from the respiratory therapy apparatus into the respiratory conduit in response to the active operation mode or gases flow and/or pressure associated profile or setting of the respiratory therapy system/apparatus.

The estimated total gases flow produced by the respiratory therapy system/apparatus in response to an active operation mode of the same may be hereinafter be referred to as "estimated raw flow".

In some configurations, considering anticipated leaks, the anticipated gases flow and/or pressure may be the result of subtracting the flow associated with anticipated leaks from the estimated raw flow.

Alternatively, or additionally the anticipated gases flow and/or pressure may depend on an anticipated patient breathing pattern in response to the active operation mode, and/or the associated gases flow and/or pressure associated profile or setting of the respiratory therapy system/apparatus. The anticipated patient breathing pattern may be derived by the controller based at least in part on the sensor signals provided by the one or more sensors. An anticipated patient breathing pattern may be determined by past or historic data, for example a mean breathing pattern profile (represented by the flow and/or pressure data). This mean breathing pattern profile may be patient specific, by using the patients flow/ pressure data from earlier in the session or previous sessions. Alternatively, it can be a generic breathing profile. Typically a breathing pattern is composed of a first portion being an inspiration portion, and a second portion being an expiration portion.

It should be noted that even if water is accumulated in the respiratory conduit, gases flow and/or pressure associated perturbations may not be detectable at all times. For example, physically moving the respiratory conduit position can cause the accumulated water to move or spread in the respiratory conduit, resulting in the perturbation associated bubbling or gurgling to be less prominent or stop, or at least not be detected accurately.

Figure 6:
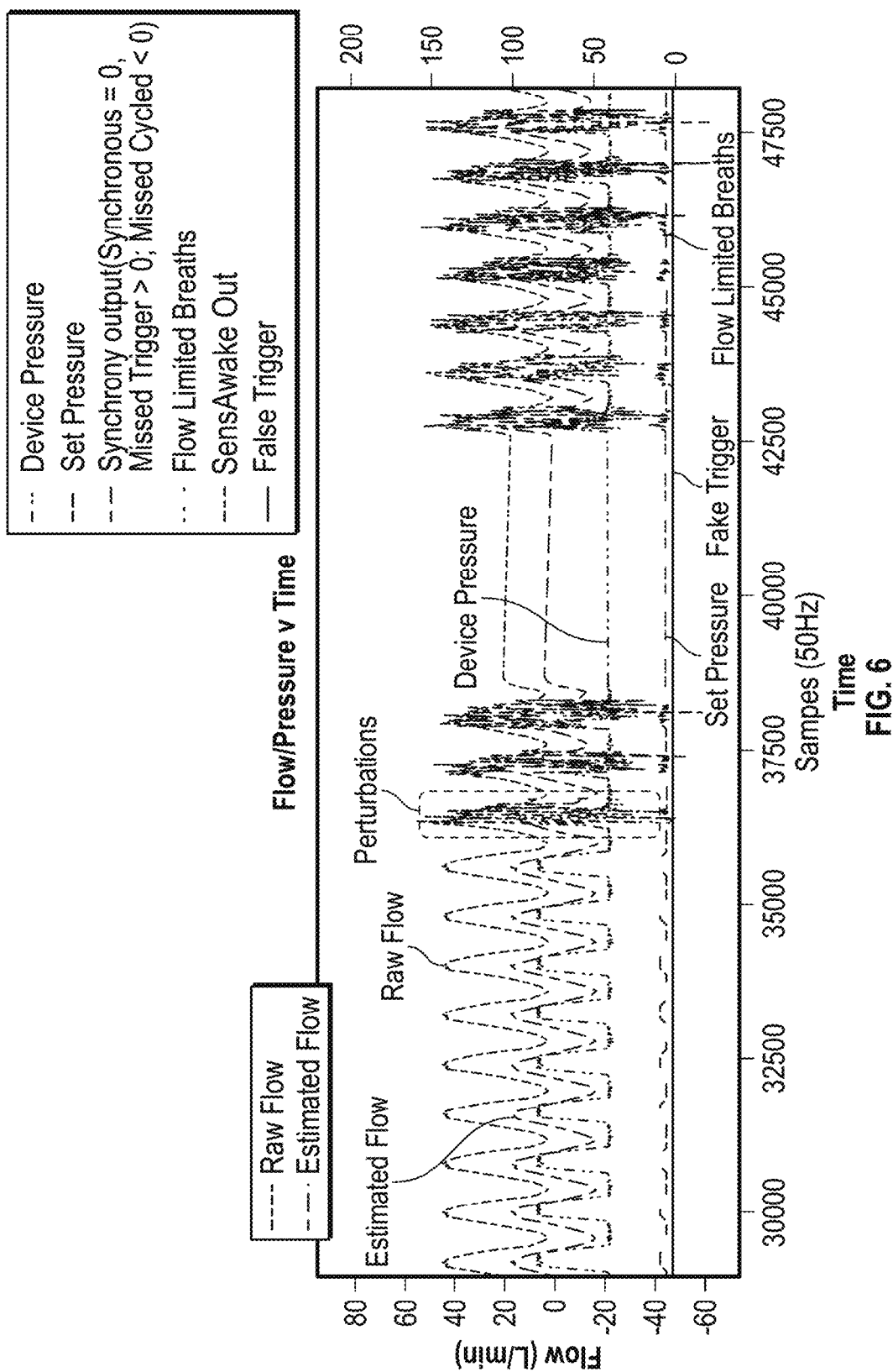
FIG. 6 is a graphical representation showing an example of intermittent stages of perturbations found in gases flow and pressure signals in a respiratory conduit.

FIG. 6 is a graphical representation showing intermittent stages of perturbations found in gases flow and pressure signals in a respiratory conduit when water is accumulated therein. In FIG. 6, the raw flow signal, i.e. the total gases flow produced by the respiratory therapy apparatus, is shown in conjunction with the estimated flow signal referring to the anticipated gases flow being the raw flow subtracted with the anticipated leaks. Moreover, an anticipated pressure signal is also shown. For the purpose of the terminology used throughout the present specification, the raw flow signal, the estimated flow signal, and pressure signal each form respective examples of a first signal. As may be observed from FIG. 6, the temporal portions of the three signals up until approx. time index 36000 shows a rather laminar appearance with no rapid frequency perturbations. In this non-perturbative temporal segment the estimated flow and raw flow may be seen as sinusoidal, whereas the pressure signal in FIG. 6 is similar to a periodic square wave, so as to deliver a constant pressure during the inspiratory and/or expiratory phases of the patient breathing patterns. Each of the respective first signals form a respective base frequency in this laminar, non-perturbative temporal region. In this non-perturbative temporal region, the respective first signals are not affected by accumulated water in the respiratory conduit. In FIG. 6, the inspiratory phase of the patient breathing pattern may be observed as the part of the raw flow signal being above the dashed reference line. The expiratory phase of the patient breathing pattern may be observed as the part of the raw flow signal being below the dashed reference line.

However, as may be seen from the dashed area, there is a drastic onset of high frequency perturbations starting approximately from time index 36000 and lasting until approx. time index 38000. This temporal segment forms a perturbative temporal segment, indicating the presence of liquid water in the respiratory conduit. In the perturbative segment the high frequency perturbations are superimposed onto the base frequency of the non-perturbative temporal segment. In FIG. 6, the high frequency perturbations are a result of actual introduction of water into the respiratory conduit around time index 36000, and show the effect of the water in the respiratory conduit on the respective signals, and in particular the effects of bubbling or gurgling of the water. Relatively flat raw flow, estimated flow and anticipated pressure signals are shown between approximately time index 38000 and 42500, and the associated temporal segment may represent a situation where the patient has removed the patient interface, and is therefore not breathing into/from the flow path. Another onset of high frequency perturbations starts from approximately time index 42500, forming yet another perturbative temporal segment. This perturbative segment may represents a situation where the patient reconnects the patient interface to continue with their respiratory therapy.

Figure 7:
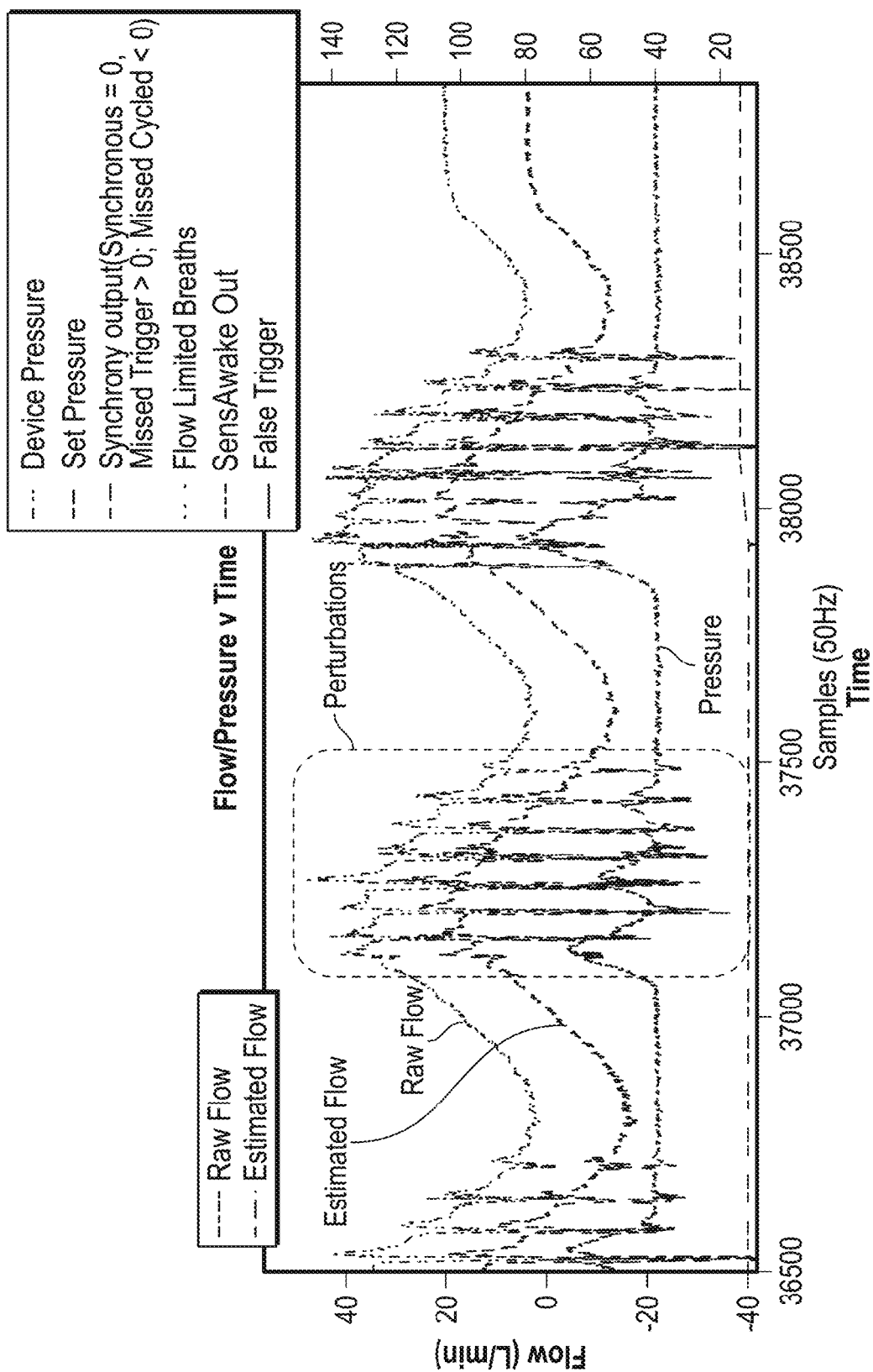
FIG. 7 is a graphical representation showing another example of respective raw flow, estimated flow, and pressure signals in a respiratory conduit over a time period, and intermittent stages of associated perturbations.

FIG. 7 is a graphical representation showing an example of intermittent stages of perturbations found in a gases flow signal in a respiratory conduit, and the associated detection of water in said respiratory conduit, where a bi-level pressure signal is used. Such a bi-level system delivers a first pressure of breathing gases during inspiration, and a second, lower pressure of gases during expiration. Raw flow, estimated flow, and pressure signals produced when water is accumulated in the respiratory conduit is shown when a bilevel pressure signal is used. The illustrated signals in FIG. 7 may be seen as a magnified view of the signals in FIG. 6. The perturbations that are caused by the water in the respiratory conduit may be more pronounced during the inspiratory phase of the user's breathing than the expiratory phase.

To this end, in some configurations, the controller may be configured to determine the presence of liquid water in the respiratory conduit, by determining a measure of at least one first parameter associated with gases flow perturbations and/or pressure perturbations for portions of the retrieved at least one first signal, where at least one of said portions is associated with the inspiratory phase of breathing.

In some configurations, only signal portions associated with the inspiratory phase may be used by the controller to determine the presence of liquid water in the respiratory conduit, thereby reducing the computational requirements of the controller.

Figure 8:
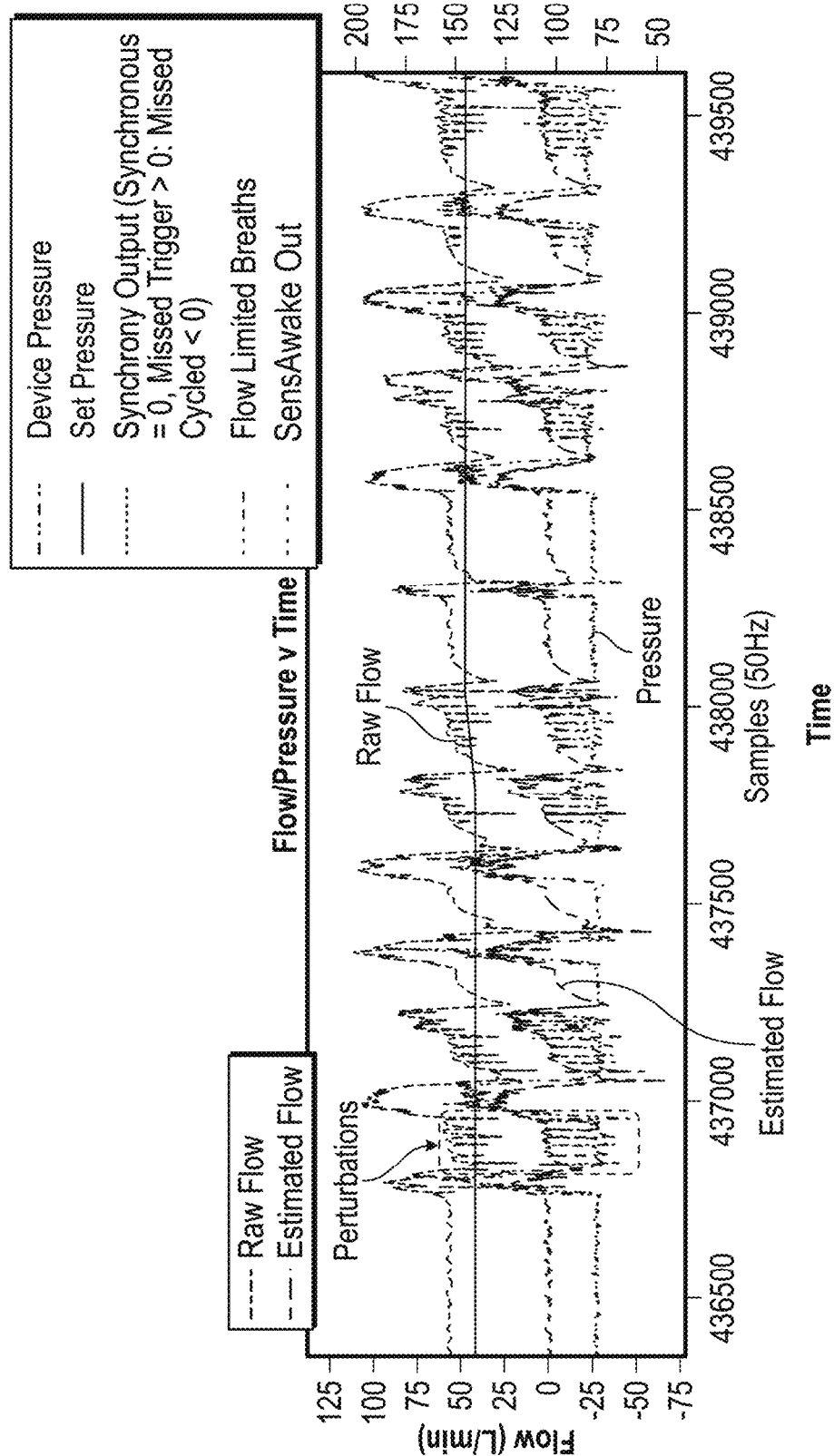
FIG. 8 is a graphical representation showing yet another example of respective raw flow, estimated flow, and pressure signals in a respiratory conduit over a time period, and intermittent stages of associated perturbations.

FIG. 8 is a graphical representation showing a further example of intermittent stages of perturbations found in a gases flow signal in a respiratory conduit, and the associated detection of water in said respiratory conduit. The data shown in FIG. 8 represents a breathing pattern of a user of respiratory therapy. Raw flow, estimated flow, and pressure signals provided by the one or more sensors are shown for a respiratory therapy device providing bilevel respiratory therapy to the user. In FIG. 8, the inspiratory phase of the patient breathing pattern may be observed as the part of the raw flow signal being above the dashed reference line. The expiratory phase of the patient breathing pattern may be observed as the part of the raw flow signal being below the dashed reference line.

First Parameter(s)

The first parameter(s) may be selected from a group of gases flow and/or pressure related parameters. Such gases flow and/or pressure related parameters may be provided by or derivable from flow signals, pressure signals, or any other signals or calculation means provided.

For example, the first parameter(s) may be selected from the group at least comprising:
 a) one or more associated frequencies of the gases flow and/or pressure related perturbations;
 b) an amplitude of the flow and/or pressure related perturbations in the time domain;
 c) intensity of the flow and/or pressure related perturbations in the frequency domain;
 d) duration of the associated flow perturbations and/or pressure perturbations;
 e) periodicity of a group of peaks of the flow and/or pressure related perturbations;
 f) period between different groups of peaks of the flow and/or pressure related perturbations; and
 g) location of sharp changes in the patient breath cycle.

The first parameters have in common that they are directly associated with and/or indicative of the gases flow and/or the gases pressure of the respiratory conduit.

Depending on the type of the first parameters, the associated measures may be determined in different domains, for example the time domain, frequency domain, or another domain.

The measure of at least one first parameter(s) may be derived from collected information of measured gases flow and/or pressure of the respiratory conduit originating from the first signal(s). Hence, by retrieving the first signal(s) the controller may store a dataset of the collected data relating to both historic and present information of the gases flow and/or pressure of the respiratory conduit.

FIG. 9 is a graphical representation of a first signal during the inspiration and expiration phase of the patient breathing cycle, wherein the first parameters relating to perturbation amplitude and period between associated peaks have been selected. The first parameter(s) may be selected by the controller.

The controller may be configured to conduct a frequency analysis of at least one of the first signal(s) or the collected dataset (or a time segment thereof) to allow for determination of frequency related first parameter measures for the first parameter(s) being associated with frequency or periodicity.

The frequency analysis may for example be based at least in part on a Fourier Transform (FT), such as a Fast Fourier Transform (FFT) of the at least one first signal. As spatial or temporal information, for example time, is lost when conducting a FT or FTT the controller may utilize FT or FFT on defined time segments of the first signal(s). In this way a frequency spectrum for each defined time segment may be obtained. The controller may alternatively or additionally compare the frequency spectrum between different time segments in order to determine at least some of the associated first parameter measures. FFT may thus be used to gain a very accurate precision in terms of frequency at the expense of zero control in temporal spread. However, by conducting FFT on a number of well-defined time segments of the first signal(s), wherein each time segment has a relatively short duration, it is possible to extract information about the gases flow and/or pressure related irregularities of the respiratory conduit during said time segments. For example, applying a frequency analysis of at least one of the first signal(s) or the collected dataset (or a time segment thereof) can allow for the identification of water accumulation or presence in the respiratory conduit, for example by detecting the temporal onset, of the perturbations.

Alternatively, or additionally, it is possible to conduct a wavelet analysis on the first signal(s). In general, a wavelet analysis provides information about the associated frequency spectrum less accurate than an FFT, however with increased control in temporal spread. Hence, using a wavelet analysis it is possible to identify frequency associated information about the gases flow and/or pressure related irregularities of the respiratory conduit at different temporal positions of the first signal(s).

Additionally or alternatively, the frequency analysis may be based at least in part on at least one spectrogram associated with the at least one first signal. The spectrogram may have one axis relating to frequency and another axis relating to time. In the frequencies for each associated time segment may be identified. FIGS. 10b, 11b, and 12c show three examples of such spectrograms with the associated first signals represented in FIGS. 10a, 11a, and 12a.

Figure 10A:
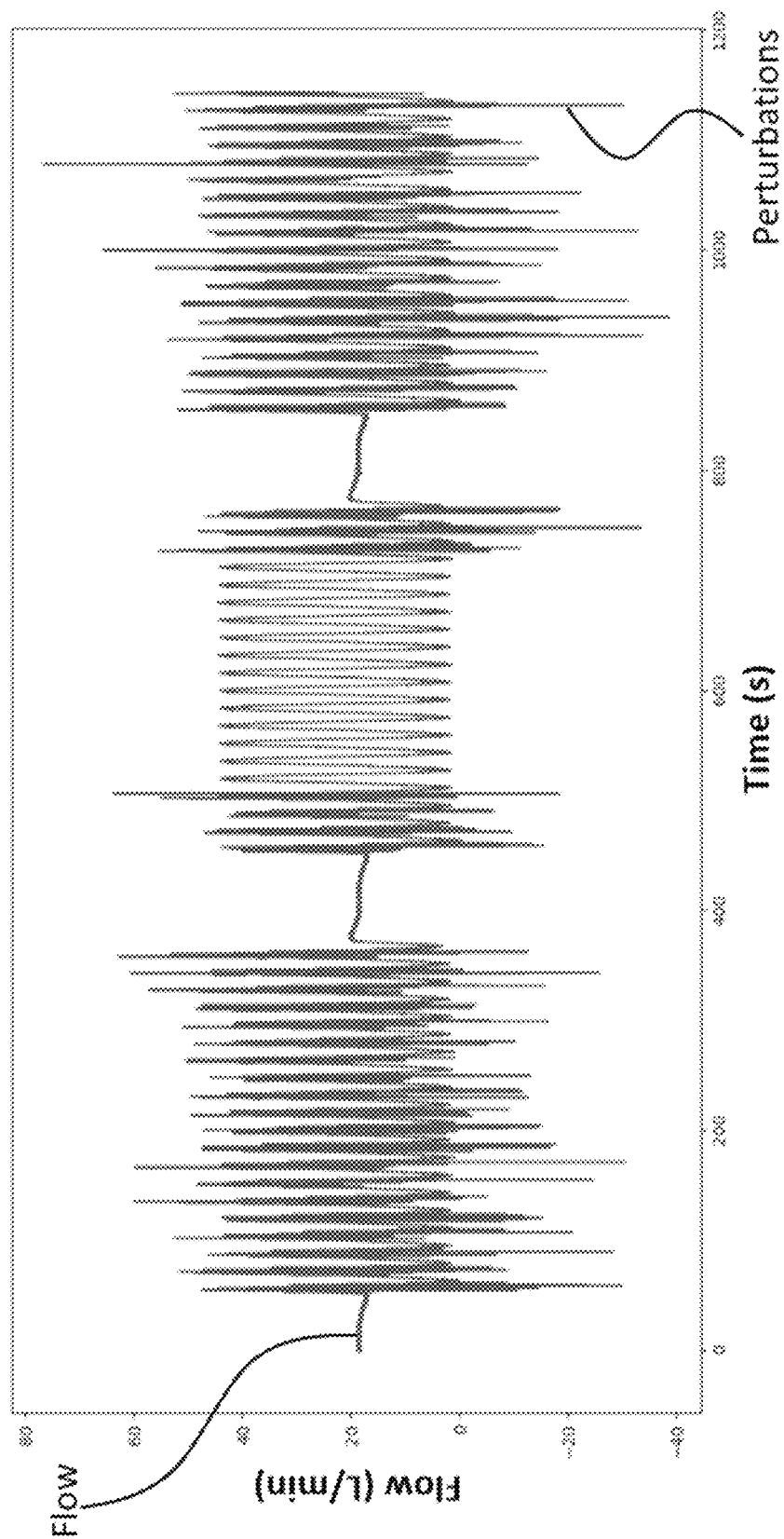
FIG. 10a is an example of a graphical representation of a first signal associated with gases flow in a respiratory conduit over time.
Figure 10B:
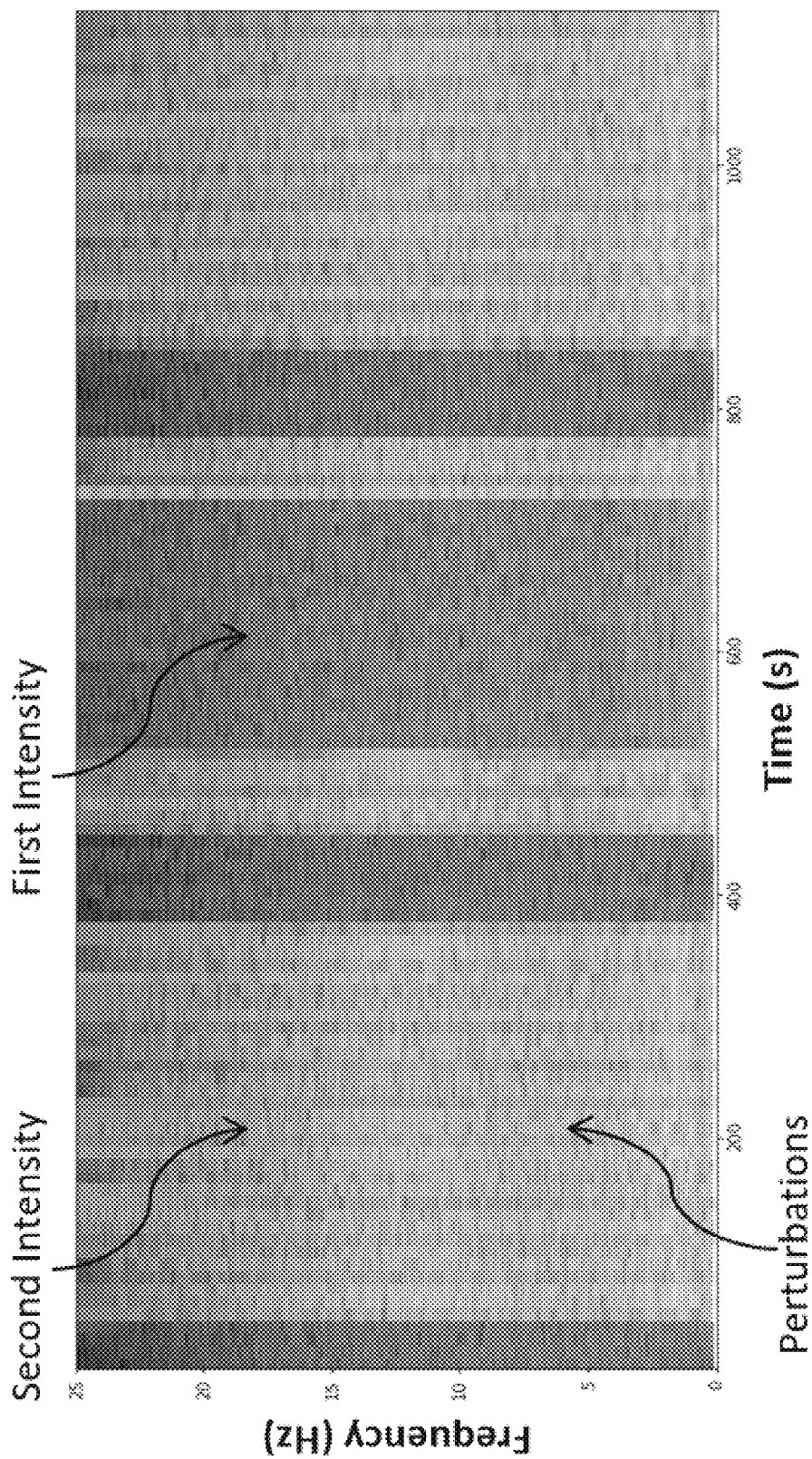

FIGS. 10a and 10b show flow data derived from the first signal representing a sinusoidal flow pattern similar to that which may be observed with a patient using a respiratory flow system. The flow data of the first signal includes temporal portions with the perturbations resulting from water bubbling in the respiratory conduit, and temporal portions without water (or with no indication that water is present) in the respiratory conduit (the central section).

The corresponding spectrogram of the first signal of FIG. 10a is shown in FIG. 10b. FIG. 10b thus provides a visual representation of the spectrum of frequencies of the data information of the first signal, which may relate to pressure waves, for example sound, or other information. The spectrogram of FIG. 10b is built by applying a Fourier transform to the flow data of the first signal. In this particular example drawing the spectrogram shows the associated frequencies on the Y axis, and time along the X axis. The amplitude (intensity) of the constituent frequencies that are derived from the Fourier transform may then be determined, and represented by colours or shades in the spectrogram. The spectrogram includes a range of shades on a spectrum from a first shade representing a first intensity (0) to a second shade representing a second intensity. In the spectrogram of FIG. 10b, the first shade is darker than the second shade. Darker shades represent lower intensities of the frequency being referred to, and lighter shades represent higher intensities of the frequency being referred to.

The frequency of ordinary breathing from a patient of respiratory therapy tends to be relatively low. Normal resting rate breathing and/or breathing rates during sleep may be in the range of approximately 10 to 15 breaths per minute, resulting in a breathing frequency of 0.16-0.25 Hz. Prominence of frequencies in the flow signal at frequencies of 1-25 Hz is an indication that there is water accumulated in the respiratory conduit that is bubbling. This is shown in the spectrogram of FIG. 10b by higher amplitudes (second intensity area) within this frequency range when the bubbling is observed, and lower amplitudes (first intensity area) within this frequency range when the water and/or bubbling is not present.

Figure 11A:
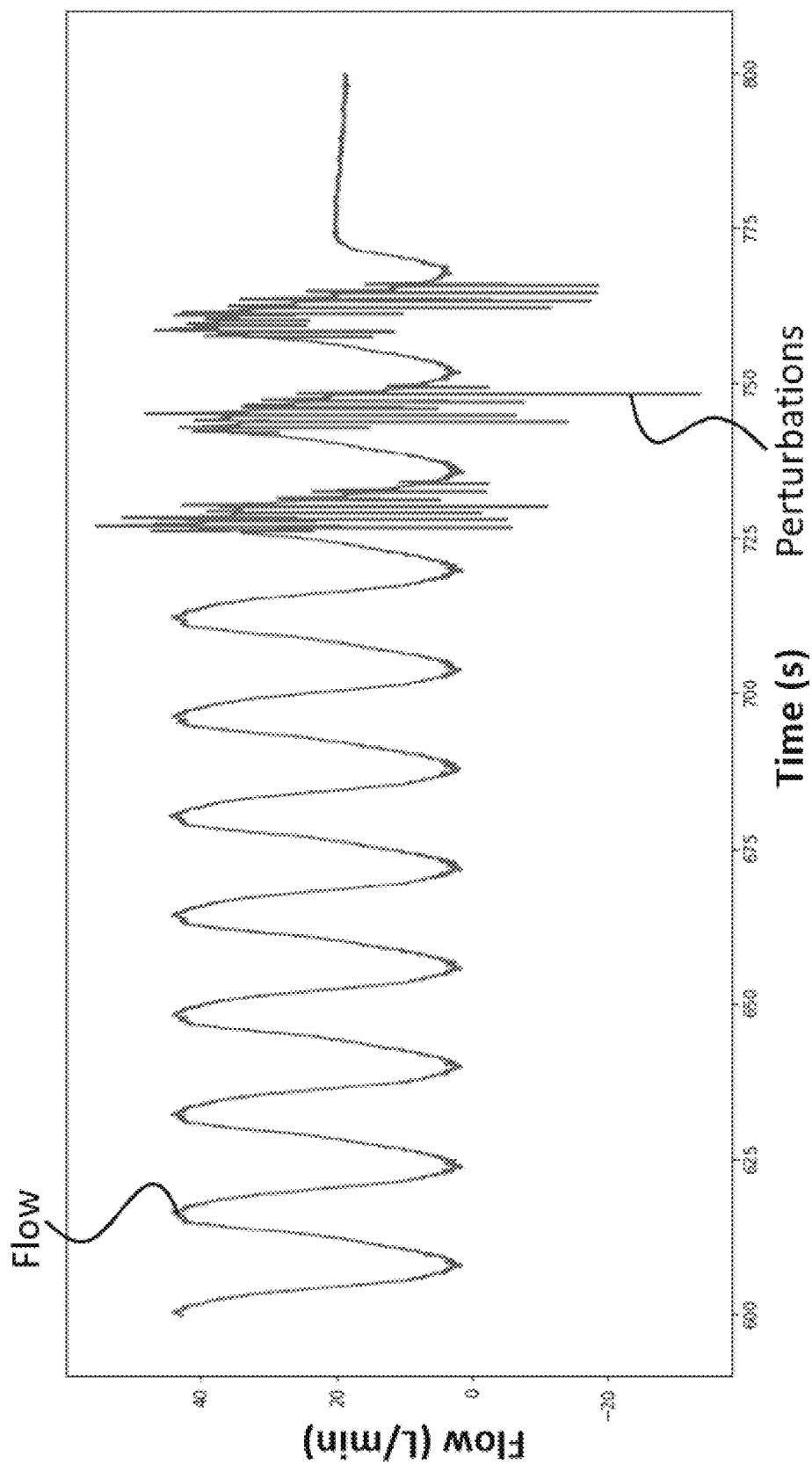
FIG. 11a is further example of a graphical representation of a first signal associated with gases flow in a respiratory conduit over time.
Figure 11B:
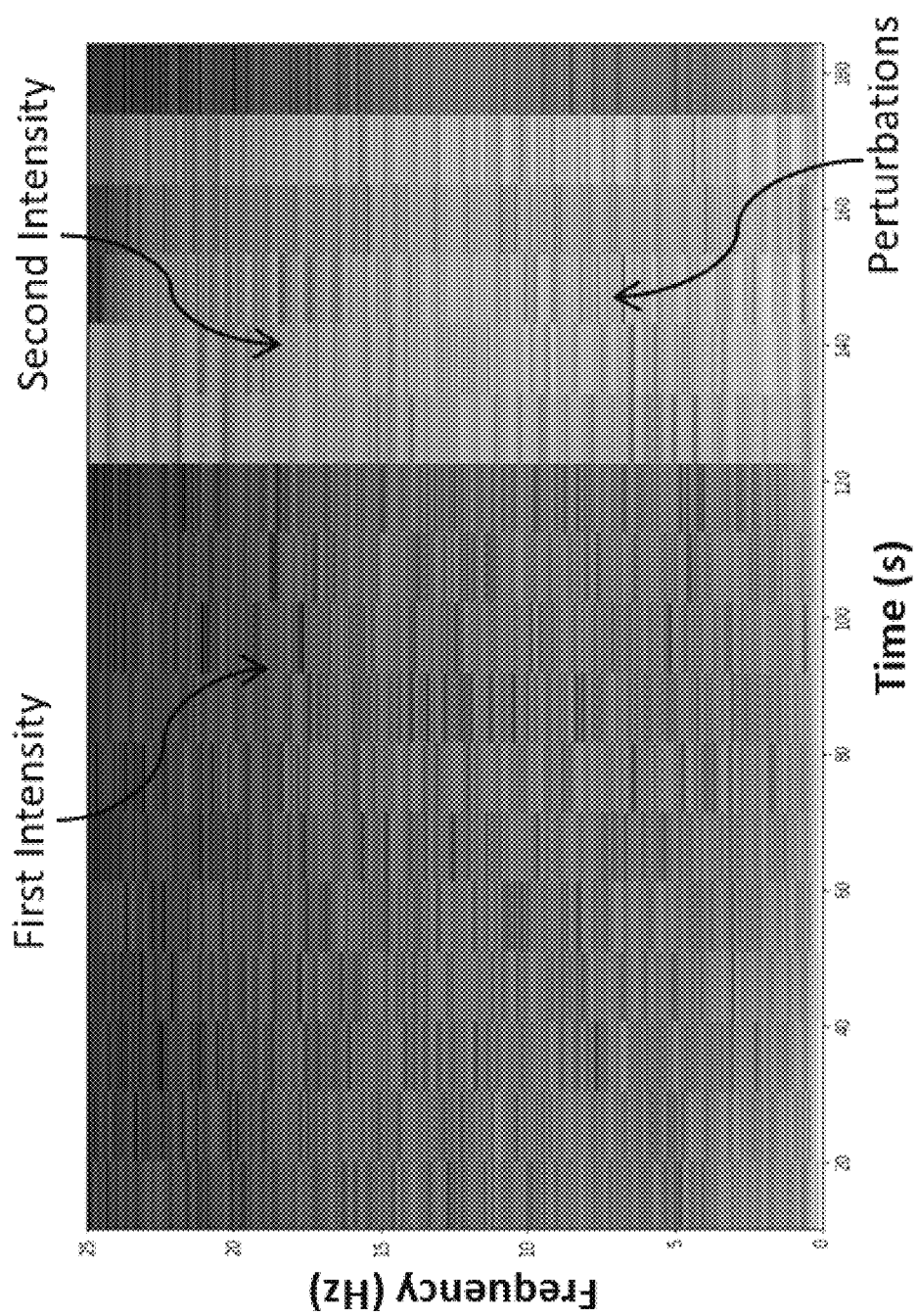
Figure 12A:
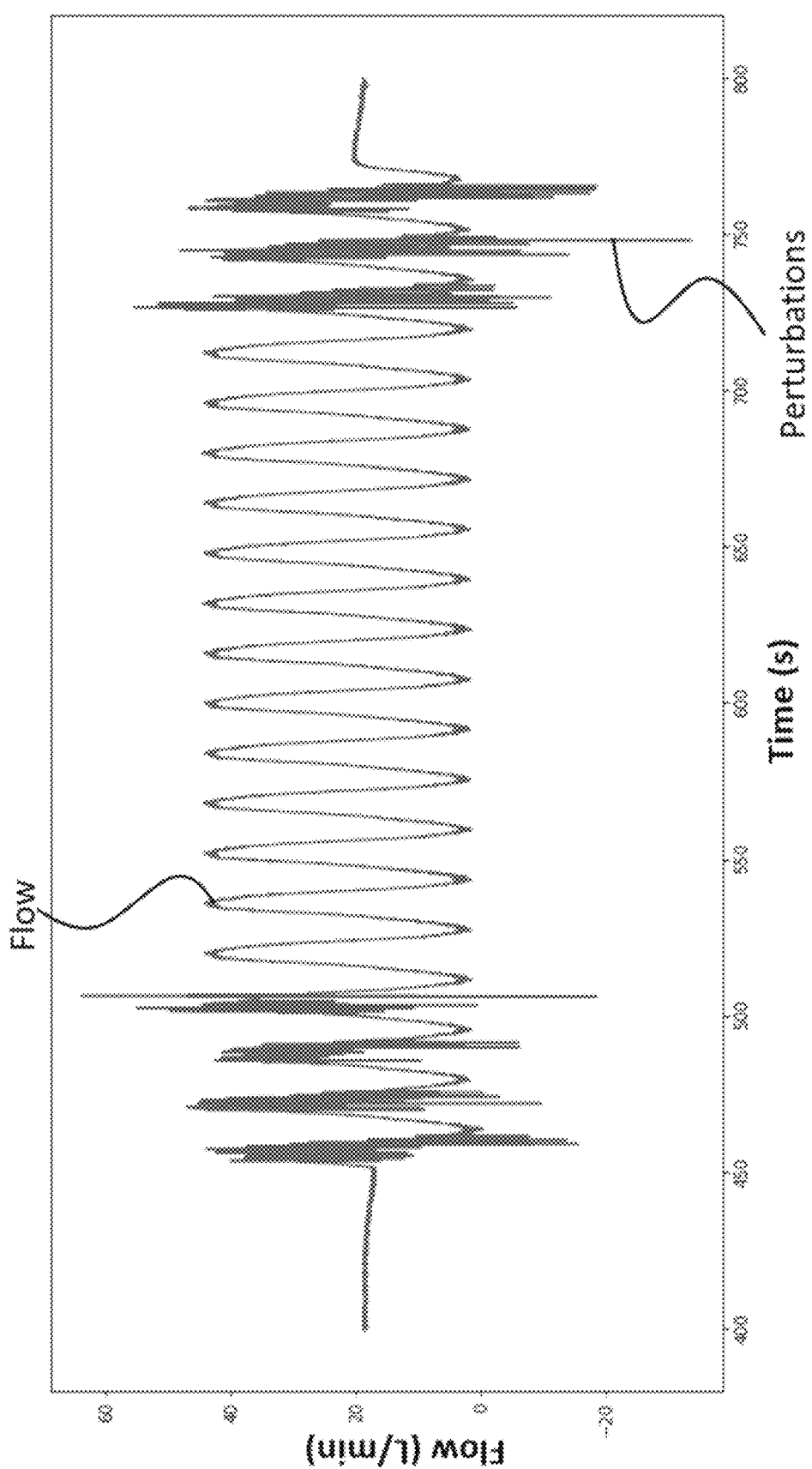
FIG. 12a is yet a further example of a graphical representation of a first signal associated with gases flow in a respiratory conduit over time.

FIG. 11a shows a further example of a graphical representation of a first signal associated with gases flow in a respiratory conduit over time. More particularly, FIG. 11a shows a time series of flow data over a smaller time window compared to that of FIGS. 10a to 10b. An associated spectrogram is shown in FIG. 11b. Similar to FIG. 10b, in FIG. 11b water accumulated in the respiratory conduit is represented by higher amplitudes (second intensity area) within the associated frequency range when the bubbling is observed, and lower amplitudes (first intensity area) within this frequency range when the water and/or bubbling is not present.

Figure 12B:
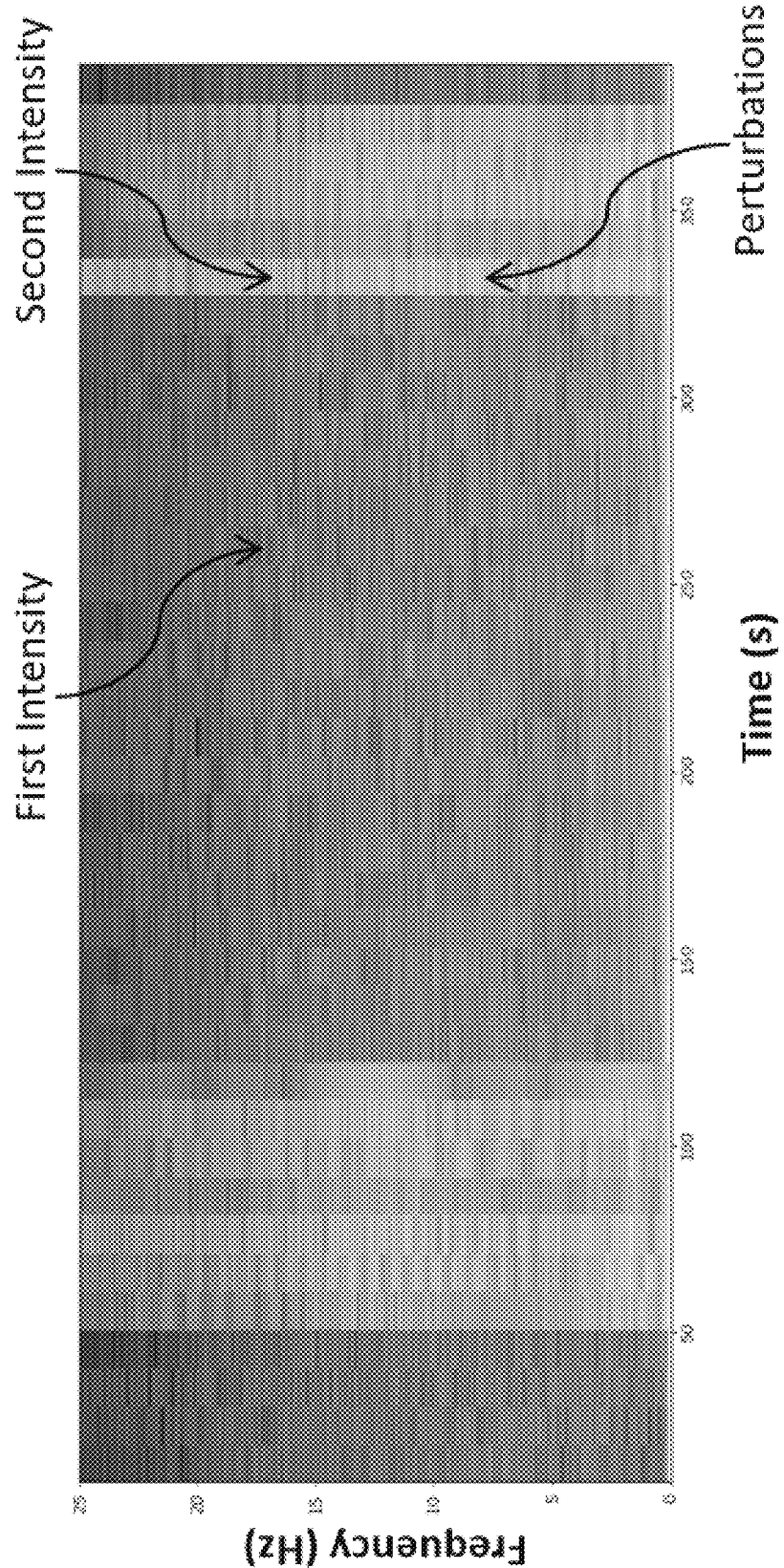

FIG. 12a shows another example of a graphical representation of a first signal associated with gases flow in a respiratory conduit over time. More particularly, FIG. 12a shows a time series of flow data over a smaller time window compared to that of FIGS. 10a to 10b. A corresponding spectrogram is shown in FIG. 12b. Similar to FIGS. 10b and 11b, in FIG. 12b water accumulated in the respiratory conduit is represented by higher amplitudes (second intensity area) within the associated frequency range when the bubbling is observed, and lower amplitudes (first intensity area) within this frequency range when the water and/or bubbling is not present.

As seen from each of the spectrograms of FIGS. 10b, 11b, and 12b, the onset of perturbations associated with water accumulated in the respiratory conduit may be visually detected.

In some configurations a conventional image analysis edge detection model may be applied to the spectrogram to identify onset, for example the temporal onset, of the perturbations.

Second Parameter(s)

In some configurations parameters other than those directly having an impact on, or being indicative of the gases flow and/or pressure may also be taken into consideration by the controller during the water accumulation determining process. By both analysing parameters directly associated with the flow and/or pressure as well as indirectly related parameters it is possible to increase the confidence of a correct water accumulation detection.

To this end the controller 1011 may be configured to retrieve 1011b information indirectly relate to gases flow and/or pressure of the respiratory conduit. Moreover, the controller 1011 may be configured to determine 1012b a measure of at least one second parameter associated with the retrieved information.

The measure(s) of the second parameter(s) may be processed by the controller 1011 to arrive at a positive decision or determination of the presence of liquid water in the respiratory conduit.

Accordingly, the controller 1011 may be configured to determine 1013 the presence of liquid water in the respiratory conduit based at least in part on the measure(s) of the at least one first parameter meeting a first threshold and the measure(s) of the at least one second parameter meeting a second threshold.

The second parameter(s) may be selected from a group of indirect gases flow and/or pressure related parameters.

For example, the second parameter(s) may be selected from the group at least comprising:
a) a temperature of the gases flow;
b) an ambient temperature;
c) a humidity of the gases flow;
d) an ambient humidity;
e) device gases humidity settings;
f) device gases temperature settings;
g) device geographic location;
h) environment weather forecast; and/or
i) device altitude.

Example 1

In a situation where the gases flow temperature is relatively low while the gases humidity is relatively high, there is a higher probability of condensation and the risk of accumulation of water in the respiratory conduit is increased. In this situation it is rather likely that gases flow and/or pressure related perturbations relate to water accumulated in the respiratory conduit. The resulting risk factor of water accumulating in the respiratory conduit is rather high, as the temperature is low and the humidity is high, indicating that the gas temperature is close very close to its dew point. Lowering the gases temperature even further beyond the dew point would mean that some of the moisture in the gas have to condense, resulting in water accumulation in the respiratory conduit. The information associated with the second parameters may be used by the controller as part of making the positive decision or determination of the presence of liquid water in the respiratory conduit. In this situation, the information may increase the likelihood of determining that the water is accumulated in the respiratory conduit. Moreover, the associated information of the second parameter(s) may be used to increase the confidence of a correct water accumulation detection, in this situation.

Example 2

In a situation where the gases flow temperature is relatively high, while the gases humidity is relatively low, there is a lower probability of condensation and the risk of accumulation of water in the respiratory conduit is decreased. In this situation it is less likely that gases flow and/or pressure related perturbations relate to water accumulated in the respiratory conduit. The resulting risk factor of water accumulating in the respiratory conduit is rather low, as the temperature is high and the humidity is low, indicating that the gas temperature is relatively far away from its dew point. Hence, lowering the gases temperature towards the dew point would not imply a significant risk of the gas to condense, since the dew point is relatively far away from the actual gases temperature. In this situation, the information associated with the second parameter(s) may decrease the likelihood of determining that the water is accumulated in the respiratory conduit.

The information indirectly related to gases flow and/or pressure may be provided in a second signal. In some configurations the second signal may be output by a sensor, for example temperature sensor(s), humidity sensor(s), barometer(s), Global Positioning System (GPS) sensor(s) or module(s) operatively coupled to the respiratory conduit and/or the respiratory therapy system, in use. At least one sensor may be integrated with the respiratory therapy system. For example, at least one sensor may be integrated with the flow generator, humidifier, breathing gases delivery conduit and/or the patient interface. To this end, the controller may comprise an input for receiving the second signal from the sensor.

Although sensors may be used to provide the controller 1011 with information associated with the first and/or second parameters, alternatively or additionally, at least some the information associated with some of the first or second parameters could be retrieved directly from the respiratory therapy apparatus, for example via an external or internal output.

Accordingly, the controller 1011 may comprise one or more inputs for receiving signals from one or more sensors or terminals of the respiratory therapy system/apparatus 100.

Determination of Water Accumulation

In order to positively determine that water is present in the respiratory conduit, the controller 1011 may be configured to calculate a score based on the first parameter(s). For example, the score may be a function of the first parameter such that:

$$S_{p1} = f(p_1)$$

Where $S_{p1}$ is the score based on the first parameter(s) and $p_1$ is the first parameter(s).

Alternatively, the controller 1011 may be configured to calculate a score based on the first parameter(s) and the second parameters(s). For example, the score may be a function of the first parameter(s) and the second parameter(s), such that:

$$S_{p1,p2} = f(p_1, p_2)$$

Where $S_{p1,p2}$ is the score based on the first parameter(s) and the second parameter(s), $p_1$ is the first parameter(s) and $p_2$ is the second parameter(s).

The score may be an aggregation of individual parameter scores. For example, the score may be a function of a first parameter(s) score and a second parameter(s) score, such that:

$$S_{p1,p2} = h(S_{p1}, S_{p2})$$

Where $S_{p1,p2}$ is the score based on the first parameter(s) and the second parameter(s), $S_{p1}$ is the score based on the first parameter(s) and $S_{p2}$ is a score based on the second parameter(s).

Hence, in some configurations, in order for the controller 1011 to determine the presence of liquid water in the respiratory conduit, a number of calculations utilizing data of the first signal and reference may be required. In other words, the controller 1011 may perform a number of calculations utilizing data of the first signal and the reference to determine the presence of liquid water in the respiratory conduit.

Each parameter may be assigned a defined weight. The controller 1011 may be configured to calculate an individual parameter score based on the defined weight and the measure of each associated parameter. For example, the individual parameter score may be a function of the parameter and its define weight, such that:

$$S_{pn} = k_n(w_n, p_n)$$

Where $S_{pn}$ is the score based on the $n^{th}$ parameter(s), $w_n$ is the defined weight of the $n^{th}$ parameter(s), and $p_n$ is the $n^{th}$ parameter(s).

Alternatively, the controller 1011 may be configured to calculate an overall score by aggregating the respective individual parameter scores. For example the aggregation can be a summation of individual parameter scores, such that;

$$S = \sum_{n=1}^{m} S_{pn}$$

Where S is the overall score and $S_{pn}$ is the individual parameter score based on the $n^{th}$ parameter(s).

Alternatively, the aggregation can be a product series of the individual parameter scores, such that:

$$S = \prod_{n=1}^{m} S_{pn}$$

Where S is the overall score and $S_{pn}$ is the individual parameter score based on the $n^{th}$ parameter(s).

Alternative aggregation methods and/or operators may be used instead of the summation operator and product operator described.

Alternatively, the controller 1011 may be configured to calculate an overall score by aggregating the respective derived parameter measures based on defined individual parameter weights.

In some configurations, see FIG. 1, a positive determination of the presence of liquid water in the respiratory conduit may be made when the overall score meets a first threshold. In such a configuration the first threshold may be a predetermined value.

In alternate configurations, the first threshold may be a function which takes into consideration the retrieved first signal(s), the first parameter(s) and their determined measure(s). Hence, in these situations the first threshold function may differ between different temporal portions of the same first signal.

When the first threshold is a function, the output of the function may in some configurations be a value (to be compared with the associated overall score), or the function could deliver a "positive" or "negative" water detection decision.

It should be appreciated that the individual parameter weights may change depending on the measure of the individual parameters. For example, the weight for one parameter may be adjusted based on the measure of said parameter. However, also the measure(s) of other parameters may be used to adjust the respective weight of said parameter.

In some situations, it may be desirable to collect evidence in more than temporal portion of the first signal, for example to avoid false detection of water in the respiratory conduit. In such cases, the temporal portions may be analysed individually and the results may be combined to make a final decision or determination of the presence of liquid water in the respiratory conduit. Alternatively, the temporal portions may be analysed together to infer the result.

It should be appreciated that different sets of parameters, for example a selection of first parameters, and/or a selection of second parameters may be used for each temporal portion, as some first parameters may not be determined from each temporal portion of the first signal and some second parameters may not be available for the time associated with the temporal portion of the first signal.

To this end, as gases flow perturbations and/or pressure perturbations may be found at different portions, i.e. different temporal portions or time locations of the first signal, the controller may be configured to calculate an overall score per portion. Each temporal portion may optionally comprise a number of time segments. Each time segment may span a time window from a beginning or start $t_1$ to an end $t_2$.

It should be appreciated that since the first parameter(s) and their associated determined measures may differ between different temporal locations. Hence, it follows that the associated weights for any first parameter of a first temporal portion of a first signal may differ from any first parameter of a second temporal portion of the same first signal.

In order to arrive at a positive determination of the presence of liquid water in the respiratory conduit, the controller 1011 may advantageously analyse more than one temporal portion of each first signal. Hence, in some configurations, individual parameter scores for each parameter associated with a first temporal portion of the first signal, or an overall score for each temporal portion of the first signal, may be determined by the controller 1011 prior to making a positive determination of the presence of liquid water in the respiratory conduit.

To this end, the controller 1011 may be further configured to determine a measure of at least one further first parameter associated with flow perturbations and/or pressure perturbations for at least one further temporal portion of the received at least one first signal and determine the presence of liquid water in the respiratory conduit further based at least in part on the measure(s) of the at least one further first parameter meeting the first threshold.

In some configurations the controller 1011 is configured to determine 1013 the presence of liquid water in the respiratory conduit when an overall score or a number of individual parameter scores associated with one temporal portion of the first signal meets the first threshold.

In some configurations the controller 1011 is configured to determine 1013 the presence of liquid water in the respiratory conduit when an overall score or a number of individual parameter scores associated with one temporal portion of the first signal meets the first threshold, while the at least one second parameter meets a second threshold.

In other configurations, the controller 1011 may be configured to determine 1013 the presence of liquid water in the respiratory conduit when an overall score or a number of individual parameter scores associated with one temporal portion of the first signal meets a first threshold and an overall score or a number of individual parameter scores associated with another temporal portion of the first signal and meets a further first threshold.

In other configurations, the controller 1011 may be configured to determine 1013 the presence of liquid water in the respiratory conduit when an overall score or a number of individual parameter scores associated with one temporal portion of the first signal meets a first threshold and an overall score or a number of individual parameter scores associated with another temporal portion of the first signal and meets a further first threshold, while the at least one second parameter meets a second threshold.

Filtering

In some configurations the controller 1011 is configured to filter at least one of the first signal(s) using a filter prior to making a positive decision or determination of the presence of liquid water in the respiratory conduit.

As mentioned previously, it is possible to distinguish the gases flow perturbations and/or pressure perturbations associated with snoring and/or the patient's general breathing pattern from those related to water accumulated in the respiratory conduit. In some configurations a low pass filter may be used to discarding out higher perturbation frequencies associated with snoring.

In some configurations, a high pass filter is applied to the first signal to isolate the short duration high amplitude peaks or spikes that may be observed in the flow and/or pressure patterns associated with water accumulation in the respiratory conduit from the patient's general breathing pattern.

In some configurations, a band pass filter is applied to the first signal to discard higher frequencies associated with snoring, and lower frequencies associated with the patient's general breathing pattern. More generally, the band pass filter may be tuned to filter frequencies below a lower frequency filter threshold, and frequencies above a higher frequency filter threshold. This allows isolation of the signal between the lower frequency filter threshold and the higher frequency filter threshold. For example, in at least one configuration, the band pass filter can be appropriately tuned to approximately the 1 to 25 Hz range. In at least one configuration, one or more band pass filter(s) can isolate frequencies within the range of 1 to 25, 2 to 25, 3 to 25, 4 to 25, 5 to 25, 10 to 25, 15 to 25, 20 to 25, 5 to 10, 10 to 15, 15 to 20, 1 to 30, 5 to 30, 10 to 30 and/or 10 to 35 Hz for analysis. This can isolate the flow and/or pressure patterns associated with water accumulation in the respiratory conduit from frequencies associated with snoring or the patient's general breathing pattern. In other words, we can select one or more frequency band(s) that are associated with the bubbling or gurgling in the respiratory conduit that are distinct from one or more frequency bands that are associated with snoring.

The controller 1011 may be further configured to filter at least one of the first signal(s) using a filter prior to determining at least one of the first parameter(s).

FIG. 9 is a graphical representation showing a first signal relating to flow in a respiratory conduit vs. a filtered version of the first signal showing the perturbation intensity of said original flow signal. The filtered signal is filtered such that high frequency components have been extracted using a band pass filter with cut-off frequencies of 5 Hz and 20 Hz. The filtered signal is equivalent to the superposed amplitude of the frequencies within the 5-20 Hz frequency range.

Figure 13:
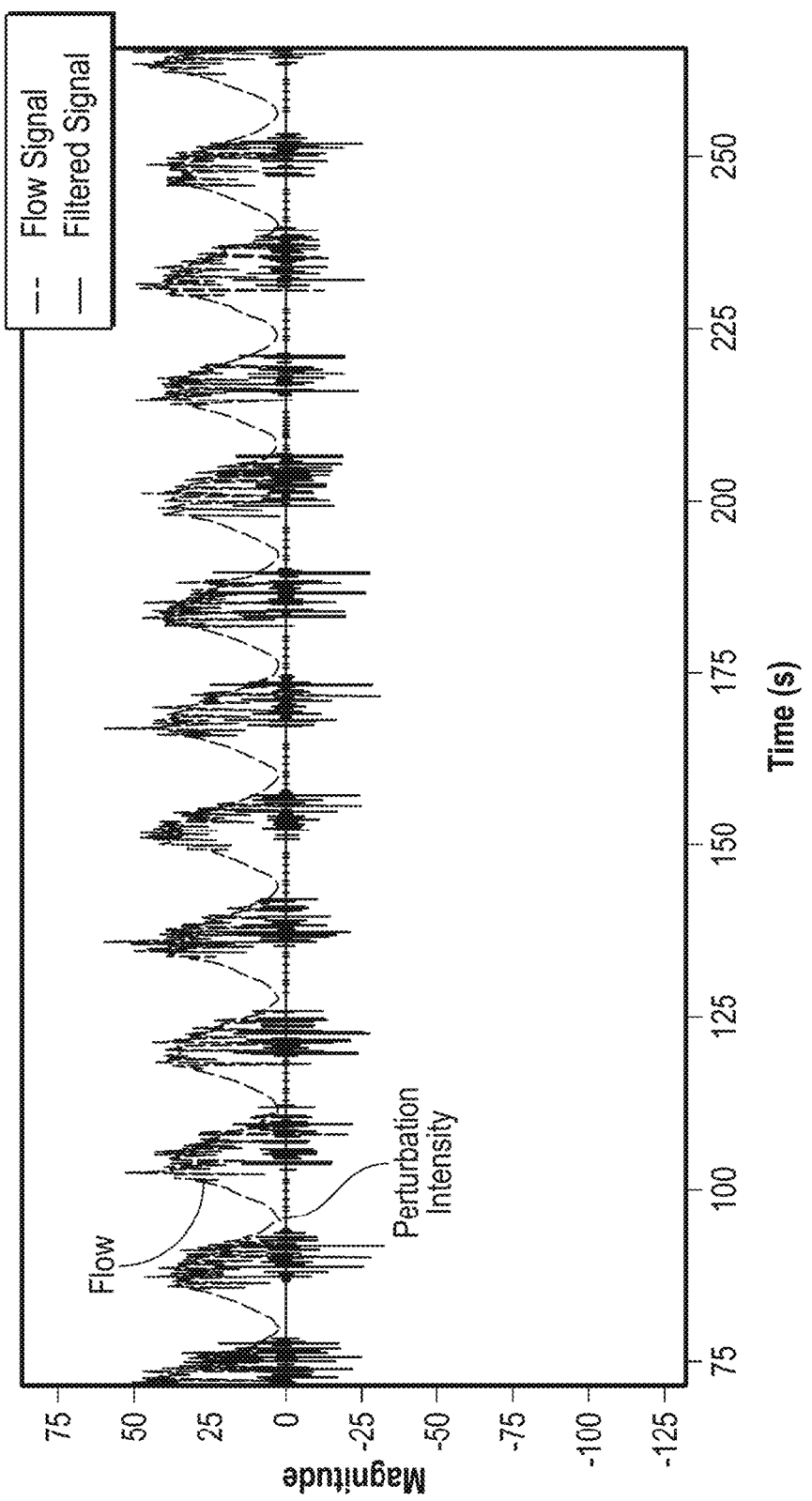
FIG. 13 is a graphical representation showing an original flow signal in a respiratory conduit vs. a filtered version of the flow signal showing the perturbation intensity of said original flow signal.
Figure 14:
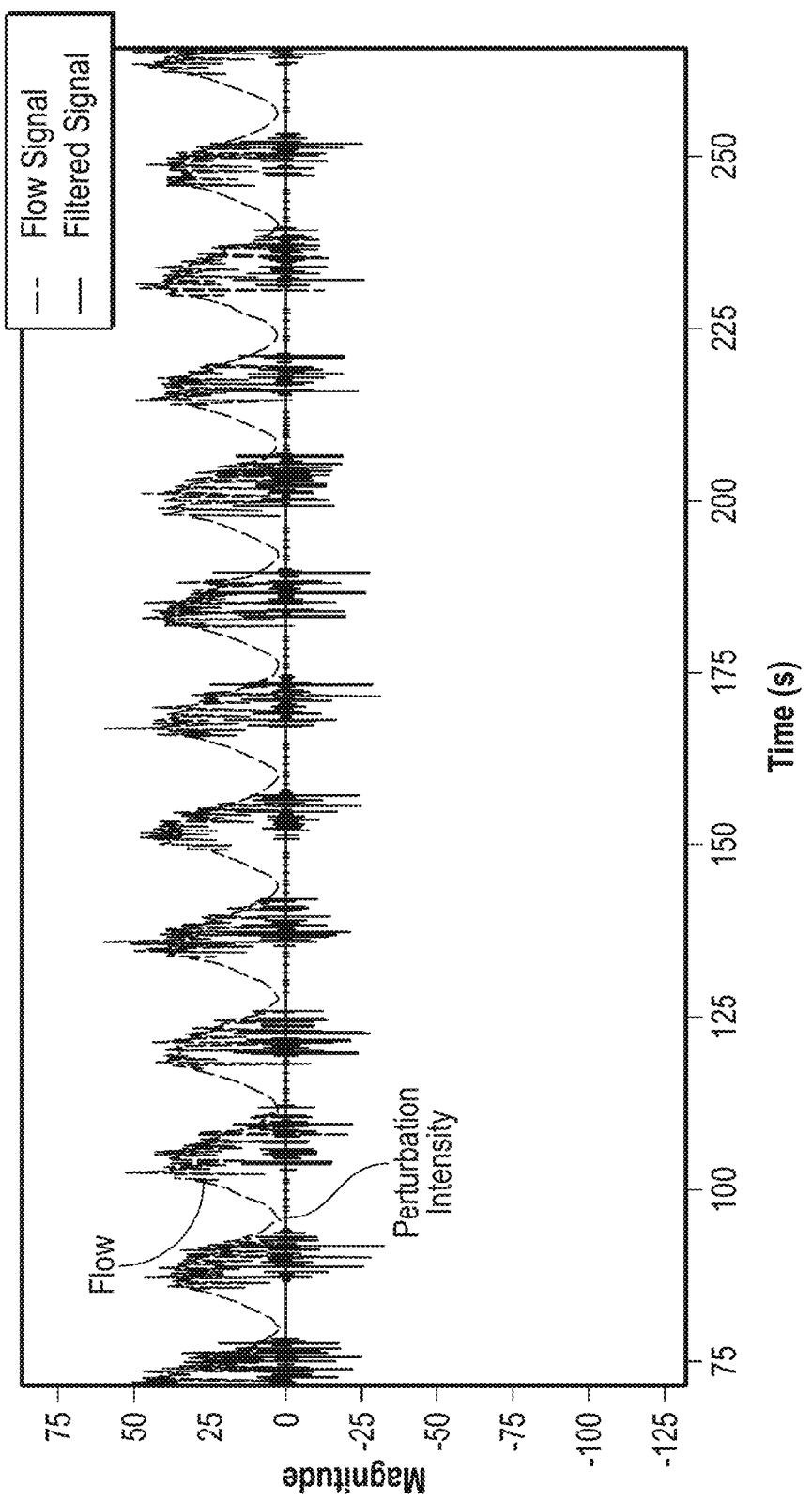
FIG. 14 is a graphical representation showing the original flow signal and filtered version of FIG. 13, and the associated temporal portions where detection of water accumulated in the respiratory conduit is found.

FIG. 14 is a graphical representation showing the original flow signal and filtered version of FIG. 13, and the associated temporal portions where detection of water accumulated in the respiratory conduit is found. In some configurations bubbling due to water accumulation in the respiratory conduit may be detected when the filtered signal is greater than a certain threshold in a given time window. FIG. 14 shows an example where such a threshold is overlaid the flow and filtered signals of FIG. 13, so that only the portions of the flow signals and filtered signals meeting the threshold are shown. As shown in FIG. 14 it follows that water is detected in these associated temporal portions. The amplitude of the peaks of the filtered signal may be used in some configurations as the first parameter. In some configurations, the mean amplitude of the peaks of the filtered signal over a time segment may be used as the first parameter.

Machine Learning

The process of making a positive determination of the presence of liquid water in the respiratory conduit may require the first signal(s) to be analysed in the time, frequency or any other domain to retrieve patterns indicative of the sharp changes in flow/pressure caused by excessive water in the respiratory conduit.

The process of determining a measure of the respective parameters and making a positive determination of the presence of liquid water in the respiratory conduit may be executed using a machine learning algorithm.

This underlying analysis of the first signal(s) and information relating to the second parameter(s) may be done in a descriptive form, i.e. by selecting algorithms and heuristics to detect specific patterns, or using generic machine learning techniques (for example linear regression, neural networks, deep learning neural network, Bayesian networks etc.) to extract features from the first signal(s), or a filtered version of the first signal(s), that are relevant to the detection of water accumulated in the respiratory conduit. In the latter case, signals associated with water accumulated in the respiratory conduit patterns and patterns without water in the respiratory conduit are used to extract features to perform the classification.

By inputting a number of first signals representing "normal" gases flow and/or pressure patterns in a respiratory conduit without water accumulation, as well as first signals representing "water accumulated" in an identical respiratory conduit, optionally in conjunction with information indirectly related to the gases flow and/or pressure, the associated classifiers are trained so as to be able to classify a new observation, for example a first signal or a representation thereof, optionally including information indirectly related to gases flow and/or pressure, into the "normal" or "water accumulation" class. In the event such a new observation falls into the water accumulation class a positive determination of the presence of liquid water in the respiratory conduit may be made.

Hence, as a result of training the machine learning algorithm a number of trained classifiers are formed, which may be used to classify any new observation to belong to either the normal or water accumulation class.

As mentioned previously a number of variable weighs may be assigned to each parameter, in order to calculate an overall or individual score. In some configurations the machine learning algorithm may be trained to apply the correct weights for each parameter, considering all other information at hand, for example associated weights, parameter types, and parameter measures for the current observation in view of the observations already taken into consideration.

In some configurations the first threshold and/or second threshold may be defined as trained functions, being trained using the machine learning algorithm, and may thus form an integral part of the machine learning algorithm.

Depending on the configuration of the machine learning algorithm, various inputs or features may be used for training as well as for classifying a new observation.

Different inputs/features may relate to:
the first signal(s);
a representation of the first signal(s), for example spectrogram, FFT distribution, wavelet spectrum, etc;
type of first parameter(s);
magnitude of first parameter(s) of the respective type;
information indirect to gases flow and/or pressure;
type of second parameter(s); and/or
magnitude of second parameter(s) of the respective type.

Frequency Domain Examples

In one embodiment, the controller 1011 is configured to conduct the step of determining 1012a a measure of at least one first parameter by:
a) conducting a Fourier transform on at least one first signal associated with a gases flow and/or pressure in the respiratory conduit, and
b) determining at least one high energy frequency amplitude/intensity of the Fourier transformed data of the at least one first signal, and optionally comparing the at least one high energy frequency amplitude/intensity to the first threshold.

The controller 1011 is then configured to determine 1013 the presence of liquid water in the respiratory conduit if the at least one high energy frequency amplitude/intensity meets (for example is above) the first threshold.

In this embodiment, the step of determining 1012a may be conducted during the inspiration phase of the patient breathing pattern. Information about the onset of such inspiration phase may be received by the controller 1011 from for example the flow generator, or from one or more flow/pressure sensors operatively coupled to the respiratory conduit.

In an alternative embodiment, the step of determining 1012a a measure of at least one first parameter comprises:
a) conducting a Fourier transform on at least one first signal associated with a gases flow and/or pressure in the respiratory conduit, resulting in Fourier transformed data;
b) calculating a vector of amplitudes representative of the spectral characteristics of the Fourier transformed data; and
c) comparing the calculated vector to a template representative of gases flow and/or pressure, for example normal breathing flow/pressure, with no water accumulated in the respiratory conduit.

The controller 1011 is then configured to determine 1013 the presence of liquid water in the respiratory conduit if the calculated vector is significantly different to the normal breathing template.

In an alternative embodiment, the step of determining 1012a a measure of at least one first parameter comprises:
a) conducting a Fourier transform on at least one first signal associated with a gases flow and/or pressure in the respiratory conduit, resulting in Fourier transformed data;
b) calculating a vector of amplitudes representative of the spectral characteristics of the Fourier transformed data; and
c) comparing the calculated vector to a template representative of gases flow and/or pressure with no water accumulated in the respiratory conduit and to a template representative of gases flow and/or pressure with water accumulated in the respiratory conduit.

The controller 1011 is then configured to determine 1013 the presence of liquid water in the respiratory conduit if the calculated vector is more similar to the template associated with water accumulation than that associated with no water accumulation.

In an alternative embodiment, the step of determining 1012a a measure of at least one first parameter comprises:
a) conducting a Fourier transform on at least one first signal associated with a gases flow and/or pressure in the respiratory conduit, resulting in Fourier transformed data;
b) calculating a vector of amplitudes representative of the spectral characteristics of the Fourier transformed data; and
c) comparing the calculated vector to a template representative of gases flow and/or pressure with water accumulated in the respiratory conduit.

The controller 1011 is then configured to determine 1013 the presence of liquid water in the respiratory conduit if the calculated vector is substantially similar to the template associated with water accumulation.

In an alternative embodiment, the step of determining 1012a a measure of at least one first parameter comprises:
a) retrieving an equation or function representing water accumulated in the respiratory derived using a machine learning algorithm using the at least one first signal as input;
b) conducting a Fourier transform on at least one first signal associated with a gases flow and/or pressure in the respiratory conduit, resulting in Fourier transformed data; and
c) inputting the Fourier transformed data into the retrieved equation or function.

The controller 1011 is then configured to determine 1013 the presence of liquid water in the respiratory conduit if the output of the equation or function meets the first threshold.

Time Domain Examples

In an alternative embodiment, the step of determining 1012a a measure of at least one first parameter comprises:
a) applying a high pass filter to the at least one first signal to remove respiratory flow trace and DC (offset) levels, resulting in at least one filtered signal;
b) determining a first high energy frequency amplitude at a first temporal portion of the at least one filtered signal;
c) determining a second high energy frequency amplitude at a second temporal portion of the at least one filtered signal.

DC offsets are offsets in the flow signal from a baseline of flow. The baseline of flow can be a baseline of zero flow. DC levels in the flow signal are usually associated with leaks in the system or in some configurations are associated with a constant level of flow provided indicative of a therapy (flow based therapy). DC levels in the pressure signal are usually associated with the pressure and provide an indication into the therapy (pressure based therapy). For example, if there is some minimum pressure delivered in CPAP therapy (for example 4cmH$_2$O), this will be a DC offset that could be preferably filtered out from the sinusoidal pressure signal prior to analysis. Accordingly, in some configurations, these DC (offset) levels may advantageously filtered out to extract only the relevant information to detect water in the respiratory conduit.

The controller 1011 is then configured to determine 1013 the presence of liquid water in the respiratory conduit if the first and second high energy frequency amplitudes occur within a threshold time period. In this case the first threshold may define the threshold time period, and provided that the first and second high energy frequency amplitudes meet a first threshold, i.e. that their mutual relative temporal distance is within said threshold time period, a decision of the presence of liquid water in the respiratory conduit may be made.

In an alternative embodiment, the step of determining 1012a a measure of at least one first parameter comprises:
a) applying a filter to the at least one first signal, resulting in at least one filtered signal; and
b) determining the number of peaks within a given temporal range, for example time period, of the at least one filtered signal.

The controller 1011 is then configured to determine 1013 the presence of liquid water in the respiratory conduit if the average time period between peaks within the given temporal range is within the first threshold. Here, the first threshold may relate to a set value.

In an alternative embodiment, the step of determining 1012a a measure of at least one first parameter comprises:
a) applying a filter to the at least one first signal, resulting in at least one filtered signal; and
b) determining the number of peaks within a given temporal range, for example time period, of the at least one filtered signal.

The controller 1011 is then configured to determine 1013 the presence of liquid water in the respiratory conduit if the number of peaks meets, for example exceeds, the first threshold. Here, the first threshold may relate to a set value.

In an alternative embodiment, the step of determining 1012a a measure of at least one first parameter comprises:
a) calculating a derivative of the at least one first signal, resulting in derivative data; and
b) determining the number of zero crossings of the derivative data during a given temporal range, for example time period;

The controller 1011 is then configured to determine 1013 the presence of liquid water in the respiratory conduit if the number of zero crossings meet, for example exceeds, the first threshold. Here, the first threshold may relate to a set value.

Alternatively, the controller 1011 may be configured to determine 1013 the presence of liquid water in the respiratory conduit if the average time period between zero crossings within the given temporal range is within the first threshold. Here, the first threshold may relate to a set value.

Alternatively, the controller 1011 may be configured to determine 1013 the presence of liquid water in the respiratory conduit if at least two of the zero crossings occur within a predetermined time period defined by the first threshold.

As mentioned above, the controller 1011 may be configured to analyse data in a given temporal period and come up with an output indicating water in the tube if some conditions are met within that period. Hence, the derived measures may be derived for a first portion, for example one inspiratory phase, or multiple breath phases, of the first signal. This measure may relate to a probability score for the presence of liquid water in the respiratory conduit. For example, this could be close to 1 if it is likely there is liquid water in the respiratory conduit tube, and close to 0 if it is very unlikely. Analysing one or a few signal portions in this way may be referred to as short term pattern analysis.

Here, pattern analysis is to be understood as the analysis of flow/pressure signal patterns. for example shapes in the time domain, spectral pattern, in any other domain, or any other feature.

During short term analysis portions of flow/pressure signals, i.e. time based segments of short duration, for example, one second flow segment may be analysed by the controller 1011. Here, the controller 1011 determines a measure of at least one parameter for each portion. Portions may overlap, for example 50% overlap. For each signal portion a score or probability factor may be indicating the presence of liquid water in the respiratory conduit may be determined by the controller 1011.

The probability scores for different portions may be combined or aggregated in different ways (for example averaged) to provide a long term pattern analysis as will be further elucidated below.

Additionally, it is also possible to repeat this process, producing a number of probability factors (second, third etc.) over later phases of the signal (for example a second inspiration, a later part of the first inspiration, or an overlapping part of the first/multiple inspirations). This may be referred to as a long term pattern analysis being an analysis of these probability factors which are determined over a longer period of time (for example summing the probability factors, finding a mean of the factors over a given time period etc.) which may be used to determine the presence of liquid water in the respiratory conduit. As a non-limiting example, if the average probability factor is >0.7 (on a scale between 0 and 1) over a temporal portion of x, it is likely there was liquid water in the respiratory conduit over that time period associated with that temporal portion.

Hence, in an alternative embodiment, the step of determining 1012a a measure of at least one first parameter comprises:
a) determine a measure of one first parameter associated with gases flow perturbations and/or pressure perturbations for a first portion of the retrieved at least one first signal differing from a reference, wherein the measure of the first parameter relates to a first probability score indicating the presence of liquid water in the respiratory conduit;
b) determine a measure of one further first parameter associated with gases flow perturbations and/or pressure perturbations for a second portion of the retrieved at least one first signal differing from a reference, wherein the measure of the further first parameter relates to a second probability score indicating the presence of liquid water in the respiratory conduit, and optionally
c) iteratively determining further probability score(s) for further portions of the at least one first signals.

The controller 1011 is then configured to determine 1013 the presence of liquid water in the respiratory conduit if the number of determined probability scores meeting a probability score threshold meets, for example exceeds, a first threshold. Here, the probability threshold and the first threshold may represent a value. The probability threshold may act as a filter, for example filtering out probability scores being lower than a certain level, so that only probability scores being above the probability threshold are taken into consideration for meeting the first threshold.

Alternatively, the controller 1011 may be configured to determine 1013 the presence of liquid water in the respiratory conduit if an aggregated measure of the determined probability scores meets, for example exceeds, a first threshold. In a simple case, the aggregated measure may be the sum of the determined probability scores. Alternatively, the aggregated measure may be the result of a statistical aggregation function applied to the probability scores.

Outputting Control Signal

The controller 1011 may be further configured to output 1014 at least one control signal subsequently used by the controller 1011, or the or another controller of the respiratory therapy system 100, to control one or more aspects or components of the system 100. For example the control signal could be used to control any one or more or all of the flow generator, humidifier heater, or respiratory conduit heater. In one example, if liquid water is detected in the respiratory conduit, the control signal may be used by the system 100 to increase the current supplied to the respiratory conduit heater to vary the heat output of the respiratory conduit heater in dependence upon the control signal.

The control signal may be output to, or used by the system 100 to control at least one device operatively connected to the respiratory conduit.

In some configurations the controller 1011 is configured to output the at least one control signal in response to a positive determination of the presence of liquid water in the respiratory conduit.

Alternatively or additionally, the controller 1011 may be configured to output the control signal during periods when there is no positive determination of presence of liquid water in the respiratory conduit.

The control signal may comprise instructions to change an operational setting or mode of the at least one device from its present setting or mode into a water accumulation decision related mode.

The device may be a heater wire provided in connection with the respiratory conduit for heating gases present in the respiratory conduit, or soon to be present in the respiratory conduit.

Alternatively, or additionally, the device may be a heater plate containing a heater element for heating a humidification chamber providing humidified gas to the respiratory conduit.

In some configurations one control signal is configured to control the operation of the heater wire, so as to increase the gases temperature of the gases in the respiratory conduit in response to the positive determination of presence of liquid water in the respiratory conduit.

Additionally or alternatively one control signal may be configured to control the operation of the heater plate, so as to decrease the humidity of the gases in the respiratory conduit in response to the positive determination of presence of liquid water in the respiratory conduit.

In some configurations one control signal is configured to control the operation of the heater wire, so as to maintain the present gases temperature of the gases in the respiratory conduit during a period when no positive determination of presence of liquid water in the respiratory conduit is made.

Additionally or alternatively, one control signal may be configured to control the operation of the heater plate, so as to maintain the humidity of the gases in the respiratory conduit during a period when no positive determination of presence of liquid water in the respiratory conduit is made.

In some configurations the controller 1011 is configured to output a further control signal to the device at a predetermined time after outputting the original control signal. The further control signal may comprise instructions to revert back to the original operational setting or mode of the device from the water accumulation decision related mode.

The inputs of the controller 1011 may be continually or periodically monitored so as to allow for making a positive decision or determination of water accumulation in the respiratory conduit. The controller 1011 may be further configured to continually or periodically update the associated control signal(s) output to the at least one device.

Figure 15:
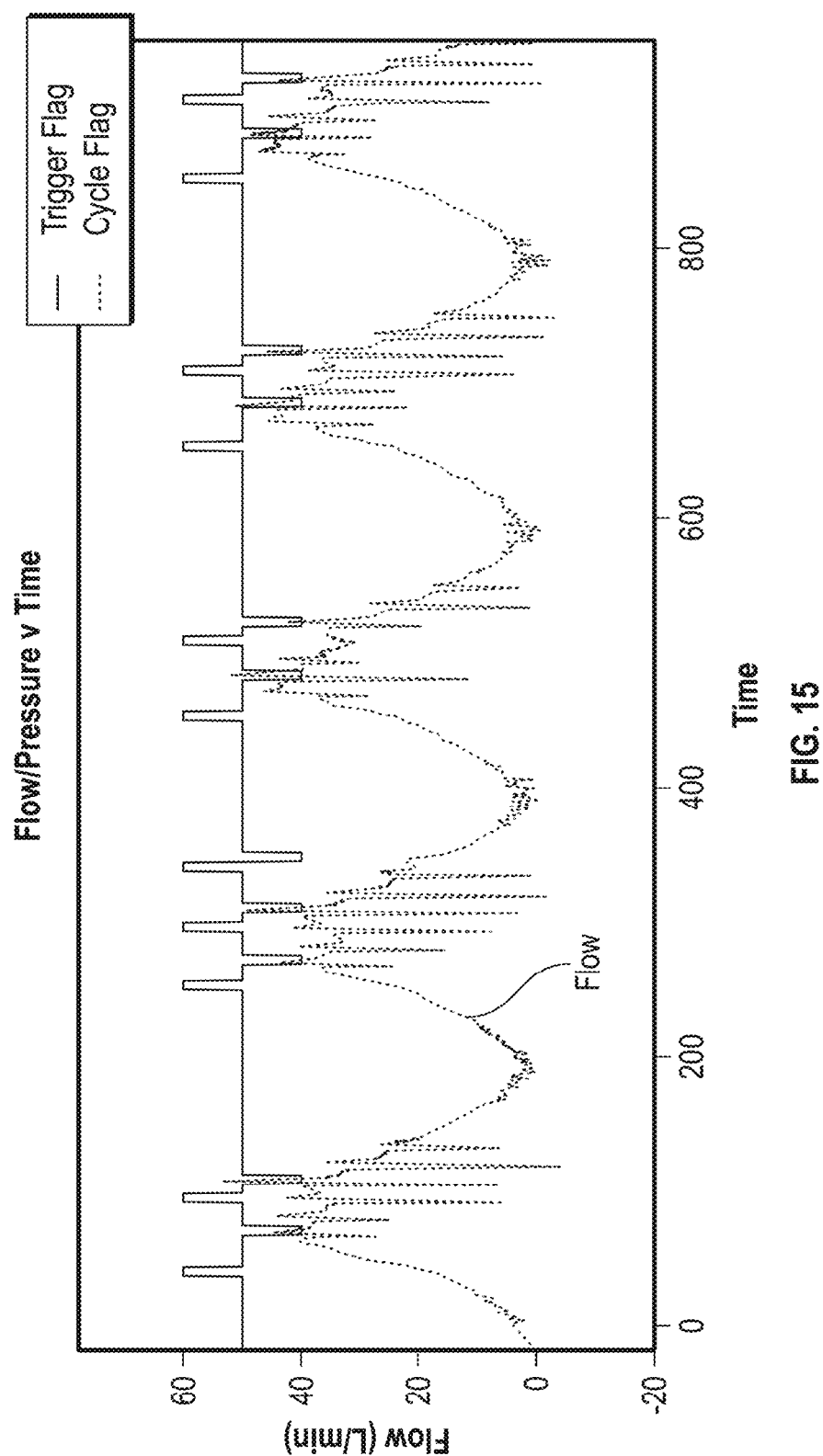
FIG. 15 is a graphical representation showing a first signal associated with gases flow and associated identified trigger and cycle flags used for indicating detection of water in the associated respiratory conduit.

FIG. 15 is a graphical representation showing a first signal associated with gases flow and associated identified trigger and cycle flags used for indicating detection of water in the associated respiratory conduit. The first signal refers to a bilevel flow/pressure signal. Generally, bilevel algorithms trigger expiratory positive airway pressure, EPAP, and inspiratory positive airway pressure, IPAP, based on the flow signal. If there are distortions in the flow/pressure signal, for example due to water bubbling in the tube, these distortions can meet conditions used to trigger a bilevel algorithm, (for example gradient of flow signal, zero crossing of flow signal etc.), and cause false triggers as shown in FIG. 15. Water accumulation in the respiratory conduit may cause triggering and cycling occurs several times in a single breath due to the distortions in the flow signal. The bilevel algorithm is designed to reduce the pressure delivered to the user when they breath out. Rapid drops in the flow/pressure signal can be mistaken by the algorithm as an indication that the patient has stopped breathing in and started breathing out, so the algorithm can false trigger. As shown in FIG. 15, the flow signal perturbations may influence the trigger flag of a bilevel system. The rapidly changing signal can cause false trigger flags or cycle flags. A trigger flag is normally based on the amplitude of a flow signal compared to a base line. For example, if the amplitude exceeds a trigger flag, it is determined that the patient has begun inspiration, and this may trigger the respiratory therapy system to apply the IPAP pressure. A cycle flag refers to an indicative point at which the inspiration finishes, and normally occurs where the flow has peaked and has dropped at a certain extent from the peak. The cycle flag may trigger the EPAP pressure.

In some configurations the control signal output by the controller may be configured to provide input to the bilevel algorithm of the presence of liquid water, so as to minimize false trigger flags or cycle flags of the bilevel algorithm in response to gases and/or pressure perturbation of the first signal(s). In other words, the control signal may be used to suppress triggering of IPAP or EPAP pressure, for example in the flow generator, when presence of liquid water in the respiratory conduit is determined by the controller.

Accordingly, when perturbations caused by presence of liquid water in the respiratory conduit is found, the associated output control signal may be used to instruct the flow generator to disregard the trigger flags and/or cycle flags. Optionally the control signal may be used to change the operation mode of the flow generator into a default (non-patient triggered) IPAP/EPAP mode disregarding the patient's breathing pattern, until the perturbations cease to exist, at which point the control signal may re-activate the patient breathing pattern triggered bilevel mode again.

In some configurations the control signal is configured to update, for example varying or control, operational settings of the device rather than changing a mode of the device. In this way, the controller 1011 may be said to provide a feedback loop to operational settings of the device(s) operatively connected to the respiratory conduit. The device(s) may form part of a humidity control system, of system 100, able to control the humidity of the gases in the respiratory conduit.

The operational settings may be associated with reducing/maintaining/increasing humidity, increasing/maintaining/decreasing temperature, or increasing/maintaining/decreasing power to a heating device, for example heater wire or heater plate, operationally connected to the device.

In some configurations the control signal may be configured to provide feedback to an algorithm executable by the device, for example a bilevel triggering algorithm, a breath detecting algorithm, or a flow limitation detection algorithm.

Breath detection algorithms may be used to determine the current respiratory rate of the patient. Under the presence of liquid water in the respiratory conduit, breath detection algorithms may not work properly, so it may be disabled by the control signal so as to avoid executing functions being dependent on the breath detection algorithm. Erroneous or inaccurate breath detection may also affect other breath based algorithms (for example, flow limitation detection) that relies on the analysis of patterns of the inspiratory portion of the breaths. For example, if liquid water is in the respiratory conduit, the controller 1011 may filter out the bubbling frequencies prior to analysing the signal to determine a bilevel triggering point.

Alternately, if liquid water is present in the respiratory conduit, the system 100 may just deliver CPAP, because the patient is probably asleep. In other words, in response to the determination that liquid water is present in the respiratory conduit, the system 100 may change from a first operation mode to a second operation mode.

In some configurations, a computer implemented method for detecting the presence of liquid water in a breathing gases respiratory conduit for use in a respiratory treatment of a patient is provided. The method comprises:

retrieving 1011a, by a controller 1011, at least one first signal associated with or indicative of a gases flow and/or pressure in the respiratory conduit, determining 1012a, by the controller 1011, a measure of at least one first parameter associated with gases flow perturbations and/or pressure perturbations for at least one portion of the retrieved at least one first signal, and determining 1013, by the controller 1011, the presence of liquid water in the respiratory conduit based at least in part on the measure(s) of the at least one first parameter meeting a first threshold.

In some configurations, the computer implemented method further comprises carrying out, in the controller 1011, any one of the functional steps carried out by the controller of the system 100 disclosed herein.

The controller 1011 defined in the computer implemented method may be the controller of the system 100 described above. Alternatively, the controller 1011 defined in the computer implemented method may be different to the controller of the system 100 described above. The computer implemented method and system 100 respectively improves computer technology in making it possible to detect the presence of liquid water in the respiratory conduit of a respiratory therapy system when only a relatively very small amount of liquid water is present. A human would not be able to detect the presence of such very small amounts of liquid water, as human hearing is not capable of registering the associated frequency perturbations for such small quantities of water. Therefore, the computer implemented method brings about substantial technical improvements that cannot be achieved by human senses, as the presence of water in the respiratory conduit may be determined at an earlier stage, at which corrective actions or system operational adjustments may be taken, in some cases automatically, to reduce the liquid water in the respiratory conduit. A human would not be able to adjust trigger and cycle flags of a bilevel system in real time upon detection of water bubbling in the tube.

The above described counter measures to dry, or at least partially dry, the liquid condensate in the respiratory conduit may be performed once the system is disconnected from the patient such that the patient is not exposed to adverse conditions e.g. relatively high temperature gases or relatively high enthalpy gases. Alternatively these corrective actions may be taken in use i.e. when attached to the patient. The controller is configured to control one or more of the components of the system in order to remain within safe operating conditions i.e. enthalpy and/or temperature of gases and/or flow and/or pressure of the gases flow are below predefined limits. The controller may be provided with predetermined thresholds or limits on temperature, flow, pressure and/or enthalpy, for example, that limit the electrical power provided to the humidifier heater, respiratory conduit heater and/or flow generator.

The above described respiratory therapy devices and systems may be configured to communicate with a remote system e.g. a server or remote patient and device management system. When liquid condensate is detected, the controller may be configured to transmit a message or signal to the remote system. This may be advantageous because the remote system can monitor fault conditions of the respiratory device and record instances of faults such as liquid condensate in the respiratory conduit. Additionally the respiratory therapy device or system may be configured to communicate with a mobile device, for example a patient's mobile device when in a homecare use, or a clinician's mobile device. When liquid condensate is detected a message can be sent to the mobile device to alert the patient or the clinician regarding the liquid condensate in the respiratory conduit.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible configurations thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field.

The invention claimed is:

1. A respiratory therapy system enclosed within a housing configured to detect a presence of liquid water in a respiratory conduit configured for use in respiratory treatment of a patient, the system comprising:
   a controller configured to:
   retrieve at least one first signal associated with or indicative of at least one or both of a gases flow or a pressure in the respiratory conduit;
   identify at least one or both of gases flow perturbations or pressure perturbations for at least one portion of the at least one first signal based, at least in part, on a comparison between the at least one portion of the at least one first signal and a predetermined reference signal, wherein the predetermined reference signal represents flow or pressure in the respiratory conduit;
   determine a measure of at least one first parameter associated with the at least one or both of gases flow perturbations or pressure perturbations for the at least one portion of the at least one first signal;
   determine the presence of liquid water in the respiratory conduit based, at least in part, on the measure of the at least one first parameter meeting a first threshold; and
   upon determination of the presence of liquid water in the respiratory conduit, increase a temperature within the respiratory conduit by controlling one or more operation settings of components within the housing of the respiratory therapy system, so as to reduce the presence of liquid water.

2. The respiratory therapy system of claim 1, wherein the controller is further configured to:
   determine at least one further first parameter associated with the at least one or both of gases flow perturbations or pressure perturbations for at least one further portion of the retrieved at least one first signal; and
   determine the presence of liquid water in the respiratory conduit further based, at least in part, on the at least one further first parameter meeting the first threshold.

3. The respiratory therapy system of claim 1, wherein the controller is further configured to:
   retrieve information indirectly related to the at least one or both of the gases flow or the pressure;
   determine a measure of at least one second parameter associated with the retrieved information indirectly related to the at least one or both of the gases flow or the pressure, and wherein the determination of the presence of liquid water in the respiratory conduit is further based, at least in part, on the measure of the at least one second parameter meeting a second threshold.

4. The respiratory therapy system of claim 3, wherein the at least one second parameter is associated with one or more of: a temperature of the gases flow, an ambient temperature, a humidity of the gases flow, an ambient humidity, device geographic location, environment weather forecast, or altitude.

5. The respiratory therapy system of claim 1, wherein the at least one first parameter is associated with spikes caused by the at least one or both of perturbations in gases flow or pressure.

6. The respiratory therapy system of claim 1, wherein the predetermined reference signal is at least one or both of an estimated gases flow or pressure of the respiratory conduit.

7. The respiratory therapy system of claim 6, wherein the at least one or both of estimated gases flow or pressure is configured to be estimated based, at least in part, on at least one or both of: a set gases flow or a pressure profile of a respiratory therapy device operatively connected to the respiratory conduit, or one or more properties associated with the patient's respiration.

8. The respiratory therapy system of claim 7, wherein the one or more properties include respiratory pattern/rate, tidal volume, minute volume, lung compliance or lung restriction.

9. The respiratory therapy system of claim 6, wherein the at least one of estimated gases flow or pressure is further configured to be estimated based, at least in part, on an estimated leak of breathing gases between the respiratory conduit and the patient.

10. The respiratory therapy system of claim 9, wherein the at least one of estimated gases flow or pressure of the respiratory conduit is estimated based, at least in part, on at least one of a known gases flow or a pressure setting of the respiratory therapy system operatively connected to the respiratory conduit, subtracted by the estimated leak of breathing gases between the respiratory conduit and the patient.

11. The respiratory therapy system of claim 1, wherein the at least one first parameter relates to any one or more of: a frequency, an intensity, an amplitude, a period between peaks, a period of peaks, a location of changes in a breath cycle, or a duration of the at least one of flow perturbations or pressure perturbations of the at least one first signal in view of the predetermined reference signal.

12. The respiratory therapy system of claim 1, further comprising a breathing gases conduit heater wire, or a humidifier heater.

13. The respiratory therapy system of claim 12, wherein the controller is configured to control operation settings of components of the respiratory therapy system by controlling an operation setting of the breathing gases conduit heater wire or the humidifier heater.

14. The respiratory therapy system of claim 13, wherein the controller is configured to maintain the increased temperature in the respiratory conduit at least until the presence of liquid water is no longer detected.

15. The respiratory therapy system of claim 13, wherein the controller is configured to control the breathing gases conduit heater wire to heat to a higher power or maximum power, and/or control a humidifier to a reduced power or switch the humidifier heater off.

16. The respiratory therapy system of claim 1, wherein the at least one first parameter is determined based, at least in part, on a frequency analysis of the at least one first signal.

17. The respiratory therapy system of claim 16, wherein the frequency analysis is based, at least in part, on a Fast Fourier Transform (FFT) of the at least one first signal.

18. The respiratory therapy system of claim 16, wherein the frequency analysis of the at least one first signal is based at least in part on at least one spectrogram associated with the at least one first signal.

19. The respiratory therapy system of claim 1, wherein the at least one first parameter associated with the at least one of flow perturbations or pressure perturbations is determined based at least in part on a wavelet analysis of the at least one first signal.

20. The respiratory therapy system of claim 1, further comprising at least one of: a flow generator configured to provide a flow of breathing gas to the patient, a humidifier, or a patient interface.

21. The respiratory therapy system of claim 1, wherein the controller is configured to:
- retrieve the at least one first signal associated with or indicative of the at least one of the gases flow or the pressure in the respiratory conduit from at least one sensor during a first measuring period, and
- determine the presence of liquid water in the respiratory conduit when the measure of the at least one first parameter exceeds the first threshold.

22. A computer implemented method configured to detect a presence of liquid in a respiratory conduit of a respiratory therapy system for use in a respiratory treatment of a patient, comprising:
- retrieving, by a controller, at least one first signal associated with or indicative of at least one of a gases flow or pressure in the respiratory conduit;
- identifying at least one or both of gases flow perturbations or pressure perturbations for at least one portion of the at least one first signal based, at least in part, on a comparison between the at least one portion of the at least one first signal and a predetermined reference signal, wherein the predetermined reference signal represents flow or pressure in the respiratory conduit;
- determining, by the controller, a measure of at least one first parameter associated with the at least one or both of gases flow perturbations or pressure perturbations for the at least one portion of the retrieved at least one first signal;
- determining, by the controller, the presence of liquid in the respiratory conduit based at least in part on the measure of the at least one first parameter meeting a first threshold; and
- upon determination of the presence of liquid in the respiratory conduit, increase a temperature within the respiratory conduit by controlling one or more operation settings of components within a housing of the respiratory therapy system, so as to reduce the presence of liquid.

* * * * *